(12) United States Patent
Sliwa et al.

(10) Patent No.: US 8,289,274 B2
(45) Date of Patent: Oct. 16, 2012

(54) MICRODROPLET-BASED 3-D VOLUMETRIC DISPLAYS UTILIZING EMITTED AND MOVING DROPLET PROJECTION SCREENS

(76) Inventors: John W. Sliwa, Los Altos Hills, CA (US); Carol A. Tosaya, Los Altos Hills, CA (US)

( * ) Notice: Subject to any disclaimer, the term of this patent is extended or adjusted under 35 U.S.C. 154(b) by 1226 days.

(21) Appl. No.: 12/082,064

(22) Filed: Apr. 8, 2008

(65) Prior Publication Data

US 2010/0321478 A1   Dec. 23, 2010

Related U.S. Application Data

(63) Continuation-in-part of application No. 11/036,149, filed on Jan. 13, 2005, now abandoned.

(60) Provisional application No. 60/536,026, filed on Jan. 13, 2004.

(51) Int. Cl.
*G09G 3/34* (2006.01)
(52) U.S. Cl. .......................................... 345/108; 348/51
(58) Field of Classification Search .................. 345/108; 348/51, E13.075
See application file for complete search history.

(56) References Cited

U.S. PATENT DOCUMENTS

| | | | | |
|---|---|---|---|---|
| 5,764,317 A * | 6/1998 | Sadovnik et al. | ................. | 349/5 |
| 5,813,742 A * | 9/1998 | Gold et al. | ....................... | 353/88 |
| 6,302,542 B1 * | 10/2001 | Tsao | ................................ | 353/7 |
| 6,554,430 B2 * | 4/2003 | Dorval et al. | .................... | 353/7 |
| 6,753,847 B2 * | 6/2004 | Kurtenbach et al. | .......... | 345/156 |

* cited by examiner

*Primary Examiner* — Kevin M Nguyen
*Assistant Examiner* — Kenneth B Lee, Jr.

(57) ABSTRACT

Volumetric three-dimensional (3-D) graphical or computer displays are disclosed herein that are capable of presenting objects, data, scenes or other visual information in a realistic or solid-like manner, allowing for an unaided observer to observe such static or moving objects from multiple perspectives with natural depth-cues and superior image quality. We utilize in this refined approach moving-screens formed from particulate-arrays and we preferably optically project multiple image sub-slices on each such flying-screen as it passes through the image-volume thereby minimizing particulate mass-flow since only once screen per image-volume is needed to present the several or many necessary slices of each volumetric frame.

74 Claims, 14 Drawing Sheets

BUBBLE BASED

PIEZO-BASED

TAYLOR-CONE BASED

RESERVOIR BASED
(PREFORMED DROPLETS)

SURFACE TENSION-
BASED WITH ELECTRICAL
EXTRACTION (TAYLOR CONE)

BUBBLE SWITCHED PIEZO

ACOUSTIC EMISSION

MICRODROPLET-BASED 3-D VOLUMETRIC DISPLAYS UTILIZING EMITTED AND MOVING DROPLET PROJECTION SCREENS

CROSS-REFERENCE TO RELATED APPLICATION

The present application is a continuation-in-part application of application Ser. No. 11/036,149, filed Jan. 13, 2005 now abandoned, which claims priority from provisional application Ser. No. 60/536,026, filed Jan. 13, 2004.

FIELD OF THE INVENTION

The invention is directed to the field of volumetric three-dimensional (3-D) graphical or computer displays which are capable of presenting objects, data, scenes or other visual information in a realistic or solid-like manner allowing for an unaided observer to observe such static or moving objects from multiple perspectives with natural depth-cues and superior image quality.

BACKGROUND OF THE INVENTION

1) Volumetric Displays—Why Are They Attractive?

Two-dimensional (2-D) display technologies are pervasive and include all manner of CRTs, LCDs, plasma flat panels, more recently OLEDs, and even projected images such as movie screens or slide-show images. They are utilized in everything from televisions, PDAs, PCs, instruments, wristwatches, appliances, automobiles, digital still and video cameras, video playback devices, and cell-phones. Many of these are capable of presenting static and/or moving imagery and/or alphanumeric messages. They will be with us indefinitely. However, they are not ideal for the presentation, manipulation of, or navigation through complex spatial scenes and data.

As a first example, CAD (computer-aided design) engineers utilize software on their CAD workstations to section and rotate their work on a 2-D screen. This approach is adequate but not natural. CAD engineers almost always have parts made in order to handle them and get the complete picture of form and fit, if not also of function. In fact, one could argue that the stereolithography market, which provides solid computer-generated polymeric CAD prototypes, is a direct response to the inadequacy of 2-D CAD displays. True 3-D volumetric displays would be very, very helpful.

As a second example, air-traffic controllers utilize a 2-D screen on which the third dimension, altitude, is not physically represented by a display dimension. Because of this, the controllers have to utilize alphanumeric altitude tags juxtaposed to the moving blips (planes). In essence and by default, the controllers memorize the altitude data on these tags, which limits how much air traffic they can handle. Although alarms can be set for "unacceptable" altitudes, one wishes to avoid responding to a stream of such alarms. This is a perfect application for a true 3-D display.

A third example would be electronic games which require the user(s) to frequently switch between views of the game, an approach well short of having a simpler 3-D overview viewable from any perspective. This is a large market that would welcome this superior visualization capability. The game and gaming markets push the forefront of graphics.

A fourth example would be for surgeons who would be greatly enabled by having true 3-D imagery of their patient's anatomy to work on and navigate through. 3-D displays could substantially simplify training of surgeons and the quality control and preciseness of minimally invasive manipulations.

A fifth example would be the two independent fields of molecular engineering and nanotechnology, which are fundamentally limited by the difficulty of visualizing and modeling the complex fit and interactions between highly irregularly-shaped molecules, proteins and/or atoms or assemblages thereof. This would be greatly simplified with true 3-D displays viewable from any perspective.

The 50+ year-old 2-D display paradigm offers a "window" through which one can look at a particular view of something. It does not satisfy all of the many depth-cues that the real objects would. The objects are always "outside" the window and the viewer is always inside. The ability to move one's head (or walk around) and see a variety of perspective views is a natural means of dealing with spatial complexity in the quickest and most efficient manner. A truly 3-D display should get rid of the "window" analogy and create objects that have immediate local presence "on your desk" rather than views of objects that are removed from the viewer.

Thus, it is no surprise that the history of attempts to design and sell truly 3-D displays is a very long and very rich one, revealing amazing creativity and persistence. However, even today, such displays are not yet a significant market success for a variety of reasons we will discuss below. There is zero doubt that a practical affordable 3-D display with solid-like visualization abilities would have a large and growing market, likely initially in scientific/engineering/medical visualization and serious games and gaming. Surely part of the reason for the limited commercial success is because it is correctly recognized that the design of a realistic 3-D display is a very difficult multidisciplinary engineering problem. However, as for any technical field, new approaches can break down old barriers. We herein offer some new approaches that we believe circumvent many prior art problems and make practical 3-D displays a tractable market challenge.

2) Volumetric Displays—What Are the Attributes of a Good Volumetric Display and Which Have Been Difficult to Achieve?

The best definition we have found is from the only book dedicated to the subject, "Volumetric Three Dimensional Display Systems" by Blundell and Schwarz (Wiley-IEEE Press, Mar. 3, 2000, ISBN #0471239283). It defines a volumetric 3-D display in this manner: "A volumetric display device permits the generation, absorption, or scattering of visible radiation from a set of localized and specified regions within a physical volume". A significant point here is that the volumetric pixels, known in the 3-D art as voxels, may produce optical contrast by any one or more of: a) the production of light, b) the scattering of light, or c) the partial or complete blocking of light. For an ideal 3-D display of this type, one or more observers may look at the displayed objects or scenes from multiple moving or static perspectives and have the objects or scenes appear as solid or semisolid objects that exhibit occlusion effects. Just as for 2-D displays, a minimum refresh frame rate is required, and this has empirically been found to be about 20 to 25 refreshed frames per second for volumetric displays and ideally should be even higher. As for resolution or voxel spacing, it is desirable that the displayed objects or scenes are accurately depicted without aliased or choppy edges, so the required resolution is a function of the detail to be imaged. In general, prior art 3-D work has mostly involved voxels with on the order of 1 mm (minimum) or so spacing, which is 2× to 4× coarser than modern 2-D displays but sufficient for some tasks in 3-D.

The challenge of going from 2-D to 3-D is that the number of pixels goes from N×N (N-squared) for 2-D pixels to N×N×N (N-cubed) for 3-D voxels assuming equivalent resolution. In general, the size of the data pipe (bandwidth)

needed to build a large 3-D display with significantly better than 1 mm voxel spacing has until recently been prohibitive. Recently, however, means to construct multigigabit per second image-updating data paths are becoming available. So now it is more the poor image quality and cost that are becoming the issue, rather than the brute force processing power. Our inventive contributions herein are particularly enabled by our disclosed advances in contrast generation mechanisms that overcome many of the remaining image quality shortcomings.

Prior art 3-D displays generally presented sequentially illuminated slice-at-a-time imagery. That is, the object or scene being imaged was cyclically illuminated in space one slice (or sub-frame portion) at a time and in a manner fast enough that the eye "sees" an overall fused object that is dimly lit at an apparent "average" pseudo-constant intensity. The inability of electronics to "keep up" with a real 3-D scene by updating it all (all sub-frame slices in a full frame depiction) simultaneously is hidden from the viewer because the eye and brain "average out" and fuse together what it sees via the known fusion-persistence effect. Thus, rapid sequential slice updates are seen as illuminated objects or glowing surfaces which are presented "just fast enough" to fool the observer into thinking that the object is illuminated all the time.

However, prior art displays have suffered in image quality for a number of reasons. First have been the known dead zones, which are areas of the image volume which have either no active voxels, obscured voxels or distorted misshapen voxels. This is because of reasons pertaining to the varying geometry of propagation of radiation (light, electrons, etc.) toward a target voxel on a moving solid projection screen. A second reason is because if a moving solid screen technique is used (see below), the screen needs a drive shaft and a stiffening frame and the screen itself cannot be totally transparent and smooth or it will not work. A third reason, applicable to static and moving screen displays, is that electrical connections to interior voxels, if necessary, cannot be made totally transparent and totally non-refracting. A fourth reason is that nobody has ever been able to provide a contrast mechanism that has high optical contrast between the ON and OFF states (when viewed from outside the assembled operating display). As an example, a liquid crystal voxel which turns dark and then clear does not really turn totally clear. Building a static (no moving parts) 3-D display by stacking or juxtaposing hundreds of not-quite-clear voxels and not-quite-clear and refracting interconnects and antireflection films results in a semi-opaque haze even when no object is displayed. Finally, many attempts have involved stacking of panels in the third dimension, each such panel in essence being a 2-D display. It is extremely difficult to make the interfaces between such stacked panels totally invisible, especially if electrical conductors such as semi-transparent and refracting indium-tin oxide are employed. A last reason has been mediocre resolution (large voxel spacing of one or more millimeters) due to graphics engine limitations. Only recently have affordable graphics engines provided the multigigabit per second performance that is required even for the far from detailed non-ideal 1 mm voxel resolution.

Many prior art 3-D display attempts have also resulted in excessively noisy or excessively heavy displays. We, however, can somewhat excuse the "heavy" criticism as even CRTs of high quality and high volume are clearly "heavy" yet have for decades been in high demand. However, a 3-D volumetric display which comprises a solid block of stacked LCD plates is going to be much heavier than even a vacuum CRT. At least a CRT is hollow.

A display that makes a lot of noise is not excusable in most applications. Thus, a heavy 3-D display (as heavy as a CRT) that otherwise works on the order of as well as a 2-D CRT in image quality will certainly have a market, presuming it does not have a substantially equivalent lighter 3-D competitor.

We should note, per the above definition of a volumetric 3-D display, that there are a huge number of "3-D" displays which involve vibrating mirrors, lenticular lenses, crossed-polarizers, eye-switching viewing glasses, etc., all of which fool the eye or brain into thinking there is a third dimension present when there is not. These are more properly termed 2.5-D displays, as the voxels are not physically spatially distributed. Most of these only work from one sitting position. Many of these can give users fatigue, eyestrain or a headache. We will discuss only 3-D displays that truly physically place voxels into three dimensions (for at least transitory moments) such that they can be visualized in their true light-emitting, light scattering or light-absorbing positions from multiple perspectives.

So, in summary, a 3-D display should ideally be as clear (or at least featureless) as glass when it is off and when it is on it should not be subject to haze or fog surrounding the image objects. One should have a bright high-contrast image that, preferably, does not require a severely darkened room in order to see it. Ideally, but not necessarily, would be an ability of the display to depict occlusion (visual obstruction of objects behind other objects). In this manner, solid-like opaque objects would be seen as opposed to ghost-like semitransparent or transparent objects. Our invention herein offers a degree of such occlusive ability. A weight equivalent to, or preferably lighter than, that of a vacuum CRT is preferred. Finally, it has been clearly established that 2-D image-projector based (moving screen) 3-D displays are much more able to keep up with the required image refresh rates than scanned-spot 3-D displays. Thus, the display will preferably be illuminating significantly more than one voxel at a time per beam, if a beam is used at all. This is a preference for good bandwidth efficiency and to get better refresh rates and not necessarily a hard requirement.

3) Volumetric Displays—What Approaches Have Been Tried and What Are the Advantages and Drawbacks of Each Type?

Static Volume—No Moving Parts

A static volume 3-D display typically comprises a stack of 2-D image display panels which is at least partially transparent in stacked form. One can operate it in one of three ways: a) a moving (via electrical switching) screen is formed inside the stack upon which appropriate image slices are optically projected from one end, b) a moving (via electrically switching) screen is illuminated using its own in situ emitters to show the appropriate image slice (no projection), or c) a moving slice (or subset of voxels) is illuminated using an external light source, the slice or subset pixels being electrically rendered opaque or transparent according to the appropriate slice of the image, but the illumination not necessarily comprising a projected image. An alternative approach is to turn on all of the voxels that represent the 3-D object at one time at a frame rate. This has severe signal bandwidth limitations but would certainly be preferred in order to offer some occlusion effect. It has not yet been achieved.

Intrinsic advantages of static 3-D displays (seen to date only as paper designs) would seem to include: 1) reliability, 2) silent operation, 3) ease of defining boxlike display volumes, and 4) acceptable bandwidth for moving slice modes.

Intrinsic disadvantages include: 1) haze or lack of transparency due to voxel interconnects and electrodes as well as stacked-panel antireflection or index-matching films, 2) optical distortions due to mismatching optical indices at stack interfaces, 3) weight much greater than for CRTs of equivalent dimension, 4) highest probable cost, and 5) dim translucent imagery incapable of opacity, occlusion and shadowing (moving slice mode).

Some examples of static displays from the prior art are:

U.S. Pat. No. 4,670,744 to Buzak entitled "Light reflecting Three Dimensional Display System". This is a stacked LCD display approach.

U.S. Pat. No. 5,745,197 to Leung et al entitled "Three Dimensional Real-Image Volumetric Display System And Method". This is a stacked panel LCD approach, for example, typically using external illuminators.

U.S. Pat. No. 5,764,317 to Sadovnik et al entitled "3-D Volume Visualization Display". This is a stacked LCD panel approach wherein an image projector projects image slices upon opaque activated slices in rapid sequence.

U.S. Pat. No. 5,813,742 to Gold et al entitled "Layered Display System And Method For Volumetric Presentation". This is another LCD stack, but herein they form a hemisphere rather than a block. An interior projector illuminates one opaque layer at a time as above.

U.S. Pat. No. 5,929,572 to Whitesell entitled "Electroluminescent Arrays Layered To Form A Volumetric Display". This is a stacked panel display like the above but herein the panels and voxels comprise self-emitting light sources rather than opaque regions, which need to be externally illuminated.

U.S. Pat. No. 6,100,862 to Sullivan entitled "Multi-Planar Volumetric Display System And Method Of Operation". This is another stacked LCD panel and projector system for illuminating the moving opaque or switched slice.

Swept-Volume—Rotated or Translated Screens—Moving Physical Parts

A prior art swept-volume 3-D volumetric display typically utilizes a mechanically-moving, physically-solid screen or layer. Appropriate sequential slice images are projected onto or activated or written upon (or within) the moving screen when it is at each corresponding sequential spatial position. By "moving" we mean rotation, but translation has also been tried to a much lesser extent. Solid translating screen displays will probably never be as easy to make and operate as rotating screens; they have inertia operating against them. The major subdivision within swept-volume rotating displays is between passive screens and active screens, i.e., screens that reflect (or block) light vs. screens that produce light (by phosphorescence of the voxel due to an e-beam impinging upon it or by self-emission from a powered screen-mounted LED, for example).

A passive screen could be, for example, a translucent screen for acceptance of a projected optical light image or illuminating scanned laser spot. In other words, a passive screen does not produce its own optical emissions; rather, it redirects them to (or away from) the eyes from elsewhere.

Intrinsic advantages of a swept passive screen include: 1) lowest cost, 2) light weight, and 3) elimination of the complexity of voxel interconnects required for an active screen.

Intrinsic disadvantages of a swept passive screen include: 1) dead zones due to difficult geometries of impingement of the illumination (or activation) beam upon the screen or due to rotation shafts or screen-stiffening frames, 2) noisy operation, 3) reliability, and 4) dim translucent imagery incapable of opacity, occlusion and shadowing.

Examples of rotated passive screens from the prior art include:

U.S. Pat. No. 4,983,031 to Solomon entitled "Three Dimensional Volumetric Display System". This display has a passive screen which rotates and upon which an image (slice by slice) is projected. Some such rotating screen and projector systems have some or all of the optics co-rotating with the screen (see below) (this reference has just some of the optics rotating with the screen). Other references have stationary projectors off-board the rotating screen.

U.S. Pat. No. 5,042,909 to Garcia entitled "Real time Three Dimensional Display With Angled Rotating Screen And Method". This display has laser beam spots scanning a tilted screen. Recall the slow frame rate issues of any prior art scanned-spot system.

U.S. Pat. No. 5,082,350 to Garcia et al entitled "Real Time Three Dimensional Display System for Displaying Images In Three dimensions Which Are Projected Onto A Screen In Two Dimensions". This display is very similar that of U.S. Pat. No. 5,042,909 above.

U.S. Pat. No. 5,172,266 to Garcia et al entitled "Real Time Three Dimensional Display". This is yet another rotating or compound rotation passive screen.

U.S. Pat. No. 5,854,613 to Soltan et al entitled "Laser Based 3-D Volumetric Display System". This device has multiple laser beams impinging upon a rotating passive helical screen to form 3-D images.

U.S. Pat. No. 5,936,767 to Favalora entitled "Multiplanar Autostereoscopic Imaging System". This display describes a number of images projected upon rotating passive screens.

U.S. Pat. No. 5,954,414 to Tsao entitled "Moving Screen Projection Technique For Volumetric Three-Dimensional Display". This is one of the first patents involving projection of images on moving passive screens of both the rotating and reciprocating or translating type.

U.S. Pat. No. 6,064,423 to Geng entitled "Method And Apparatus For High Resolution Three Dimensional Display". This display uses a spatial light modulator to project images upon a rotating helical screen. The text has a nice prior art overview for the interested reader. The taught spatial light modulator or SLM is a means of image projection as opposed to building up images using scanned spots.

U.S. Pat. No. 6,302,542 to Tsao entitled "Moving Screen Projection Technique For Volumetric Three Dimensional Display". This display is similar to that of U.S. Pat. No. 5,954,414 above.

An active rotating screen could, for example, comprise a phosphor-coated screen which generates light emission at points whereupon a steered and gated off-board CRT electron-beam(s) impinges. This approach is like a TV picture tube, but with a moving phosphor layer or screen. Relative to a passive screen, an active screen produces its own light (or contrast) as by phosphor excitation of a screen phosphor or by selective switched illumination of a screen-mounted light-emitting diode (LED) or solid-state or gas laser. Historically, scanned beam active screen volumetric displays have had low frame rates or have resulted in sparse images. This is because scanned beam (scanned spot) systems typically only have the scanning bandwidth to utilize about 1% of the available voxels for any reasonable screen rotation rate. (This, however, is no longer true if entire 2-D images are projected as opposed to individual image spots or voxels making up such images. For that a passive screen suffices.)

Intrinsic advantages of a swept active screen include: 1) minimization of or elimination of image projection and associated optics (however, it must be replaced with complex and costly switching means), 2) elimination of the complexity of voxel interconnects as used in static displays (for an e-beam impinged active phosphor screen), and 3) light weight.

Intrinsic disadvantages of a swept active screen include: 1) dead zones due to difficult geometries of impingement of the illumination beam upon the screen or due to rotation shafts or screen-stiffening frames, 2) noisy operation, 3) reliability, and 4) dim translucent imagery incapable of opacity, occlusion and shadowing.

Examples of rotated active screens from the prior art include:

- U.S. Pat. No. 4,160,973 to Berlin, Jr., entitled "Three Dimensional Display". Therein are described a variety of self-illuminated moving screen displays, using, for example, LEDs.
- U.S. Pat. No. 5,703,606 to Blundell (an author of the 3-D display book we referenced above) entitled "Three Dimensional Display System". This patent describes phosphor-coated screens impinged by up to three e-beams in a vacuum vessel.
- U.S. Pat. No. 6,054,817, also to Blundell, entitled "Three Dimensional Display System". This patent describes algorithm and beam-detection improvements applicable to e-beam/phosphor screens.
- U.S. Pat. No. 6,115,006 to Brotz entitled "Rotating Display Device And Method For Producing A Three-Dimensional Real Image". This display utilizes an active spiral or helical screen having LEDs or field-emission light emitters.
- WO 01/78410 A3 to Favalora et al entitled "Projection Screen For A Multiplanar Volumetric Display". This reference covers some basic features of rotating screens for volumetric displays.

Co-Rotating Projection Displays, Crossed Beam Displays

This category covers those that do not clearly (or only) fall into one of the above categories. The best example is rotating swept screens wherein all of the image projection means are rotated with the screen itself; thus, the geometrical relationship between projector and screen is constant and has minimal or no dead zones (dead zones due to variable geometry image projection). This approach solves many of the dead zone issues; however, some issues still exist since a rotating screen needs a shaft and may need a stiffening frame. Such a "co-rotated" projector/screen may likely also need a sophisticated slip-ring (sliding contacts) assembly to pass signals to and from the rotating portions. This can be done technically, but cost and reliability are the question marks. This approach is most like a swept volume approach; however, the portion being rotated comprises a static (to itself) screen and projector subsystem. Examples of such systems from the art include:

- U.S. Pat. No. 4,983,031 to Solomon entitled "Three Dimensional Volumetric Display System". This device was already mentioned under the above passive rotation section but we mention it here because it was one of the first to utilize co-rotating optical projection means.
- U.S. Pat. No. 5,148,310 to Batchko entitled "Rotating Flat Screen Fully Addressable Volume Display System". This is another co-rotating screen and projection means approach.
- U.S. Pat. No. 5,678,910 to Martin entitled "Multiple Angle Projection For 3-D Imagery". This is another multi-projector/screen system with co-rotation.
- U.S. Pat. No. 6,183,088 to Lore et al entitled "Three Dimensional Display System". This is from Actuality Systems, Inc., which has a product on the market of this type. This patent covers tapering of the rotating screen edges to reduce dead-zones and dark-lines. Actuality Systems, Inc. uses a co-rotating screen and projection optics. They utilize digital light mirror (DLM™) chips as used in video projector products to get gigabit per second and higher bandwidths.
- U.S. Pat. No. 6,487,020 to Favalora entitled "Volumetric Three Dimensional Display Architecture". This is a twist on co-rotating screen/projection systems wherein the screen comprises a lenticular screen.
- U.S. Pat. No. 6,554,430 to Dorval et al entitled "Volumetric Three Dimensional Display System". This patent seems to best describe the Actuality Systems, Inc. product mentioned above. Their rotating screen is translucent and they utilize DLMs or digital light mirrors to advantage in a co-rotation subassembly. Since this is the only product on the market commercially, we have to consider it as the best prior art.

It is an appropriate point here to reference two papers discussing the Actuality Systems, Inc. co-rotated projector product as follows:

1) Favalora, Gregg et al, "100 Million-Voxel Volumetric Display", April 2002, Society Of Photo-Optical Instrumentation Engineers/SPIE proceedings. Further details beyond the above Actuality Systems, Inc. patents are explained herein. The basic Actuality Systems, Inc. Perspecta™ product's rotating screen affords 768×768 resolution for each of the 198 slices per 360 degree rotation. The display rotates at 730 rpm and comprises a translucent screen. A Texas Instruments Digital Light Mirror (DLM™) system comprises three such DLM chips for red, green, and blue. A rotating folded compound mirror system projects the DLM images at a 45 degree angle upon the rotated screen. The image volume comprises roughly most of a 10-inch diameter rotating sphere which is situated within a second static sphere. The system utilizes about 3 to 6 Giga-bytes of SRAM, which is of double buffered, double data-rate design. Color is dithered so that the inherent 8 color capability appears to have hundreds of colors.

Without doubt, there will be some market for this product and its follow-on products. Given that we intend to improve upon the performance that the Actuality Systems, Inc. product demonstrates, we now point out its primary drawback compared to an "ideal" volumetric display. A simple look at FIGS. 3, 7, and 9 of the foregoing reference will make it clear that the displayed solids or subjects have the appearance of being immersed in a thick fog and being ghost-like in appearance, even without the fog surrounding (and overlying) the images. Despite this, moderate detail can be made out. There are, however, no test results provided to demonstrate what the actual achieved resolution or achieved contrast is for their "solid" images. We also note FIG. 9 of the foregoing reference again, wherein one can see that the 10-inch image volume sphere is surrounded by a 24 inch diameter static sphere. The need for the second spherical enclosure is not explained but we deduce that the inner sphere rotates and the outer sphere does not. This may be so as to eliminate direct drag on the screen itself and reduce that to a problem of drag on a sphere rotating within its own confines, which is a much quieter and reduced power situation. One of us (JWS) has personally viewed the product in the last year and these images seem consistent with what was personally experienced in a hands-on viewing at a display symposium. It should also be noted that the outer sphere certainly adds some undesirable optical effects whose magnitude are unknown to us.

2) Favalora, Gregg et al, "Spatial 3-D: The End of Flat Screen Thinking", Actuality Systems, Inc. White Paper #1 of 3. This recent paper primarily argues the benefits of spatial visualization over flat-screen visualization as proven by several US Navy studies. Use of the known DICOM, OPEN GL and VRML image format standards are described for medical, CAD and other interactive spatial work. No display details are discussed therein.

Yet another group of displays involve selectively "activating" points in the display volume as by overlapping two laser or e-beams. The volumetric media requires both beam energies to be incident in order for the voxel to emit light. The points may be spatial locations in a laser-activatable photonic crystalline glass or emission gas or may be particles that are suspended at such points and illuminated as by a laser. To our knowledge, the best of these are the photoemitting crystal block display which has its voxels activated by the cooperative action of crossed laser beams. However, it has been found exceedingly difficult to scale such technology beyond a few cubic centimeters for materials and other reasons. Such units are also very very bulky and very expensive because the required lasers are bulky.

Example of these types of "crossed-beam" displays include:

U.S. Pat. No. 3,829,838 to Lewis et al entitled "Computer Controlled Three-Dimensional Pattern Generator". This is a basic crossed beam display. We are not aware of a prototype display.

U.S. Pat. No. 4,063,233 to Rowe entitled "Three Dimensional Display Devices". This display uses crossed e-beams in a "phosphor dust cloud", the dust cloud also being stirred in a novel manner. We have never seen a working prototype of a phosphor dust display, but we suspect that three difficult issues would arise as follows: 1) the dust that is not being activated will still scatter (or block) substantial light causing fog, 2) the dust particles may be substantially moved by the beam or beam-interactions adding unwanted effects, and 3) inter-particle interactions and particle-wall interactions with and without electrical activation, such as clumping. Similar devices try to use a gas (instead of dust), such as rubidium vapor, to overcome these problems; however, these gas approaches have other problems such as blooming of the voxel. We are not aware of any functional prototypes of any crossed-beam gas systems. At a minimum, a gas-based system has the advantage of transparency of the unactivated gas.

U.S. Pat. No. 4,881,068 to Korevaar et al entitled "Three Dimensional Display Apparatus". This display uses crossed laser beams in a responsive gas image volume. We know of no working prototypes.

U.S. Pat. No. 5,627,554 to Jefferson entitled "Segmented Direct Volume Display Device And Method". This display indeed describes crossed beam activation of gases and even of a gel. We know of no working prototypes.

U.S. Pat. No. 5,684,621 to Downing entitled "Method And System For Three Dimensional Display Of Information Based On Two-Photon Up-Conversion". This is one of the best known and prototyped crossed beam displays using a photoactive block of material as the display volume. It is a clever approach; however, it has been very very difficult to make a sufficiently large display (a large crystal is needed) and to find a way to implement the required lasers and scanners compactly. It works for a very very small prototype crystal which is, even then, dwarfed by its external lasers and scanners. So far, it is a lab success only, and on a very small size scale at that.

d) Fountains and Other Liquid or Bubble Aesthetic and Amusement Devices

We would not be complete if we did not mention water-fountain based amusement and alphanumeric "displays" or, more correctly per their teaching, "aesthetic and amusement devices". Most of these are very very large, but a few are breadbox sized. What they all have in common is that they utilize static or very slow moving water droplets or air bubbles in water or glycerin, akin to common fountains and water displays. A requirement of any 3-D volumetric graphical display is fast frame rate (e.g., 24 to 30 frames per sec minimum) and good resolution (e.g., probably one or more voxels per linear mm in three dimensions, depending on fineness of detail needed). It is readily apparent that these prior art decorative and amusement devices, albeit creative, useful and pleasant, could never provide the frame rate and resolution needed for our application. This is because the contrast phenomenon in them (shape of a water jet or location of a water droplet) all move at very low velocities to avoid becoming a random spray or aerosol in air. Their already complicated plumbing could not be compacted without going to a new plumbing paradigm. They also cannot emit small enough droplets fast enough, densely enough, or with spatial control anywhere near what is needed for our invention. Viewed in terms of our invention, thousands, if not millions, of droplets need to be created in space very rapidly and very close together for moving images, without appreciable unintended motions. (For example, if two neighboring droplets transit 12 inches of our display volume, they start with a 0.5 mm spacing and preferably end with a 0.5 mm spacing.) This amounts to creating a semi-ordered fog with a three-dimensional ordering of significant degree. One cannot simply turn the pressure up on a fountain and make the drops go faster without creating a fine turbulent spray and a disordered mess (fog plume or spray plume). One also needs powerful graphics processing and communication capabilities which are not suggested. None of these devices meet or suggest our purposes.

Examples of such amusement and aesthetic devices include:

U.S. Pat. No. 3,387,782 to Mizuno entitled "Apparatus For Producing A Fountain Including A Stroboscopic Light". Although not a 3-D fountain, the inventor utilizes dynamically warping and deforming sheets of cascading water and lights these films using stroboscopic lighting to freeze periodic phenomenon. It is an aesthetic device.

U.S. Pat. No. 4,094,464 to Kawamura et al entitled "Three Dimensional Display Device using Water Fountain". This device is again not a true 3-D fountain but a 2.5-D fountain for presentation of alphanumerics which are either unchanging or very slowly changing and of large size.

U.S. Pat. No. 4,265,402 to Tsai entitled "Strobed Liquid Display Device And Head Therefor". This device could be described as an aesthetically pleasing showerhead-type fountain capable of emitting a helical shaped stream or sheet of droplets. Alphanumerics are not taught; this is a decorative or amusement device.

U.S. Pat. No. 4,195,907 to Zamja et al entitled "Light conducting Fibers" teaches the use of permanently bubbled optical fibers which can be used to form script-like static displays. The bubbles do not move and cannot be switched on and off. This is a decorative signage patent.

U.S. Pat. No. 4,422,719 to Orcutt entitled "Optical Distribution System Including Light Guide". This patent is very similar to the above U.S. Pat. No. 4,195,907.

U.S. Pat. No. 4,466,697 to Daniel entitled "Light Dispersive Optical Lightpipes And Method Of Making Same". This is again very similar to both U.S. Pat. No. 4,195,907 and U.S. Pat. No. 4,422,719.

e) Unique Displays Fitting no Other Description

The following references are cited and described:

U.S. Pat. No. 4,023,158 to Corcoran entitled "Real Three Dimensional Display Arrangement". While this invention is creative, we seriously question its workability, as taught, as evidenced first by the lack of even a crude prototype or product after many years. We are familiar with optical levitation of particulates in a vacuum or gas (as well as in a liquid by optical laser tweezers). We are not aware of any demonstration wherein particles could be picked up and levitated in a gas or vacuum without somehow externally mechanically aiding their getting into the proper beam potential-well location (horizontal, vertical, or both) to begin with. This lifting phase is far more challenging than the metastable levitation itself. Secondly, an ideal 3-D display will allow for multiple voxels along a given Z height (Z-scanline) to be activated. The taught laser approach is incapable of levitating multiple particles one above the other along a vertical Z-axis. Thirdly, in order to obtain high-frame rate video, one would have to be juggling millions of these particles simultaneously, all without interfering particles or interfering beams. It is obviously impossible given the massive beam-interference that would take place as well as the need to wait for particles to be raised or dropped. We doubt this can be done even slowly for even only one such particle along a substantial Z-axis. One would likely require feedback sensing from each and every such particle, which is a difficult task for even one particle, let alone millions of masking particles. The particle inertia would also require one to have a variable velocity as each particle is moved into place, in order to prevent positional overshoot and positional oscillations. This will greatly slow down the process. There would also be significant heating of the particles and of any gas as well as intraparticle laser scattering. Finally, the intraparticle collisions will develop interfering dust as well as variable particle mass and reflectance/absorption. On a positive note, a levitated particle provides all the benefits of a screen without the screen (except at the illuminated points). From an optical display-performance point of view, if one could do what this patent seeks to at video rates, then the optical performance would be quite good (with the caveats such that one still cannot do multiple particles along a given Z-scanline nor reliably pick up the particles). We ask the reader to keep in mind the optical benefits of "suspended" particles. There are no interconnects inducing haze or screen-induced dead zones. That, to us, is the value in this reference, not the unworkable implementation it teaches. Particles can make optically great voxels of inherently good contrast and brightness. However, any scheme that requires that each and every particle be individually custom optically-levitated (feedback involved) is untenable in terms of frame rate, cost, and complexity. Even without feedback it is probably untenable. Nobody has demonstrated the full lift-levitate-drop cycle on a purely optical basis without external aids even for one particle to our knowledge.

U.S. Pat. No. 4,640,592 to Nishimura et al entitled "Optical Display Utilizing Thermally Formed Bubble In A Liquid Core Waveguide". Essentially, these inventors build upon the prior art decorative static bubbled fibers and make new versions wherein the bubbles are not static but dynamic. By preparing a 2-D matrix of juxtaposed fibers with liquid bubbling capability, they create a 2-D dynamic display. They utilize the bubbles to redirect optical illumination into the viewer's eyes. The bubbles can most easily be formed by the use of a thin film heater that transfers heat into the adjacent or underlying liquid-filled fiber or channel. It is apparent that this approach should work at least in some modest manner in two dimensions, although no prototype is shown. There are, however, some issues which are not discussed in detail that could nullify or minimize the potential workability for reasonable frame rates. One needs to think about where the displaced fluid goes when one forms a bubble. The case of a lone bubble is quite different from 1,000 adjacent formed bubbles in terms of how much fluid needs to be displaced to somewhere and how quickly. Unless one provides a local displacement region at each bubble, then when one has multiple bubbles, one will have unique higher displacement demands controlling the time it takes to form (or make disappear) such bubble strings. This is not taught. Also, this technology will consume higher power compared to LCD and OLED technologies. We believe that the inventors minimized the abilities of conventional technologies and their expected (now-achieved) progress. These technologies have progressed greatly to high resolution and low power. Thus, the inventors present an interesting clever mechanism apparently usable at least for slow frame rates, but whose advantages, if any, over many competing lower-cost more power-efficient 2-D technologies (LCD, OLED, plasma, etc.) is unclear. Three-dimensional applications are not taught, and it is already known by prior inventors that trying to stack fiber optic layers in three dimensions is very difficult if the stack needs to be transparent in the off-state despite electrodes, heaters, etc. Nobody has ever built a transparent stacked 3-D display, where "transparent" means that there is negligible fog-like or diffractive interference with the images being presented and viewed. In any event, this reference is strictly a flat two-dimensional display.

FogScreen Inc.—The FogScreen™ product and The Walk-Through Fog Screen, University of Tampere, Finland, 2003. This is a clever two-dimensional screen for projection of images—largely advertisements—per FogScreen's stated marketing approach. Essentially, a roughly defined layer of fog is injected and carried between two adjacent layers of clear laminar downward flowing air. The downward squeezing laminar films of clear air keep the sandwiched fog layer at a pseudo-stable but non-zero thickness. Their fog is created, apparently, utilizing known ultrasonic water nebulizer or atomizer techniques. If the fog is made dense enough or the fog layer thick enough, one can approach useful screen opacity. In the normal pictured mode of operation, the fog consists of rapidly evaporating water droplets which do not wet an inserted hand. All of the photos we have seen of this display reveal that it is best viewed from directly in front in a darkened room. This is clearly because the screen has a non-zero thickness and if viewed from any nonzero angle, the image is badly defocused because of the screen's finite extinction depth. Obviously, if one made a heavy enough fog density in a thin enough layer, one could approach a thin screen; however, we expect that this will result in water condensation and variable opacity vs. height. Note that the downward flow is at relatively slow speeds (feet per second) in keeping with known laminar flow regimes. Thus, the technology is limited to static screens upon which static or video imagery is projected and which is viewed in the dark from directly in front (or from directly in back). The fog droplets are clearly and unalterably randomly located in space consistent with the definition of a fog. The core of the reference is the laminar-flow squeezed fog layer sandwich. The related art of visualizing laser and light beams (not images) in fogs and mists constitutes an industry of its own. Therein, mineral oil and glycol dispersed fogs are produced for stage shows, rock-concerts etc. The FogScreen™ is clever and will probably be a market success for advertising and public entertainment applications. It is not usable for any serious graphic purpose requiring true volumetric 3-D and good (computer or graphics type) image quality, resolution or walk-around capability.

f) Summary of the Prior Art for True 3-D Volumetric Displays

In terms of contrast and brightness, the rotating screen based e-beam/phosphor systems pictured in the Blundell book reference and of the type described in the rotating active-screen art above perform very nicely despite the fact that they only show relatively low resolution stick-figures or wire-frames. However, these systems are mechanically complex, very bulky, fragile, and must be of a multigun nature, and require further e-beam calibration development as shown by the second Blundell patent cited. CRT volumetric displays are also slow, being spot scanners.

In terms of video frame rate, co-rotating image projector/screen systems and stacked LCD panel projection systems cited in the above prior art should perform moderately well. However, stacked LCD systems must be extremely heavy and inevitably have a fogged or hazy appearance due to their nontransparent interconnects and layered interfaces, and we have never seen an actual prototype of a stacked LCD 3-D display. Co-rotated screen approaches with high-bandwidth data paths, as embodied by the Actuality Systems, Inc. product, probably represent the best current solution. However they are still of foggy hazy appearance due to the translucent screen always being in lines of sight and always having a non-zero effect on stray light, of limited contrast requiring near-darkness, lack of occlusion, and significant noise. It is not possible to judge the actual achieved resolution of the Actuality Systems, Inc. product from the images provided, but it certainly is not of conventional 2-D CRT quality in terms of contrast or resolution.

We have cited a few patents describing aesthetic and amusement devices that utilize suspended or falling droplets of water or other particles as the passive or active "voxels". We believe that such free-standing droplets or particles (solid, liquid or gas) offer the perfect voxel for a 3-D display from the optical viewpoint, provided that much much smaller particles can be better and much much faster spatially managed with much greater precision. The water related prior art has not succeeded here in obtaining the needed fusion frame rates nor reasonable resolutions akin to printing or 2-D displays because that was not their purpose and it was not possible anyway. None of those inventors claimed to try and do what the inventors herein have as their goal. This is a far more severe challenge than projecting upon a random slowly sinking fog in the FogScreen™ manner. The means of making and handling such droplet voxel entities in order to make a workable 3-D graphics display usable for applications beyond aesthetics and amusement has not yet been taught. Clearly, this is why such historical water-based 3-D or pseudo-3-D devices are characterized correctly as amusement or aesthetic devices by the inventors that conceived them. Despite this, they still provide aesthetic pleasure and amusement for those different markets.

Clearly, the generally available graphics electronics, optoelectronic components (digital light mirrors, solid-state lasers, super-bright LEDs, for example), firmware and software are progressing rapidly, as shown by the Actuality Systems, Inc. product, but the image quality is still obviously modest at best when viewed even under favorable darkness. Even the most basic low-end 2-D displays still have much much better image quality, partly because of their superior effective contrast, brightness and persistence and partly due to their better effective resolutions and lack of fog or haze. It is our intent, with the invention herein, to bring the technology of 3-D displays more on par with 2-D displays in terms of image quality. We believe that in order to do this, something fundamentally new is required.

We will discuss the subject of visual fusion herein repeatedly as it is an exceedingly useful and time-honored general approach to the visual integration of much displayable subject matter via, for example, the known mechanisms of visual/brain persistence. We stress, however, that one can use such persistence effects to not only depict moving objects, scenes and subject matter but in the dynamic refreshing of static objects, scenes or subject matter. Furthermore, some embodiments herein can display static displayable matter without such fusion-refreshment.

SUMMARY OF THE INVENTION

In this further filing, we teach a refined 3-D display technique which preferably utilizes flying or ballistic projection screens formed of emitted microdroplet "screen" arrangements. We preferably emit or create one flying or ballistic screen per image-volume frame and operate at 60-120 image-volume frames/second. Thus, we create 60-120 flying screens per second inside our sealed image volume. For each image-volume frame, as the screen rapidly flies across the image volume (at several to tens of meters per second typically), we preferably optically-project the appropriate slice by slice images making up that complete volume-frame on and into the flying screen as it rapidly passes through those respective spatial slice positions. The first advantage of this approach is very low microdroplet fluid consumption and associated recirculation costs and complexities. The second is that all orifices firing microdroplets can be commonly acoustically activated or fired thereby avoiding the need for individual orifice-switching which would increase cost. The technique requires the use of a very fast image projection means to project the object image sub-slices at the needed kilohertz and higher-rates. Digital micromirror SLMs, or spatial light modulators, have binary (black/white) frames/second bandwidths up to about 50 kHz—fast enough that some of that bandwidth can be applied to providing pulse-width-modulation colorization as it is for consumer products such as HDTVs and video projectors. The inventive displays can provide fine submillimeter resolution and solid-like images exhibiting useful degrees of occlusion. Prior-art issues of screen shadowing and display "fog" are avoided and a path to high-definition solid-like experiences is opened.

We now define some terms we will be using. The definitions are important because of the technology and its many permutations and the need to categorize them into an orderly logical set. Definitions are listed in logical order of importance to understanding. Note that because of the new technology herein, these definitions do not always fit or can go well beyond the conventional definitions as new capabilities are provided. The below definitions are to be used herein, unless otherwise stated that we are referring to conventional definitions.

DEFINITIONS

Voxel: A subunit of an imaging volume at at least one point in time. Typically, at least some, if not all, voxels will have at least one dimension on the order of a desired image resolution. Unique to the present invention, voxels may be allowed to vary in size and shape within a frame, from frame to frame, with time, or with subject matter if desired in the particular implementation. Unique to this invention, we populate (or depopulate) voxels with one or more particles that cause or enable contrast to be generated. Unique to this invention, voxels may be dynamically defined based on displayed subject matter, whether locally or globally. Unique to this invention, one may mix 3-D voxels and 2-D voxels (pixels) within the image volume. Unique to this invention, we can generate omni-directional or anisotropic contrast from a given voxel depending on the implementation.

Particle or Particulate: A localized or extended body or mass of material which can be spatially and/or temporally placed in, formed in, or passed through, at least a portion of an image volume comprising at least one voxel or voxel portion. One or more sizes or types of particles causes or enables contrast to be generated. A particle(s) may be distinctly defined or diffusely defined depending on the distribution and optical properties of the particle material at the voxel of interest at that point in time. The state or presence of particle(s) at a voxel site changes in order to change the voxel contrast. "Voxel particles" of a particular voxel are said to be spatially or temporally associated with that voxel's space, but not necessarily 100% contained within the confines of that particular voxel's space. Some voxel particles may be situated in two or more voxels (physically or temporally sequentially), for example. The particle may comprise any one or more of a solid, liquid, vapor or gas arranged in any spatial configuration, such as a liquid droplet, a gas-filled liquid bubble or an ionized or activated gas, molecule(s) or ion(s). A preferred particle herein is a liquid or otherwise flowable droplet. Droplets can have extended shapes, as can non-flowable solid or semisolid particulates. All manner of mixtures, emulsions, gels, suspensions, colloids, solutions, mixed phases, passive or active materials, multiphase materials, gases, atoms, plasmas, ions, molecules, and nanostructures are included in the scope of the present invention.

Particle or Particulate Emission: The process or either ejecting or releasing a particulate. Ejecting, for example, could comprise thermal jet ejection at a velocity or piezo-jet ejection at a velocity into an image volume. If ejection approaches zero velocity or the droplet or particulate enters or is created within the image volume ambient with negligible initial velocity of its own, we call it a "released" particle. Releasing could comprise the simple act of leaving the particle hanging in image volume space with no net velocity after formation, possibly only then to be influenced into motion by external fields or by flow of the image volume ambient itself. So if crossed laser beams create a particle at an image-volume point, we say that the crossed lasers both formed and released the particle at that point analogous to how a thermal jet both forms and ejects a droplet at the inkjet site. The significant difference here is the initial velocity. Any other process that controllably allows the particulate to become free or detached in or into an image volume is an emission process. As a last example, if a droplet which was wetted to an emitter is, via electrowetting effects, purposely dewetted from the emitter and allowed to move into the image volume, then this droplet is also said to have been released (emitted) into the image volume. In many embodiments, we utilize relatively high-velocity particles.

Ordered Particles or Particulates: Particles, usually a number of particles, which can be made to support the illusion of, or provision of, a projected or structured displayable three dimensional subject matter in at least one displayable frame, frame-portion or sub-frame, preferably at a frame-rate providing visual fusion, at least some such particles preferably, at some point, being spatially or temporally arranged in voxels which have at least one size-scale or dimension on the order of a required image resolution. The two main applications of ordered particles or particulates are as: a) screening surfaces (see below), and/or b) structured objects (see below). Ordered particles typically are physically and/or temporally arranged in a selected group of voxels in a sufficiently ordered basis that image-wise contrast is presented to the viewer. The term "sufficiently ordered" means at least having a resemblance to the desired image subject matter and not necessarily having all particulates within predetermined particular matched-up voxels with no individual exceptions. It should be obvious that in a spatial array of thousands, if not millions, of droplets, some amount of positional noise can easily be tolerated both with regards to within object droplet positions and frame-to-frame object positions. Thus our "order" is that which sufficiently gives at least the illusion of spatial objects seen/perceived at an approximate desired resolution at an approximate desired frame-rate.

Screening Surface: Any surface or apparent/perceived surface created by voxel particles upon or within which an image can be projected, written or drawn as by image projection, beam-scanning, beam-steering or even selective activation (to be discussed further). The most obvious is a rotating (or translating) flat screen akin to prior art (solid) passive screens wherein a conventional optical 2-D slice-at-a-time is projected. New by the teachings of the present invention is the additional or alternate use of a screening surface which comprises a physical replica of the object being imaged, made-up of particle-populated voxels, the illumination being either a 3-D corrected 2-D projection (so that it looks correct after falling on the curved surfaces) or, for example, a sequential red/green/blue frame-set of such replicas. This second method is somewhat akin to instantaneous stereolithography of an object "made" of an ordered particle fog or particle assemblage. Such surfaces have a thickness that is optically sufficient to provide the required contrast; thus, such thickness may incorporate one or many situated particulates. Such thickness may also be that skin thickness which light penetrates when falling upon a solidly structured object of particulates. By "surface" we mean a particle arrangement that at least gives the illusion/perception of a surface being present. The surface will likely be apparently opaque, translucent or even transparent. The simplest screening surface is a relatively flat screen for image projection or writing which is translucent or opaque. A second type of screening surface would be the seemingly solid surface of a red apple formed by droplets collectively forming the apple's shape and appropriate red lighting or image projection upon the curved apple surface.

Structured Object: Voxel particles can be used to directly shape or "form" an object to be displayed. For example, if a cone is being displayed, then it can be formed by a complete set of the required spatially placed voxel particles at one point in time as opposed to displaying multiple sequential slices of the cone. The former can be much faster than sequential slices and can result in improved brightness and contrast because of longer persistence. This approach is somewhat similar to vector drawing as opposed to rasterization. Many known technologies related to algorithms and formats for raster drawing and vector drawing are applicable and more new ones are expected. Structured objects themselves can be formed all at once, one or more shells at a time, or a layer (or slice) at a time, for example. In this manner, the drawing of such objects can be localized and one-at-a-time or many-at-a-time. The drawing of a structured object might be done, for example, without drawing or redrawing the entire image volume.

Contrast: this is the perceived brightness difference between voxels that are ON (activated or illuminated) and voxels that are OFF (unactivated or not illuminated). Such output is typically in the visible range and typically results either from the illumination of passive particles or the self-illumination or self-activation of active particles, or both. Contrast may also be provided by the masking or absorption effect of voxels, particularly "OFF" voxels, as, for example, when back-lighting is employed. In this approach, populated or "ON" voxels block light as opposed to produce light. In any event, contrast is a brightness ratio between light and dark regions of the displayed subject matter. Contrast helps differentiate image details.

Illumination: Optical energy which can be redirected (or directed) to (or away from) the eye by voxel particles at any point in the image volume, and most particularly at particular voxels of image interest. Illumination may be provided by halogen or arc lamps, strobe lights, solid-state lasers or flashlamps, scanned light beams, and projected image-wise optical information, for example. The present invention may utilize a wide variety of lighting, illumination, and activation schemes, including future 2-D display illumination schemes. Illumination may be blanket-illumination of all particle-occupied voxels, or may be illumination of only selected particle-occupied voxels. Typically, illumination is that light redirected or blocked by passive particulates, but strictly speaking, activation (see below) causes particulates to create their own self-illumination such that they can be seen directly. Illumination provides at least one of contrast or brightness.

Activation: Any energy or field applied to or exposed upon a voxel or its present or future particle-contents at any point in time or at any point in an image volume that results in a voxel particulate becoming beneficially visible/invisible or having its contrast or brightness changed. Strictly speaking, this even includes visible optical illumination (above), whether blanket or image-wise light is involved. "Activation" is, however, mostly used when the activating energy in not itself plainly visible, but the resulting voxel radiation (or masking effect) is visible as would be the case for an ultraviolet fluorescent dye particle that fluoresces in the visible after being exposed to invisible or hard-to-discern ultraviolet light. We describe such activated dye voxels as self-illuminated if they, at least in part, serve to produce their own contrast, even if it requires external UV irradiation. Activation may occur with or without outside irradiation or exposure to an energy field, laser beam(s), e-beam(s), etc. Activation could also generate or enable light generated by a chemical or electrophysical reaction which goes on in the particle, between nearby particles, or between a particle and the viewing volume ambient. Activation may be blanket-activation of all particle-occupied voxels, or may be activation of only selected particle-occupied voxels. Activation thus frequently involves energy conversion, energy pumping, or energy transitions among energy levels. UV fluorescing of a UV dye-containing particulate is one sort. Activation may be done before a particle gets to the voxel at which it is to be visible because there is frequently a time-delay between activation and responsive light output. Laser or e-beam directed atomic or molecular energy transitions in an appropriate gas or vapor is another sort.

Image-Wise: Image information is contained in one or more illuminations or activation exposure(s) and the act of the exposure makes image information available at the appropriate voxels causing or enabling appropriate contrast or brightness to be produced. The simplest example is a 2-D projected image upon a generally flat 2-D droplet-particle screen surface slice-at-a-time display. Another is projected imagery upon a structured particle replica of an object to be displayed, the projected imagery appearing in proper perspective after falling upon the irregular surface of the structured particle object. The illumination is typically visible but could also be invisible (as for image-wise or blanket UV).

Occlusion: The ability of a first object in front of another second object to obscure (hide) portions of the second object when the first front object is at least partly, if not totally, opaque. In this invention, for the first time, we can provide some occlusive effects. These occlusion effects make images more solid-like and less ghost-like.

Hologram: We use the conventional meaning herein. The unique twist is that we utilize one or both of (a) 2-D and/or 3-D particulate arrangements and/or (b) projected or written data upon one or more individual particulates to achieve a holographic effect. The advantage is that we can make thousands of these very rapidly therefor can comprehend the use of on-the-fly holograms. The computational load is considerable though. In this approach, one or more of our particulate arrangements are themselves acting as holograms.

Background Clarity: Prior art 3-D displays have been plagued by foggy and hazy appearances, particularly in regions where there is no image matter being presented. The displayed objects or scenes are immersed in and surrounded by apparent fog, which reduces contrast and resolution and creates a washed-out look. The fog has been significantly due to moving screens and to non-invisible electrodes and interfaces in static stacked displays. We refer to the background as image-volume, which is not intended to be involved in contrast production related to the displayed matter itself. Ideally, a 3-D display should be able to show an object hanging in a crystal clear background free of fog and haze. This has, until now, not been even remotely possible.

Image Volume Ambient (IVA): The residual contents of the image volume other than the intended particulates supporting beneficial image production. More specifically, the composition, pressure, temperature and any energetic, absorptive or emissive activity of any residual material, intended or unintended, not part of formed (before emission) voxel particulates. For example, this ambient could comprise a mixture of air and an unavoidable low vapor pressure of the droplet liquid. Alternatively, it could comprise only the droplet liquid vapor pressure alone. The ambient may change as a function of imaging activity and may even be purposefully manipulated to operational advantage. The ambient may serve to modulate particulate behavior or to recycle or distribute required particulate materials. The ambient may react or interact with particulates to support their integrity, their activation, their illumination, or their recycling. Particulates may or may not be comprised of IVA constituents. Particulates, in many embodiments herein, travel through the IVA at high speed, therefore causing the designer to consider turbulence and other hydrodynamic and fluidic flow phenomenon. This has not been a consideration of the prior art, not even of the aesthetic and decorative art we described. Typically, the IVA will have a low pressure below ambient for closed-volume displays. Particulates will be emitted into and across the low pressure image-volume. Inventive embodiments instead operating at or near ambient pressures will typically utilize streaming (flowing) air to entrain the particulates. In this streaming case, the particulates or droplets move with the air therefore are not broken up by turbulence.

Frame: We define a frame as an image at a point in time, typically a spatially complete image which may be illuminated or activated to make it visible. A conventional movie film consists of a reel of film comprising a temporal series of such complete images, one per frame. Prior art 3-D displays have used slice-at-a-time sub-frames that are sequentially shown quickly enough that by visual fusion, they cause a full image to appear (at one frame per screen rotation, for example). So in this case, sequential frames are really sequential subsets of sub-frames, each of which is only an image slice. Such a scheme, herein, would possibly use translating or rotating image-wise screens of particulate. However, if we utilize a screening surface comprising a structured object (see above definitions), then we may "draw" or create that complete set of particulates representing that whole object (such as a red apple) in one step. In this approach, the frame comprises one complete apple object as opposed to one slice of the apple object. Finally, and most importantly, since we have a massively parallel operational ability in our inventive displays, we may choose to mix both of the above two approaches such that different portions of the image volume are being refreshed in different manners. For example, the apple screening-surface object could be completely updated every apple frame, yet the rest of the surrounding image subject matter is updated with sequential temporal moving screen slices. This flexibility provides numerous opportunities to most efficiently apply graphics horsepower and droplet emitter bandwidth where it makes the most visual difference to the user. Generally, an individual sub-frame or frame is individually illuminated or activated, such as by a strobe light pulse or strobed slice-projection. Thus, note that a single image volume could have both slice-at-a-time frames and object-at-a-time frames mixed together. It is also possible to have slice-at-a-time objects, which are also included in the scope of the present invention. These are a sort of clipped (to the object shape), typically flat, projection screens that depict objects as sequential slices.

We herein provide a separate Appendix and background-review that contains numerous references and commentary covering the broad and historic art of droplets, particulates, aerosols and sprays across a number of industries. If the reader is not already familiar with inkjet technologies (uncharged and charged droplets), Taylor Electrospray tips and electrical pumping of fluids in microscopic channels, we urge a review of this material. In short, there are a huge variety of things that can be done to physically manipulate particulates, in terms of creating them, launching them, and controlling or affecting their motions, lifetimes and optical properties. To date, these technologies have not been applied to 3-D display technology for our purposes.

It is critical to note again that we do not always have a one-to-one mapping of designated particulates to designated voxels, unlike prior art 2-D displays, for example. As another specific example, a flat screening surface for image projection herein need only be flat and have some opacity. It may not be critical how the droplets within the thickness of that screen are arranged on particular voxels. They can be randomly arranged within the screen thickness in many cases and the screen is still suitably opaque or translucent. However, in the case of a screening surface which is a structured object, say a red apple, the voxel locations of the particulates representing at least the apple surface are important, at least relative to each other, in order to present the proper shape within each frame or subframe. Furthermore, in many of the embodiments herein, we have particulates passing through hundreds of voxels before they get to the voxel of interest where they are at least then made visible. Thus, we stress that herein voxels are simply a convenient way of describing locational portions of an image volume at a point in time when it is useful for describing how particulates are arranged in space and time.

Our flying projection screens can be made nearly opaque or translucent such as by manipulating micro-droplet size, density and spatial texture and/or the brightness of illumination which affects intraparticle light-blooming. In that manner a designer can decide whether projected images appear on one face of the screen or on both faces. Of course multiple projectors may also be utilized such as if different images or mirror images are projected on the opposite screen faces.

DETAILED DESCRIPTION OF THE INVENTION

Figure 1A:
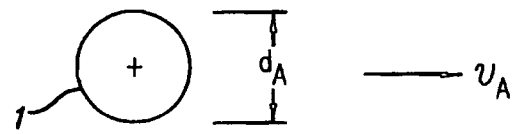
FIGS. 1a-1g schematically depict droplets, micro-streams and micro-sheets.

The most important aspect of the invention is the use of microjet-emitted particulate material, in a variety of possible compositional and geometric-shaped forms, to provide one or both of two things:

1) Screening Surfaces

We form, for at least transitory moments, screening surfaces comprising the particulate material, the surfaces having images projected or written upon or within them, or activated upon or within them. In a first case, a screen is most easily thought of as a flat 2-D thin film, layer or slab of spaced or touching particulates or particulate material, which could even be similar to prior art flat or helical moving screens in shape and translational or rotational motion. The third depth-dimension is provided by moving or incrementally recreating the screen such that the appropriate changing sectional slices of the 3-D image can be shown in rapid sequence in the generally known manner. Moving can be done by emitting new particulate in new positions or by the emission velocity itself, depending on the configuration. Images can be projected or written as 2-D images or as scanned beamspot(s) or scanline(s). Screens can also be curvilinear and are not necessarily physically continuous nor of fixed or constant physical or optical thickness. A screen could also comprise a section of a displayed structured object (thereby being possibly smaller than an image volume height, width or depth dimension) or may comprise a shell or skin of such an object. Several screening surfaces may be present within a frame. They may be simultaneously or sequentially projected upon or activated by one or more cooperating or independent projectors, illuminators or activation means. Screening surfaces, and particularly large image-wise flat or nearly flat projection screens, may have physical connection to the display device and do not necessarily have to be temporally free-standing. As an example, a large projection screen could be continuously emitted from a linear array of droplet emitters in the form of separated droplets, melding droplets, string-like droplets, or as a continuous unbroken extended film of droplet liquid as by using a slit-type film emitter.

In this disclosure screens are preferably flown or ballistically passed across the image volume one screen per image volume. As each such screen flies across the image volume through the various sub-slice positions we rapidly project the appropriate image sub-slices at it preferably using a digital micromirror chip or spatial light modulator (SLM). The screen may be formed to be opaque or translucent depending on whether image information is to be also passed through the screen thickness or whether the screen is substantially opaque and uses one projector on one face or two projectors with one on each face. The flying screens may be flat, faceted or curvilinear in overall shape for example. The screen may have an optical thickness comprising one or several particulates-such as multiple layers of droplets.

2) Structured Objects

We form, for at least transitory moments, objects (or portions or slices thereof) or replicas of objects to be displayed. For example, if we were to display an apple this way, we would construct a spatial arrangement of particulates that have the shape of at least a portion of the apple. That shape, or replica, is caused to create or modulate contrast or brightness, either by external lighting and/or by self-illumination activation. We can optionally do this all at once, as opposed to sequentially providing individual slices of the apple. So, in effect, we can optionally create a pseudo-solid spatial model of the object every frame, as opposed to an apple slice every frame. External lighting may take the form of strobed solid-state lasers, flashlamps or image projection, for example. For image-projection, we can project an image which falls upon the particulate object in suitably good focus despite the object portion possibly being non-flat. This image projection may be 2-D image-wise projection or may be in the form of a scanned beam-spot(s) or scanline(s). Digital Light Mirror (DLM) systems are particularly capable of contributing to either or both of these. Objects generally have a shape and size that relates to a corresponding object in the displayed subject matter, or have a slice or shell structure. Going back to the apple example, we could provide a hollow shell of an apple which, from the outside of the apple, appears to be an opaque or semi-opaque solid apple if the shell thickness is sufficient to give some degree of apparent opacity. Thus, we emphasize that our particulate objects can merely be shelled surface representations of the real displayed object subject matter. Our objects can also be solids (nonshells), strings or even discrete ordered or semiordered arrays of particles. Finally, we also teach the use of random arrays or local fogs of particulates useful for certain display purposes. In the apple case, we could "fill up" the apple object's interior with random (or nonrandom if diffraction effects are not a problem) particulates if we did not need to see inside the apple, or we could alternatively depict every seed and worm in detail if we wished to see inside the apple.

The next aspect we emphasize is that the display has the ability to create, form (and even form in place, in some embodiments) or arrange large numbers or amounts of the particulate material within the image volume with one or more spatial and temporal accuracies on the order of a desired resolution, preferably at a frame rate that allows for fused motion to be apparent. So, for example, we might have a two dimensional array of "inkjet"-like droplet emitters, each emitter individually and independently capable of emitting droplets with precise timing along precise trajectories. We will teach a variety of methods for such creation or emission. They generally utilize MEMs (Micro-Electro-Mechanical) or other micromachined or microformed emission devices in order to attain the required precision of operation. This is somewhat akin to the making of inkjet printheads, but is dramatically different than designing the plumbing for a decorative water-fountain.

Emission of structured objects in the form of droplet arrangements requires that the emitters be drop-on-demand (DOD) as they don't all fire at once and need to be switched. This incurs added cost and complexity. However very very high image quality and contrast can be attained because depicted objects are hanging in space alone without adjacent unilluminated screen droplets. We can avoid the need for drop-on-demand operation by emitting screens all at once and rapidly projecting the sub-slice images as the screen flies through the image volume. In that case, we merely emit one or more droplets from all the orifices, the one or more droplets defining the screen thickness. This is far more inexpensive.

Now, moving to FIGS. 1a-1g, there are depicted a wide variety of shapes that the particulate material might take. FIG. 1a depicts a small spherical particle 1 having a diameter $d_A$ and moving with a velocity $v_A$. We might utilize such a liquid droplet particle of a diameter of, say, 25 microns or 75 microns, to serve as the particulate we place in a voxel to activate or deactivate the voxel. The liquid might be, for example, water or a fluorocarbon liquid. It might be transparent, translucent or opaque, depending on the mechanism of optical interaction we desire with it. The FIG. 1a droplet of liquid would have an apparent optical size on the order of the required image resolution. Note that the apparent optical size may be considerably different than the physical size. Thus, small droplets can have large optical effects, especially if they are brightly illuminated. Droplet 1 may have been ejected by an inkjet-like emitter with an initial velocity on the order of $v_A$. Note that in these figures, we are not yet defining direction relative to the display volume. Droplet 1 is moving with velocity $v_A$ in a manner such that turbulence forces with the image-volume ambient are low enough that it is not ripped apart. In some of our implementations we therefore operate the image-volume at reduced pressure. Droplet 1, like other particulates herein, may be simply emitted or may be emitted and then subsequently acted upon as by field-induced acceleration or steering forces.

Figure 1B:
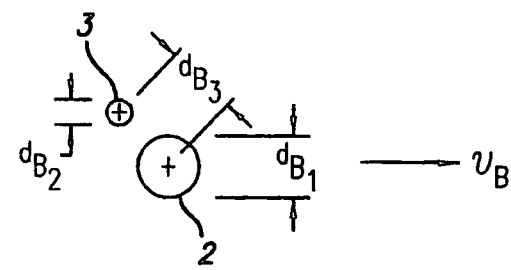

FIG. 1b depicts what we will call a compound or dual particle. Shown are two particles, namely, particle 2 of diameter $d_{B1}$ and particle 3 of diameter $d_{B2}$. They are collectively moving with velocity $v_B$. Note that they are separated at this moment in time by dimension $d_{B3}$. In this example, the larger droplet 2 could be 75 microns in diameter and the smaller droplet 3 could be 25 microns in diameter and the gap between them could be 30 microns. Those familiar with inkjet technologies will be aware that the phenomenon of satellite droplets often occurs wherein, although one may desire a single droplet, one actually sometimes gets a parent droplet and a child droplet as shown. In any event, we would place particulate or droplet set 2, 3 of FIG. 1b at a voxel site in order to activate (or deactivate) the voxel in question. We include in the scope of the invention the use of such unavoidable as well as, alternatively, purposeful droplet arrangements.

Figure 1C:
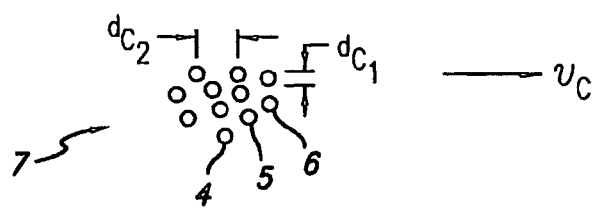

Moving now to FIG. 1c, there is shown an array 7 of particles such as 4, 5 and 6, each of typical diameter $d_{C1}$ and typical separation distances $d_{C2}$. This particle assemblage is moving collectively with a velocity $v_C$. In this example, we have a local "microfog" or cluster of droplets whose overall dimension is on the order of one or several voxel dimensions. Thus, when the assemblage 7 occupies one or more voxel site(s), it can change the contrast of the voxel(s) beneficially. There are at least two ways, which we will later discuss, to achieve the assemblage 7 of FIG. 1c. The first is multiple closely timed and closely spaced droplet emissions to create a bunched assemblage as shown. A second way is to emit a single droplet that fragments at a point in time during or after emission, for internally-applied and/or externally applied reasons.

Figure 1D:
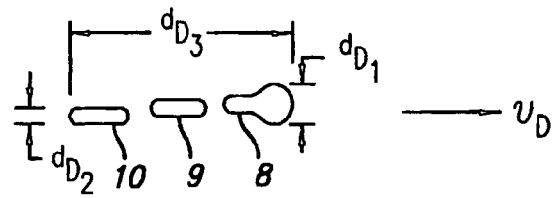

Moving now to FIG. 1d, we see a droplet 8 with two trailing droplets 9 and 10 moving with a velocity of $v_D$. Droplet 8 has a diameter $d_{D1}$ and droplet 10 has a diameter $d_{D2}$. Droplets 8, 9, and 10 are stretched out over the dimension $d_{D3}$. Such an arrangement of droplets could also serve to change the contrast of one or more voxels. This particular arrangement could be, for example, that of a primary droplet and two intentional or random satellite droplets in their early stage of formation. Such stages of droplet and satellite droplet(s) formation are widely known in the inkjet art. We note at this point that droplet formation and motion is a statistical phenomenon and that our designs fully intend to take advantage of such known statistical distributions to achieve predictable contrast. In other words, it is not-at-all true that unless every particle travels a perfect known trajectory at an exact time that a product cannot be designed. To first order, there is a Gaussian distribution of velocities and trajectories, and the designer's goal is to maintain these distribution widths to levels that do not impact perceived resolution or contrast. Typically, but not always, the statistical distribution along a particular axis will be controlled in terms of its size relative to the desired resolution on that axis.

Figure 1E:
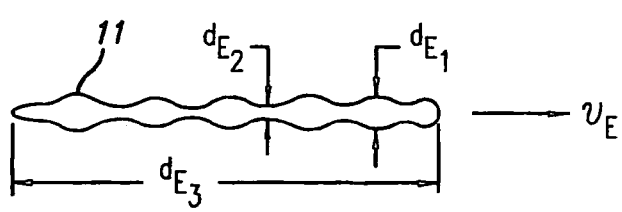

Moving now to FIG. 1e, we see a long string-shaped "droplet" 11. Droplet 11 has a varying diameter between $d_{E1}$ and $d_{E2}$ and a length $d_{E3}$. Droplet 11 moves with a velocity $V_E$. This is the known shape of a continuous stream of liquid as it exits a jet. The undulations in diameter are because the string is in the process of separating into separate droplets at the points of minimum diameter, even as it moves to the right. Surface tension makes the string shape unstable relative to separate droplets. Factors which slow the string breakup are known and include high viscosity, low surface tension, and minimization of drag and turbulence perturbations. Obviously, string droplet 11 could serve to affect the contrast or brightness at one or more voxels. Means of causing regularly-spaced periodic necking instabilities by vibrational excitation of the emitting jet are widely known in the microfluidics and inkjet printing fields.

Figure 1F:
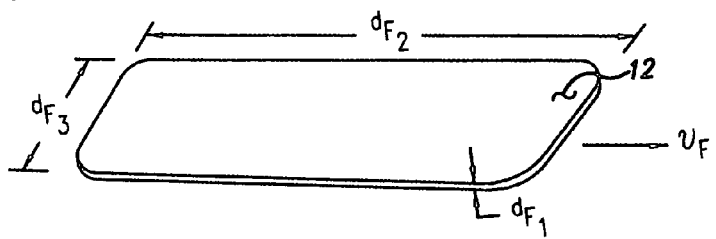

Moving now to FIG. 1f, we see a film 12 of droplet material that has dimensions of $d_{F2}$ length by $d_{F3}$ width by $d_{F1}$ thickness. The film 12 is moving with a velocity $v_F$. Droplet film 12, in a first embodiment, would have a lateral dimension(s) on the order of one or more voxels and would thereby be utilized to affect the contrast of such one or more voxels. In the case of film 12 being a single voxel droplet film, the voxel is occupied with a tiny plate-like droplet whose thickness $d_{F1}$ may be considerably less than a voxel dimension. So, for a single voxel application, film droplet 12 might, for example, be 75 microns long, 20 microns wide, and 2 microns thick. A film droplet 12 may be formed by pulsed emission from a slit jet. Alternatively, it could be formed by colliding separate droplets which meet or condense or wet together. Droplet 12 could also have a dimension on the order of several voxels that are all to be activated. We should mention at this point that the droplet fluid may have anisotropic physical properties and/or dynamically changing physical properties. For example, the droplet fluid might comprise long meltable polymeric molecules. Thus, we anticipate cases wherein droplet shapes such as that of FIG. 1f will be possible for at least transitory periods. As an example, a temporarily solidified particle or a very viscous low surface-tension particle 12 could hold such a metastable shape.

Figure 1G:
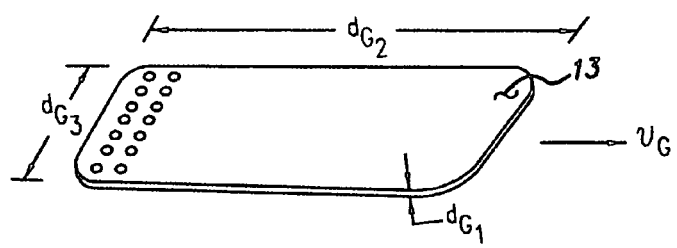

Moving now to FIG. 1g, we see another film droplet 13 having dimensions $d_{G2}$ length by $d_{G3}$ width by $d_{G1}$ thickness. The film droplet 13 is moving with a velocity $v_G$. It will be noted that this film droplet has perforations or holes in it, the type of holes that would be expected for a film droplet in the process of being formed by merging, colliding and cowetting individual droplets. The overall dimensions of the film could be as for FIG. 1f.

Although we have used solid and liquid droplets and particulates as examples above, we stress that we include in the scope gaseous or vapor bubbles and regions of activated or ionized gases in a parent gas, liquid or solid body, such as a gas-based image volume ambient that has local spots ionized or activated by an e-beam(s) or laser(s). The placement or locational requirement for a particulate is simply that it provides or enables contrast or brightness and can be predictably placed or predictably found at least on a statistical basis, in a desired location at a desired time.

Before proceeding further, it is important to note that the shown velocities are average velocities, that is, different portions of the droplet might be moving at slightly or substantially different velocities (or directions) such that the droplet is dynamically deforming or forming via the assemblage described above. The average velocity is also that at a particular point in time. We will describe numerous situations wherein droplet velocity varies at least with time for a given droplet. We also emphasize that the droplet motions may include any or all of translational velocities (shown), rotational velocities, vibrating surface or bulk droplet waves, internal oscillations, and condensing (assembling) or exploding (disassociating) droplets. It will also be noted that we teach these droplets to be optical components, meaning that they are not necessarily just omni-directional scatterers or emitters, but may display beneficial anisotropic and/or isotropic optical behavior due to droplet motions, orientations, or surface waves or by the fact of the particular selection of droplet material optical properties. In particular, it should be obvious that the optical behavior of film droplets 12 (FIG. 1f) and 13 (FIG. 1g) will be highly anisotropic as compared with droplet 1 (FIG. 1a), for example. Even the droplets of FIGS.

1a and 1b can be made optically anisotropic as by known deformations induced by drag. We expressly include in the scope of the invention any beneficial optical effect that can be reproducibly provided (at least on a statistically useful basis) by manipulating any aspect of droplet liquid selection, droplet size and shape, droplet oscillations or deformations, droplet-charging, emission technique and in-flight influencing or activation techniques if they are used. In-flight influencing could comprise acceleration, steering or disruption or disturbance using electrical fields or magnetic fields, for example. In-flight influencing could be for controlling droplet positioning or for clearing out residual droplet materials before a new cycle of droplets is emitted. By "reproducible", we mean the effect, at least when averaged over many droplets, is statistically repeatable in terms of being satisfactory to the observer. The reader is encouraged, if not familiar with droplet optics, to consult the Appendix hereto. It is known that the optical behavior of droplets varies depending on the droplet size relative to the optical wavelength, for example. Droplets may also act as diffractors and/or reflectors akin to certain rainbow behavior. Droplets may also act differently when the phase or polarization of the optical energy changes, especially if the droplet composition material has polarization-dependant properties. Active droplet materials may re-emit incoming activation or illumination energy, such as by phosphorescence, fluorescence, lasing or undergoing energy-transitions.

We also emphasize that we are focusing on flowable droplet materials because they are the most easily recirculated, but the scope of our particulate definition includes any material that can offer contrast or brightness or contrast or brightness modulation, including solids, vapors and gases. As an illustrative example, it is known that laser dyes that fluoresce under UV radiation can be placed into solution in a variety of carrier liquids or solids. So our droplet might, for example, comprise a clear fluorocarbon liquid or hydrocarbon in which is dissolved, entrained, mixed or suspended a liquid or solid laser dye. We anticipate the field of droplet materials development for different display applications and products to be as rich as that of ink development for inkjet printers.

As we move to FIGS. 2a-2h, we remind the reader that so far through FIGS. 1a-1g, we have concentrated primarily on the formation of particulate or droplet bodies which can serve to beneficially affect contrast or brightness at one (or more) voxels. Thus, so far, the bodies have preferably had a dimension which bears a relation to a voxel dimension, for example, 1 voxel long or 3 voxels long. In general, the droplets of FIGS. 1a-1g will, at least, at some point, be freestanding (self-contained and separate) in the image volume with a velocity of zero or greater, typically greater than zero. However, droplets with retained attachment to an emitter or any other image volume surface, for example, are within the scope of the present invention.

Now moving on to FIGS. 2a-2g, we show how such particulate or droplet formation and placement techniques can be used to form a variety of screening surfaces, some or all of which may even be implemented as structured objects, as opposed to macroscopic flat or curved projection screens.

Figure 2A:
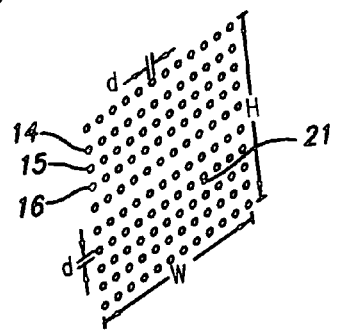
FIGS. 2a-2h schematically depict screens, both flat and curved, based on the droplets, microstreams or micro-sheets illustrated in FIGS. 1a-1g.

Starting with FIG. 2a, we see a 2-D array 21 of droplets such as 14, 15, and 16 of diameter d forming a macroscopic flat projection array-screen 21 of height H and width W. In this particular example, height H and width W encompass several, if not hundreds or thousands of voxel locations populated by droplets. For argument's sake, say that the array 21 in FIG. 2a contains 1,000×1,000 droplets (far fewer shown for simplicity), ordered generally in the plane defined by dimensions H and W. Further, for argument's sake, assume that H=10 inches and W=10 inches. H is the height of the image volume and W is the width of the image volume. This means that we have 1000/10=100 droplets per inch or about 4 droplets per millimeter and one million total droplets in screen 21. Thus, array or screen 21 is a projection screen that can be moved in its orthogonal axis upon which an image of up to 10 by 10 inches can be projected or written. Obviously, the screen 21 does not have to be flat (as shown), but flat or modestly curved is preferred if one desires to sweep out a large image volume portion in 3-D. The diameter d of the droplets such as 14, 15, and 16 making up the array 21 might be, for example, 50 microns. Note that this leaves a space between droplets. However, recall that a droplet's optical apparent size can be substantially different than its actual size. Furthermore, while we show one "layer" of droplets making up array 21, we could also introduce a second, third or fourth layer (not shown) and stagger the droplet positions from layer to layer such that a more complete physical opacity and/or optical opacity is achieved. We also emphasize that it is well-known and expected that regular patterns of features such as arrays or ordered droplets can create angle-selective optical effects akin to crystallographic diffraction. We expressly incorporate in our invention the utilization of a degree of randomization in order to avoid such phenomena for cases wherein those phenomena are not of benefit. In some applications, they may be of benefit and such order will be implemented. Randomization can be introduced purposefully, such as by staggering droplet ejection times or angles or such as by default wherein the droplet time-of-flight invariably incorporates a Gaussian (to first estimate) noise level of positional error, as is explicitly taught in the Orme' solder-ball droplet references included in the Appendix hereto. We expect randomization can also be introduced via droplet size variations, droplet shape variations, droplet oscillation-mode variations and even droplet charge variations (if charged droplets are used) as further examples. Droplets arranged on an orderly grid which do produce crystallographic-style diffraction or other angle-selective phenomenon may also purposely be used to advantage. A perfect example of this is modeling of crystallographic structure using our inventive displays wherein droplets can represent atoms or molecules on a crystal lattice. We explicitly note that our displays may be beneficially utilized to model and/or predict crystallographic X-ray diffraction, which would be a great help to molecular biologists, for example. In this narrow application, one might utilize an illumination or activation beam whose primary purpose is to simulate the incident X-ray and this beam might even be outside the image volume.

Moving back to the general applications, just as easily screen 21 could be a structured object (say our apple example) which serves as a screening surface. Upon the apple shaped object 21 (not shown as an apple surface-shape), we would project an image-wise or beam-written image of the apple such that it is preferably in focus everywhere upon the curvi-linear apple (object) surface or surface-portion.

Finally, we could have a screen 21 as shown, upon which an image volume slice of H×W dimensions is projected and separately a screening surface (not shown) comprising the apple object. These could be refreshed in sequence, in parallel, together, or in some interleaved manner. Using the invention, there is substantial flexibility in utilizing the particulates as screens and/or object surfaces/slices, perhaps even simultaneously in the same image volume.

Figure 2B:
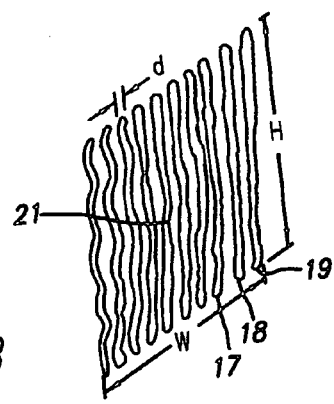

Moving now to FIG. 2b, we see another macroscopic H by W screen 21. Here the flat (shown) or modestly curved screen surface comprises an array of strings or ropes of droplets 17, 18, 19 each much like droplet 11 shown in FIG. 1e. The strings 17, 18, 19 are of average diameter d and length H.

They are spaced periodically or semi-randomly along the W dimension. For argument's sake, the strings 17, 18, 19 could be distributed at about 1 to 4 strings per millimeter along the W dimension. We note that the strings may also be arranged to have varying pitch along W and may also not necessarily be straight. Again, the dimensions H and W might comprise a complete section of the image volume or might comprise a smaller portion represented by an object being displayed.

Figure 2C:
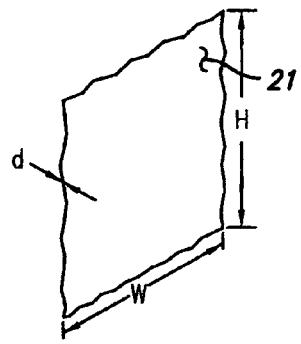
Figure 2D:
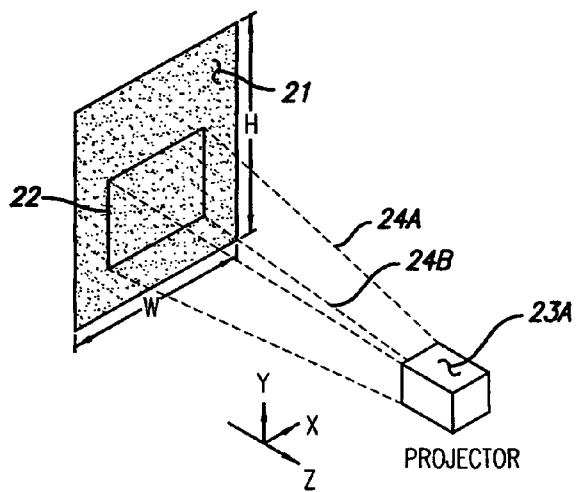

Moving now to FIG. 2c, we see the logical next step, a screen 21 of thickness d and H×W dimensions, but which is now a continuous (shown) or near-continuous membrane or sheet 21 of droplet (liquid shown) or particulate. One method of forming such a continuous sheet involves direct membrane formation via ejection from a slit or slit-like orifice; another method involves the post-ejection coalescing or melding of independently ejected droplets. We wish to emphasize that we are showing in many of these droplet figures droplets which are physically closely spaced, if not merged. One needs to remember that, because physically separated droplets can have an apparent optical size larger than their actual physical size, the eye will perceive a "continuous" sheet even before the sheet 21 is truly physically continuous. The point here is that there will be embodiments wherein closely spaced but physically separate droplets or particulates appear to comprise "continuous" surfaces, whether they are screen surfaces or object surfaces or slices. We also note that such surfaces may or may not be arranged to have ordered or random particle positions within the surface.

Moving now to FIG. 2-D, we depict more accurately what a 1,000 droplet by 1,000 droplet screen surface 21 might look like. We show a projector means 23a, say a DLM-based means, projecting an image of a square frame 22 upon screen 21. The projected image in transit can be seen by phantom lines 24a and 24b, for example. The projector is projecting, for arguments sake, a slice of a cube's surface. Thus, additional sequenced screens (not shown) similar to screen 21 would be sequentially positioned along the indicated Z-axis in rapid succession in order to receive their appropriate slice images, all of the images being temporally fused by the viewer into the full cube. Preferably, projectors of the type 23a are at an angle of from 0 degrees to approximately 45 degrees to the screen. Keystone and other image corrections for non-orthogonal projection (or beamwriting) are widely known and can easily be implemented. It will be recalled that the Actuality Systems, Inc., Perspecta™ product involves 45 degree projection with multiple corrections. An intrinsic advantage of 45 degree (approx.) projection is that the projector can be placed to the side so that it does not block something important, such as the viewer's vision or the travel-path or our particulates.

Figure 2E:
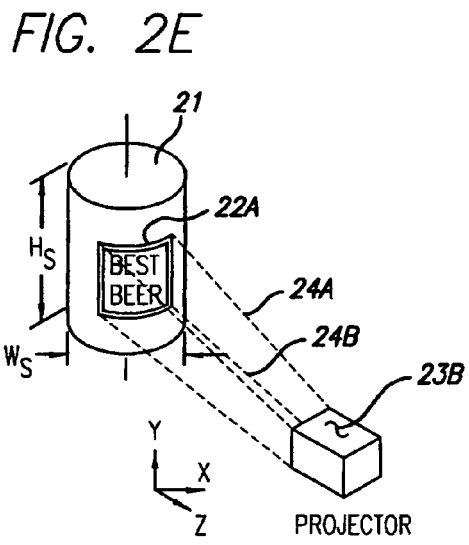

Moving now to FIG. 2e, we explicitly show a screening surface 21 that is a structured object. The object 21 is a beer can of height $H_S$ and diameter (width) $W_S$. An image projector or writer 23b is shown projecting or writing an image of the beer can label 22a on the surface of the structured object (can) 21. Obviously, projector 23b and/or other projectors could project the remainder of the can in sequence or simultaneously (not shown). The main point here is that our "projection screen" here is a curved screening surface 21 which is really a structured object 21 which is in turn a beer can that we wish to display in three dimensions. The structured object 21 could be constructed all at once in droplets as shown. Using the foregoing screening methods, such as that of FIG. 2-D, for example, one could likewise choose $H=H_S$ and $W=W_S$ such that a sequence of sectional images is shown by flat screens no bigger than the beer can dimensions. In other words, the slice-at-a-time paradigm can be applied at the object level or the whole-object-at-a-time paradigm (shown) can be applied at the object (beer can) level. In this case, $H_S$ and $W_S$ could be smaller than the image volume height and width, that is, the beer can easily fits inside the display at whatever magnification or scale it is being shown at.

Figure 2F:
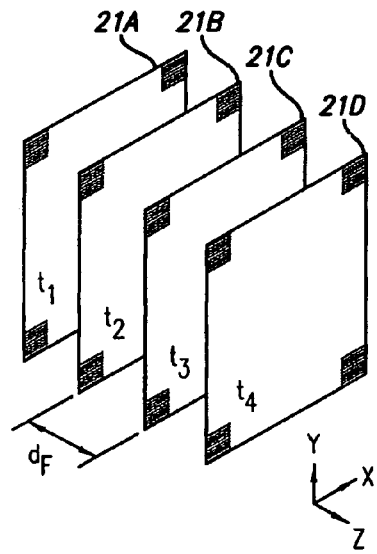

Moving now to FIG. 2f, we see a group of four (4) macroscopic, relatively flat, screening surfaces 21a, 21b, 21c, and 21d. Each of these might have, as per the previous example, 1,000×1,000 droplets. Noted on each of the screens is a time $t_1, t_2, t_3$ and $t_4$. What we are showing here are four sequential screens being formed along the Z-axis at different times $t_1, t_2$, etc. In reality, all four would unlikely be totally visible at one time and they would appear individually or with some temporal overlap with their neighbor. A projector (not shown) also arranged, for example, on the Z-axis, could project appropriate slice images upon this moving screen 21a-21d. We note the interscreen gap $d_F$. This gap is shown to be of large exaggerated size. In reality, this gap would probably be on the order of the Z-dimension of the resolution voxel so as to maintain image resolution along the Z-direction. We again emphasize that each screen 21a, 21b, 21c, and 21d may individually incorporate randomization or ordered features previously discussed and may each incorporate multiple-droplet "layers". In any event, the screens would be arranged to have an individual thickness dimension of from approximately one droplet diameter to several or tens or hundreds of droplet diameters, for example. Again, within this confine, the droplets may be randomly ordered such that one cannot even discern the individual droplet sublayers within each screen. In other words, if the screen averages 5 droplet diameters thickness, that does not mean that one should see five (5) distinct droplet layers when looking at the screen on-edge. Rather, one would see that the average thickness is about 5 droplets thick. A likely implementation would have a screen of 3 to 100 droplets thick fired from N rows of emitters simultaneously. The N active rows would be scanned across the Z-dimension such that a given emitter row may fire several times as the multirow-thick screen passes.

Figure 2G:
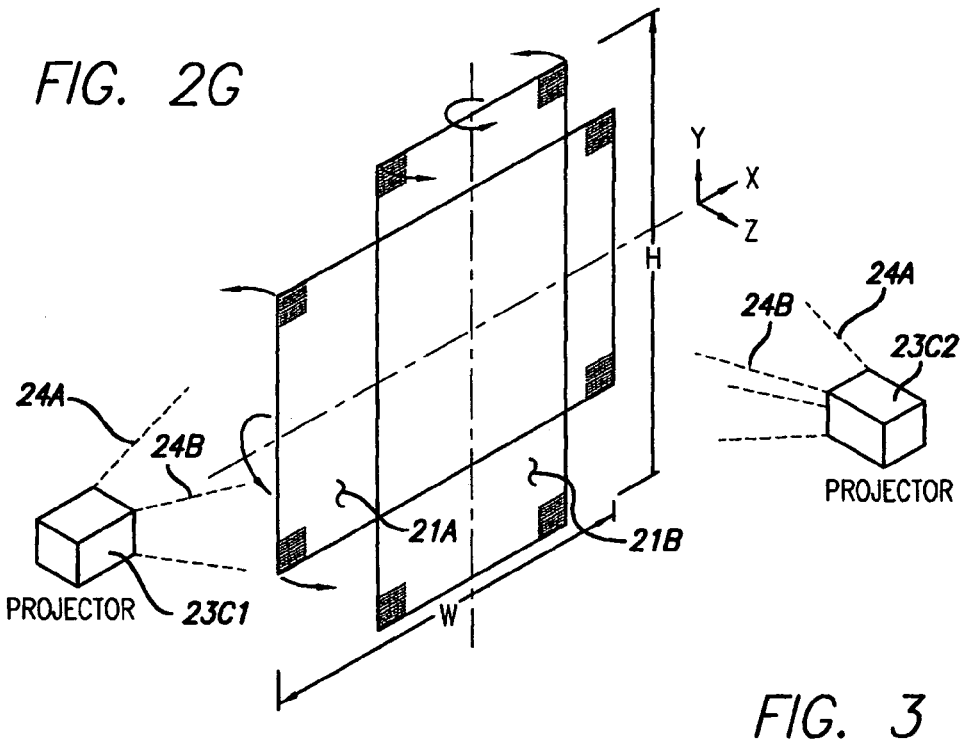

Moving now to FIG. 2g, we see two macroscopic screening surfaces 21a and 21b. We note that screen 21b is shown rotating around the Y-axis and screen 21a is shown rotating around the X-axis. Shown are two projectors 23c1 and 23c2. Projector 23c1 is favorably arranged to project images or write images upon rotating screen 21b. Projector 23c2 is favorably arranged to project images or write images upon rotating screens 21a and/or 21b. The point here is that we can have multiple screens and multiple projectors as well as (not shown but known in the art) multiple projectors per screen. Unlike the prior art, however, our screens 21a and 21b can be arranged to rotate "through" each other because they are co-moving droplet arrays at a point in time and not solid screens across time. What this freedom means is that the screen can have any convenient or advantageous shape and that shape may change within a frame or from frame to frame. Assuming screens 21a and 21b are to be rotating (or translating) through each other (either simultaneously or sequentially), this could easily be achieved with a 2-D array of droplet ejection means and appropriate time gated emissions therefrom. One must appreciate that the screens have the appearance of rotating, but they are not really rotating; rather, they are being re-created at each new position in a vision-fused manner. (As a further level of complication, one could in fact emit a rotating screen by varying emission velocity across the display volume depth.) The designer has numerous "knobs" to manipulate to get the desired effect.

As a final twist upon the rotating screens such as 21a and 21b, we note that one may impart a velocity to the droplet ejection means itself. Say, for argument's sake, the droplet ejection means (not shown) is a linear 1-D row of emitters that can be mechanically rotated as a whole about its own center. If the droplet ejection velocity is not hugely larger than the rotational tangential velocity, then the droplet screen will be of a helix shape at any instant. Obviously, a 2-D array of droplet ejectors could emit a helix without any movement of the droplet ejector means. Thus, we emphasize that the invention supports a plethora of screening surfaces, many of which are impossible with the prior art. Some of these require 2-D arrays and some do not.

Note that our screens of the type 21a and 21b can be much thinner than conventional solid-material rotating screens and can incorporate all the improvement measures solid screens have historically incorporated, such as tapered edges, if necessary. Droplets have an ability to scatter at considerable angles, thereby allowing for good off-axis performance.

As a last comment on the screens or screening surfaces of FIGS. 2a-2g or of the invention, we emphasize that screens may have a physical connection to an emitter (or collection) means. For example, the liquid film screen of FIG. 2c could be continuously emitted from one or more slit-shaped jets or orifices. The slit-orifices could be stationary and switched or could mechanically move, either or both such that the screen can be moved. By analogy, consider the image of water flowing over a dam. The falling water film (whether continuous or not) is connected to the water source (the river above) and the water collector (the river below). In this manner, a screening surface might not ever be freestanding. "Connected" screening surfaces are of fundamental value to the invention. Two new reasons for this are: a) we can direct light or other electrical potential or current into or onto a connected film from one of its connected edges, and b) we can direct energies into the connected film which benefit the stability of the film. Item (a) could be used, for example, to optically polarize the screen if the screen fluid is electrically polarizable. Thus, the screen can become an active electro-optical component. Item (b) could be used, for example, to mechanically stabilize the film in a case wherein we pump acoustic waves into the film edges, which serve to resist the necking-down of the film and subsequent rupture of the film. Such acoustics could, for example, be a wave train whose nodes scan lengthwise along the film length such that maximal anti-necking pressure is experienced most highly at thinning regions. Thus, we have included FIG. 2h.

Figure 2H:
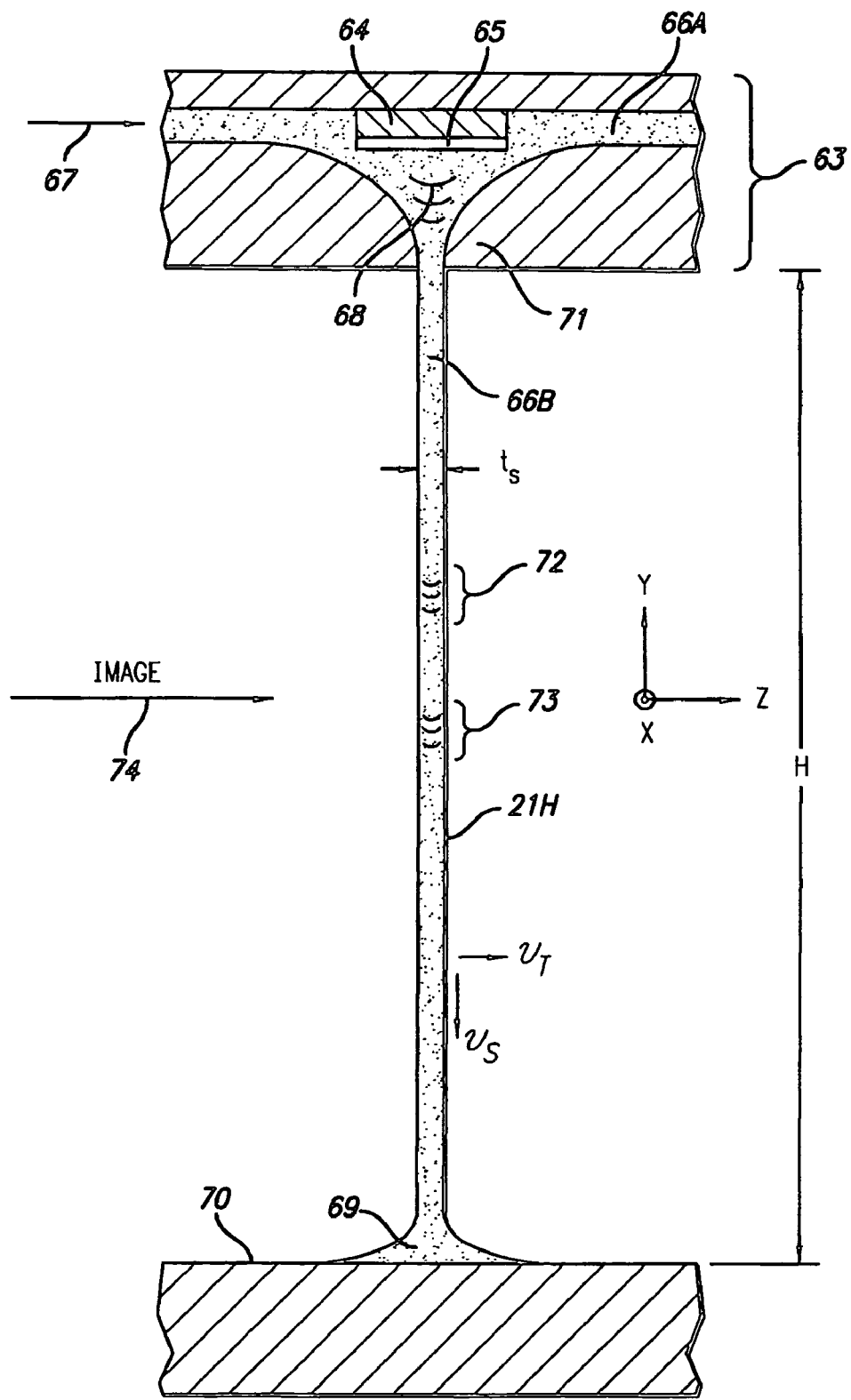

In FIG. 2h, we see a screen liquid-film emitter 63 emitting a screen film 21h of height H, thickness $T_s$, and moving downward (−Y direction) with a velocity $v_s$. Image or image slice(s) 74 may be projected or written upon screen 21h. In addition, screen 21h may also be scanned or moved continuously or in steps, at a velocity $v_t$ to the right (+Z axis). Note that the width of the screen (W dimension) passes into the paper along the +X axis. The particular film or slit-shaped emitter 63 depicted comprises a fluid 66a chamber in which a piezo-emitter 64/65 is situated. As is known to the piezo art, material 64 may be piezo-material and material 65 may be an acoustic matching layer. An inflow of liquid 67 is depicted entering emitter 63. An orifice 71, generally shaped like a slit (along X axis), directs emission of the liquid film screen 21h downwards toward a collection surface 70. Where the film 21h meets the collection surface 70, one will typically see a reception meniscus 69. We note that piezo-emitter 64/65 emits ultrasonic waves 68 that pass downwards into the film 21h as noted by traveled waves 72 and 73 within liquid 66b comprising film 21h. Acoustic waves 68 may be used for at least three purposes: 1) to propel (pump) the fluid film downwards as by known streaming or displacement pressures, 2) to forcibly resist necking of the film as by presenting a moving or standing acoustic wave which selectively limits said necking because the necking represents a higher-pressure chokepoint for the passing waves, and 3) to forcibly introduce upon the film 21h a surface texture which beneficially affects an optical property of the film such as optical diffusivity or reflectance of the screen to cause a a microrippled surface. We have mentioned but not shown here the application of other energies or potentials into the film (such as visible light or electrical potential) of FIG. 2h for the purposes of furthering the stability or optical properties or optical behavior of the film.

Figure 3:
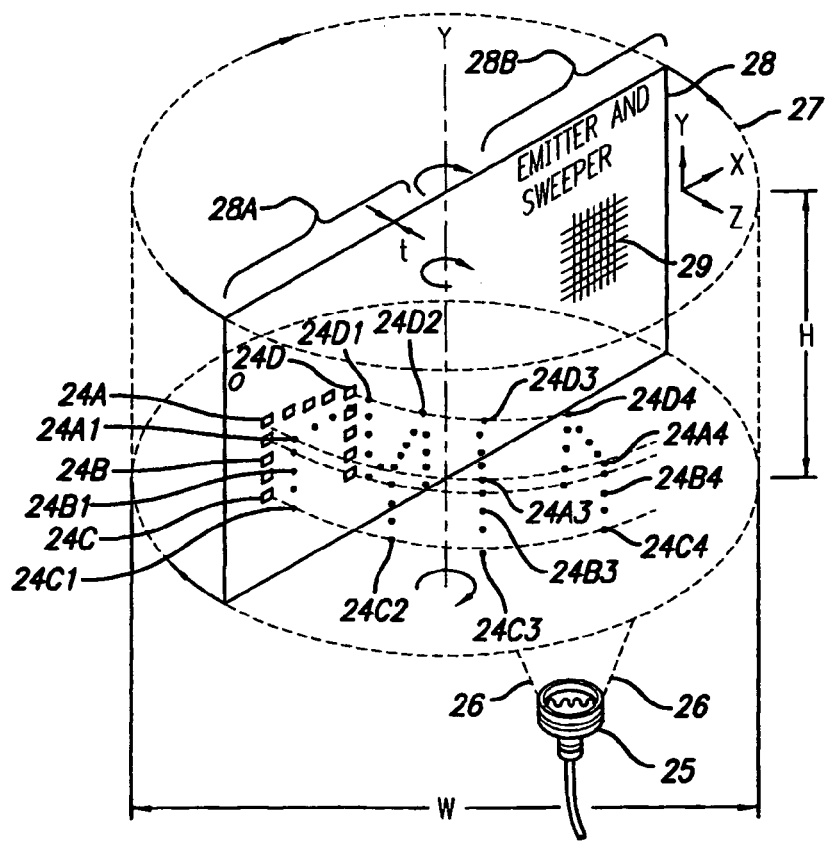
FIG. 3 is a perspective view, partly in phantom, depicting a static droplet display with extended long optical persistence.

Before we move to FIG. 3, we will say that there are two preferred ways of at least temporarily occupying voxels with droplets or particulates. We will call these a) dynamic droplets and b) static or pseudo-static droplets. Dynamic droplets have an appreciable velocity (typically translational) and typically require strobed or pulsed image or image-slice projection, illumination or activation to visualize them without optical smearing when they are in the appropriate voxel positions. They are in the appropriate positions for a short period of time, usually for a small fraction of their total droplet lifetime. Such would be the case for an unperturbed droplet ejected with high velocity; it will correctly occupy the intended voxel for only a very short time as it transits the voxel for which contrast modulation is desired. With regard to static droplets, the velocity of the droplet allows it to remain in the voxel of interest for a longer period of time. Such might be the case, for example, if we were to eject a high-speed droplet and slow it or stop it with an electric or magnetic field or drag-inducing ambient in the voxel region of interest. Such externally applied de-acceleration (preferably followed by re-acceleration) would afford much longer effective optical persistence. We teach two methods of achieving static or pseudo-static droplets, the first being just described. Thus, we emphasize that in some applications, for example image projection on a screen, the droplet persistence time in a given voxel may be irrelevant, whereas if one desired to "draw" objects with the droplets (as opposed to the illumination), then one has to consider having the particles being in the right place at the right time. The latter could be the case, for example, if a cube object is depicted in color using sequential red, green and blue pulsed blanket-illuminations and droplet arrangements taking the physical (object) shape of the cube.

The second method of achieving long-persistence static or pseudo-static droplets is shown in FIG. 3, which depicts an image volume 27 that is cylindrically shaped and of diameter W and height H. Only the image volume itself is shown for simplicity. At the point in time depicted, we have a physically solid panel 28 rotating in volume 27 on the Y-axis. Panel 28 is both a droplet emitter (28a portion) and a droplet sweeper or collector (28b portion). Panel 28 portion 28a is shown emitting a structured droplet object comprising a solid spatial letter "C" or stick-figure with its open side facing downwards (−Y direction). We have shown four such "C" objects having been written or imaged in the image volume. The first "C" written is comprised of a plurality of droplets of the type 24a4-24d4 (rightmost). The second "C" written or projected is that made up of droplets 24a3-24d3. The third is made up of droplets 24a2-24d2. The last and most recent emitted is that leftmost comprised of droplets 24a1-24d1. Note that we have shown the particular emitters 24a-24d which emitted the corresponding droplets. Each such emitter has emitted droplets generally strung out along a circumference through which it passes in the image volume 27. Let us assume that the panel 28 rotates at a speed somewhere between 30 rev/min and 1800 rev/min as shown. Then it should be clear that panel sweeper area 29 on panel portion 28b will impact, capture or absorb the droplets shown, particularly if the rotation speed is large compared to the speed of the droplets sinking in the $-Y$ direction due to gravity. For the display shown in FIG. 3, one emits droplets roughly normal to panel portion 28a with an ejection velocity which just cancels out the tangential velocity at that particular droplet emitters radial location (this varies with radius). This is akin to leaving the droplets "hanging" in space until they get swept up by collector 29 of panel portion 28b. We depict an illumination or activation source 25 radiating a beam of energy, defined by lines 26 upwards into the "hanging" droplet constructed objects. Of very significant note here is that these "hanging" or static droplets have very long optical persistence, compared to droplets moving at high velocity, which need to be strobed with a high-speed strobe light or activation energy unless they have images projected on them, for example. If panel 28 is relatively thin, then the structured droplets needed for object or scene visualization may remain in place being viewed until they are swept out by the sweeper mechanism 29 of panel portion 28b. Note that this means that something like 99% of the time, the droplets can persist, assuming they do not sink (as an assemblage) unacceptably between rotational refreshes. The display shown in FIG. 3 offers very high persistence and therefore very high effective brightness and contrast as averaged by the human dynamic visual fusion processes. We stress that the illumination or activation source(s) 25 may take many forms and may be chosen to illuminate the droplet constructions for only a fraction of a revolution of panel 28. Thus, for example, the droplet-constructed objects could be illuminated for only 10 degrees of rotation after their emission. This affords much longer persistence than strobing a high-velocity dynamic droplet on the order of microseconds yet is short enough that droplet gravitational sinking effects will only be significant in the non-illuminated (at that point in time) regions. The advantage of the display in FIG. 3 is inherently long persistence. The disadvantage, albeit very workable in engineering tradeoffs, is that a panel 28 must be constructed and rotated—a panel incorporating an emitter array and a droplet sweeping surface as well as likely droplet fluid plumbing features and signal and power interconnections and datapaths. Within the scope of the invention is the possibility of having lighting or activation means 25 built into the rotating panel 28 itself, or being part of a co-rotating assembly. It should be apparent to those familiar with MEMs that one could fabricate at least the droplet emitter array of FIG. 3 as a two-dimensional micromachined array on a single substrate. One may even form the entire panel 28 out of a single or few attached layers, at least one of which can preferably be micromachined. The technology for forming the sweeper portion 29 can also be borrowed from MEMS methods. For example, in the making of certain antireflection coating for solar cells, one creates micron-sized arrays of pyramidal or otherwise pointed tips that could surely capture and wick droplet fluid with minimal or no splashing. Alternatively, layer 29 might simply be a layer of porous polymer wicking material that has a liquid flow connection to a liquid recirculation means. One may also utilize centrifugal force to provide some aspect of droplet liquid plumbing or pressurization. Regardless, MEMs and microfluidics are exploding upon the biological and analytical markets in terms of cheap labs-on-a-chip and these integrated microfluidic products core technologies would be applicable to the needs herein. Note that collector 29 could be replaced by sweeping electrodes that attract (or repel) charged droplets to a sinking surface. We will show such electrodes in FIG. 4 and such electrodes can also be used to favorably affect droplet motion for a dynamic droplet. Note also that panel 28 could incorporate a PC-board or a silicon or other glass or ceramic wafer or substrate ready-made for implementing MEMs fabrications thereon.

We note that one may also incorporate the application of an electrical, electromagnetic or magnetic field and charged (including induced charging) or magnetic droplet fluids such that a small electrostatic or magnetic field force or other field force on the droplets can cancel out the gravitational sinking of the droplets. Such fields will be more extensively shown in the following dynamic droplet displays wherein droplets are created and then possibly accelerated, de-accelerated, or both, for a variety of purposes.

Figure 4:
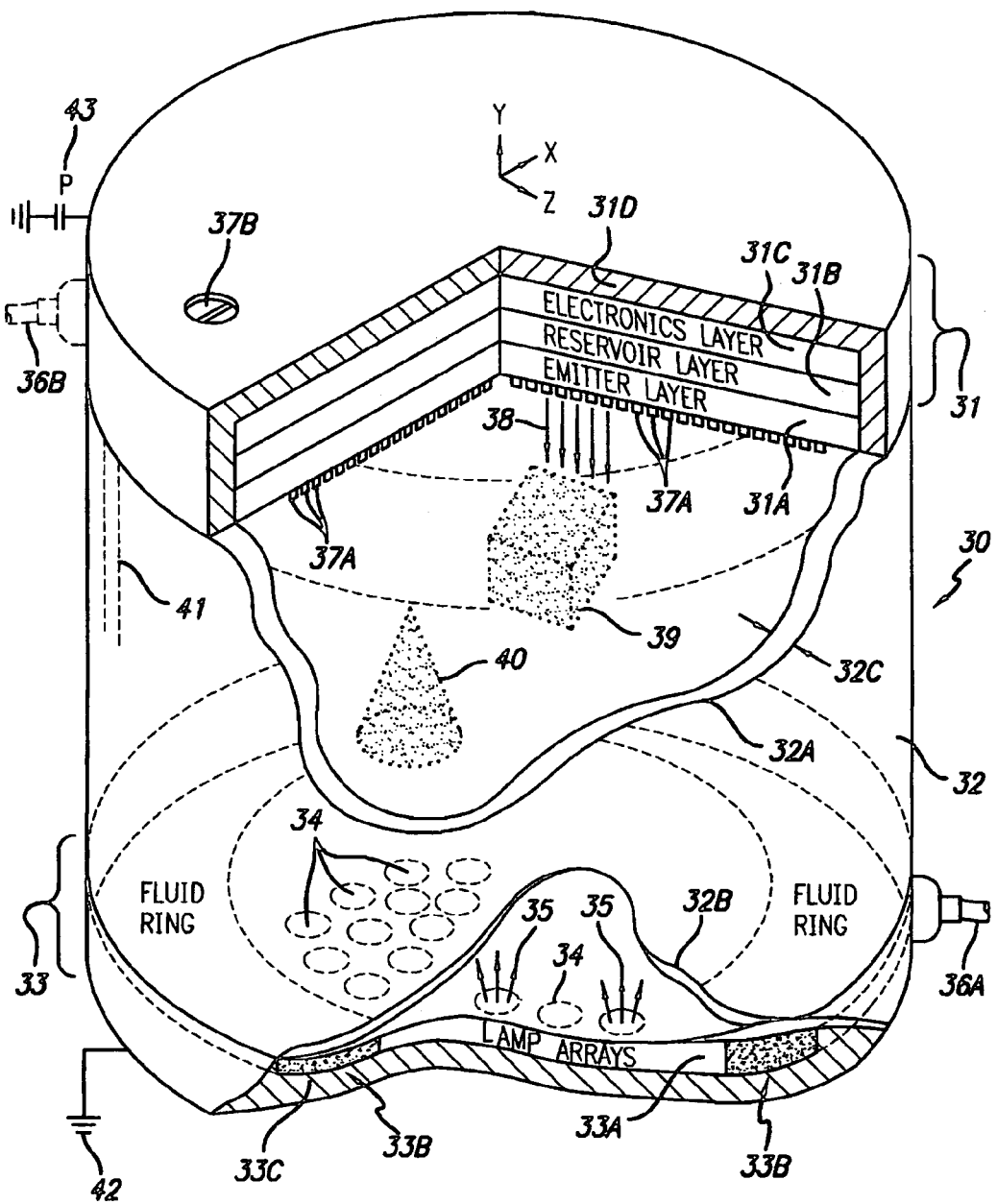
FIG. 4 is a perspective view, partly in section, depicting a dynamic droplet display with optional field-force manipulation of droplets.

Moving now to FIG. 4, we show a cylindrically shaped display device 30 of the invention. The main components are a top cover 31, a bottom cover or base 33, and a transparent cylindrical shell 32. The preferred cover layer 31 includes a droplet emitter layer 31a, a droplet fluid reservoir layer 31b, and a cover electronics layer 31c. The base layer 33 includes an illumination layer 33a and a droplet fluid return mechanism 33b. Essentially, the cover layer 31 creates and directs droplets downward to form displayable structured objects (or screen surfaces, not shown) such as cube object 39 and cone object 40, which are illuminated by lamp layer 33a, such as by discrete LEDs or vertical lasers 34 beaming optical radiation 35 upwards. We have depicted droplet emitters 37a on or in the emitter layer 31a. The emitter array may be, for example, an array of several thousand to millions of emitters that reside in, for example, a circular area facing downwards. The emitters 37a emit droplets in the general direction of downwards ($-Y$ direction) as shown by arrows 38. It can be seen that the structured objects cube 39 and cone 40 are each constructed of an array of ordered or semi ordered droplets. By "ordered", we mean at least ordered enough to appear as the intended objects or surfaces thereof. It will be noted that we have depicted the cylindrical transparent shell 32 to be broken out at 32a and 32b to allow seeing the image volume interior directly. We also note that one or more utility or data cables or connectors are shown as items 36a and 36b as may be necessary to pass needed power, signals, logic, fluids or image-volume pressure monitoring and maintenance means (not shown) inwards and/or outwards. Wireless links may also be provided. Ideally, LEDs or lasers 34 and their associated optical radiation 35 can be in the form of sequential red, green and blue (or their reflective CMYK counterparts as necessary) illuminations, which temporally correspond to red, green and blue structured object-activated voxels. For simplicity, we have shown all of the objects 39 and 40 activated by a single color of LED or laser 34. In this case, all of the voxel droplets get the same illumination and the objects have the same color all over. It will be noted that the cone-object 40 sits lower (lower along the $-Y$ axis) than the cube-object 39 and that both have an angle with respect to the Y-axis as would generally be the case for randomly situated objects being displayed. This requires that the droplet emission activity for the cone-object 40 start before that for cube-object 39 such that the cone droplets can travel to their desired location before illumination by light (or activation energy or radiation) 35. Note that since the structured objects 39 and 40 sit at an angle to the Y-axis, this requires a dynamically changing set of emitters 37a to fire as each object is created or launched. Note also the access port 37b, which may be used for filling or evacuating the cylinder, such as during manufacturing or servicing, if utilized. The interior image-volume ambient of the display 30 ideally primarily or only comprises a vapor-pressure of a working fluid or droplet fluid. Additional gases or vapors may be present in the image volume as trace background gases, but it will soon become clear that it is preferred to operate the image volume at a pressure (or at least a drag-regime) below atmospheric pressure. In other words, rapidly moving drops can be unacceptably slowed or torn apart by high ambient drag forces caused by surrounding stagnant gas or air and this must be taken into account during design. The droplet fluid, for argument's sake, one of mineral oil, glycol, water, alcohol or a fluorinated liquid, is preferably recirculated; however, we include in the scope of the invention wherein the droplet (or other particulate material) is not recirculated and may even be released into the atmosphere if it is not harmful, as for water droplets, for example. (Glycol and mineral oil are released into the atmosphere in prior art beam-visualizing foggers, while water is released into the atmosphere by the prior art 2-D FogScreen™.) At any rate, our preferred low pressure embodiment here has the fluid being recirculated allowing embodiments wherein the image volume is "permanently" sealed. Two means of such recirculation are:

(1) a lumen such as 41, shown in phantom, allows passage of the droplet fluid, preferably in a liquid state, from the fluid return ring 33b back to the emitter reservoir 31b using, for example, one or more of pumping, capillary-action or wicking means (not shown). If the fluid is transparent and has a refractive index near that of the transparent shell 32, then it will be nearly invisible if it fills a return-conduit through the shell material as shown for lumen or conduit 41.

(2) a droplet fluid is employed that can be recirculated via phase changes similar to how a heatpipe operates. For example, the fluid travels downward as liquid droplets but travels upward as a (low pressure) vapor, where it re-condenses in direct or indirect fluid communication with the reservoir layer 31b. (As an aside we note here that for surfaces on which we do not want recondensation to take place we can warm them or treat them with antifogging coatings.) This approach requires that the recondensation region be a cooler region than alternative condensation regions. So, ideally, the image volume is at sub-atmospheric pressure, the pressure being partly or wholly provided by a droplet fluid, the pressure being low enough that aerodynamic drag upon the downwards moving droplets is tolerable. The cover 31 and the base 33 can be conveniently formed of anodized aluminum or injection-molded polymers, whereas the shell 32 can be formed of glass, mineral, crystalline or polymeric materials with reasonable transparency. One can think of assembly 30 as being akin to a sealed television CRT wherein there is a liquid and its vapor pressure sealed therein. Obviously, additional gases such as an inert gas can be added to increase the pressure as necessary, or to improve heat-transfer, for example.

We have also shown in FIG. 4 a means of providing an electrical bias between the top cover 31 and the base layer 33. A positive electrode 43 at potential P is shown biasing a portion of the cover 31, while a ground electrode 42 is shown biasing or grounding a portion of the base layer 33. In the case wherein droplets are electrically charged (including as by induced or activated charge), such electrodes may be electrically manipulated to one or both of slow down and/or speed up the downward velocity of the droplets. If one wanted to prolong the persistence (how long the LED 34 strobe pulses 35 are) but still want to avoid voxel-smearing in the Y-axis direction, then it may be required to slow the velocity of the droplets. If they are slowed, it might also be beneficial to make this slowing temporary and otherwise reaccelerate the droplets to recover frame rate. We include in the scope of the invention the use of externally applied forces such as this to influence droplet behavior, whether physical or optical behavior is being influenced. Such applied and induced forces could be imposed or induced via the use of electrical, magnetic, optical or acoustic radiation, for example, and could require that the droplets be electrically, magnetically or optically susceptible, such as by electrical charging, electrical polarization, optical polarization, or by the use of a magnetic fluid or fluid mixture. Electrical and magnetic means would also include time-varying fields such as RF (radio frequency) and microwave fields. We also note that such fields or energy applications could be applied transversely, such as to translate, tilt or rotate a screen of any of the Figures, for example. Such driven motion might be only for fine-tuning or corrective purposes. We include in the scope the use of fields wherein the direction of droplet influence is at an angle to the field vector as well as parallel with it.

Not shown in FIG. 4 is the use of a large flat or rotating screening surface that provides sectional sub-images in the known manner. Therefore, we have also not shown an image-wise projector(s) to illuminate such a screen (or object). Keep in mind that display 30 could just as well comprise a circular screen (not shown) having the image volume diameter which is scanned or translated up and down or around the Y-axis) and has image-wise information projected upon it or written upon it sequentially as image slices. Alternatively, the display 30 as shown with objects 39 and 40 could instead have image-wise projections used to illuminate them as by a DLM projector known in the art.

It is the unique strength of the invention that slicing screen and/or screening objects can be employed, perhaps simultaneously to best advantage. The parallelism of operation of the droplet emitters allows one to optimize in real-time the mixture of screens and objects, if a mix is beneficial such as to image quality or frame rates.

Preferably, display 30 of FIG. 4 has few if any moving parts and therefore will have a long life and run relatively quietly. Also, preferably, the shown modular design in FIG. 4 will allow for servicing, if required. We include in the scope of the invention sealed image volumes that serve a lifetime without opening or maintenance. In principle, one could seal all of the described components and minimize feedthroughs to, perhaps, electrical feedthroughs, as is done for CRTs. If the vapor-return fluid recirculation is practiced, there may be no pump to fail and the system would essentially remain clean and be self-cleaning. All manner of known and anticipated feedthroughs for static and moving (e.g., rotating) interconnections and shafts are incorporated herein. These would include glass-to-metal seals, ceramic-to-metal seals, ferrofluidic feedthroughs (for screen rotation, for example), non-contact magnetic drives (such as for screen rotation or pumping, for example), wireless data links, optical links, and wireless power or data transfer via time-variable fields as is done for cardiac pacemaker programming.

So display 30 may utilize downward-fired droplets alone or may utilize droplets which are likewise fired (or simply released) and then accelerated/deaccelerated with our biasing means such as 42 and 43. The biasing might simply be used to cancel out drag-induced slowing (maintaining velocity, for example) or might be used to accelerate or de-accelerate droplets from their initial velocity (which may be zero or finite) along their entire path or along only portions of that path.

A display of the invention may have one or more feedback methods to track and/or control its performance. As examples, the following parameters may be monitored and/or adjusted, preferably automatically, such that the display performs consistently:

1) droplet velocity coming from one or more emitters at one or more points in space;
2) droplet mass upon emission and throughout flight coming from one or more emitters;
3) droplet apparent optical size for one or more droplets and one or more lamps at at least one point in flight or prelaunch;
4) droplet fluid reservoir levels, droplet fluid vapor and/or liquid pressure, or droplet vapor optical absorption, if any;
5) achieved lamp output power for one or more lamps;
6) achieved lamp color for one or more lamps;
7) droplet charge achieved for one or more emitters;
8) droplet charge to mass ratio achieved for one or more emitters;
9) droplet spacing or pitch coming from one or more emitters;
10) droplet satellite behavior if any desired or not;
11) droplet shape transformation and timing as driven by surface tension affects, for example;
12) ambient light level to adjust lamp power and/or droplet size to compensate;
13) transparent shell 32 clarity (avoidance of optically interfering condensates);
14) temperatures of electronic components or condensation regions;
15) levelness to gravity, if important such as for fluid recirculation method;
16) droplet fluid clarity, opacity, conductivity to detect contamination or breakdown;
17) opacity or physical thickness of a screening surface;
18) calibration of an illumination, activation energy or field, directed or not; and
19) calibration of an acceleration or de-acceleration field or steering field.

It should also be noted that the droplet fluid may be used to cool the lamps 34 and/or emitters 31a/37a and/or electronics 31b. Further, electronic circuitry may also or instead be situated in the base 33 (not shown). By "electronic circuitry", we will give a few examples such as: a) graphics engines, b) power supplies for pumping, lamps, circuit boards etc, c) optical projection means or beamwriting means, d) droplet charging circuitry, e) droplet biasing grid circuitry, f) user interface electronics, g) memory, h) emitter power and control, i) PC-boards or modules, j) clocking means, k) lamps or illuminators themselves.

We have shown the display in FIG. 4 as a self-contained cylindrical container 30. We emphasize that the display 30 may be broken into subcomponents wherein, for example, portions of the electronics power supplies can be placed on the floor and cable-connected. Extremely high data-rate wireless connections are also now becoming available and so we include in the scope of the invention the use of remote placement of supporting electronics (or even plumbing, if any) which require high speed high-bandwidth communications as implemented wirelessly as well as in known wired form. In any event, the data paths will be physically arranged to support the required latency and bandwidth. We expect many variations in the modular design of our displays using our taught image volumes, screens and objects. This is seen as a strength.

We have shown in FIG. 4 droplets directed downwards. We emphasize that displays of the invention may also be designed wherein droplets are directed in alternative or additional directions, such as upwards or sideways. We have shown illuminators 34 emitting light 35 upwards. Again, such illumination or activation may also or instead be directed downwards, sideways or even be directed from outside the display inwards (or inwards outwards) such as via an external image projector directed through a projector window into an image volume. Ideally, the illumination means, if used, is directed such that only light redirected or scattered by droplets is redirected to the user. This can be achieved, at least in part, by providing opaque blocking surfaces such that the user cannot see the illuminators directly, but their light traveling toward droplets is not blocked. Recall that we cause or enable our particulates or droplets to provide contrast by either (or both of) illuminating them or activating them. Activating them could comprise UV fluorescent droplets being activated by UV radiation 35, for example.

The reader will appreciate that in the most general case, we have an emission direction, a projection or illumination direction, and, in the case of a screening surface, a screen orientation. We specifically note that a screen may move or sweep within its own plane or orthogonal (or at some angle) to its own plane. Thus, the screen normal direction can be set independent of the emission direction, such as by emission of a "tilted" screen using emission phase-delays. As a further level of complexity, one can have multiple screens (and/or objects), multiple illuminators, projectors or activators, and multiple or varying screen orientations.

We have shown "layers" in the covers 31 and 33. We wish to emphasize that this is a schematic representation wherein we have shown sub-portions or fractions of such spaces dedicated to a variety of functions. Our point in FIG. 4 is merely to indicate some likely disposition of functionality and not to teach detailed constructions of which there are numerous implementations as, for example, as taught in the Appendix for the inkjet art.

At any rate, the emitter array(s) 31a will be in incoming mass-transfer communication with a reservoir of droplet fluid which acts as a feedsource. The mass transfer will likely include fluid flow but may also include vapor flow and re-condensation. Electronics are required, at some point, to fire various emitters and to bias their droplets, if necessary. Typically, at a minimum, electronics 31c will include the switching of firing pulses among various emitters—or more simply, the simultaneous firing of them all. It may also include, if not remotely provided, a graphics engine, bias supplies, a microcomputer, microprocessor or microcontroller, memory and illuminator supplies, pressure and temperature sensors, light sensors, data and signal buses, and software and firmware.

Transparent shell 32 may, as is known to the art, incorporate anti-reflection films on its internal and/or external surfaces. It may also incorporate transparent electrodes or resistive films, such as for passing voltages or currents between top and bottom or for provision of a thin-film heater on the walls of the shell to prevent condensation there.

Covers 31 and 33, if not also other peripherally arranged modules, may incorporate cooling fans and other means of conductive, radiative, and convective heat transfer.

It is anticipated that, for designs using a droplet fluid with a background vapor pressure, one may be able to utilize polymeric based materials for one or all of components 31, 32, and 33 and still have sufficient hermetic behavior such that true CRT-style glass-to-metal sealing is not required. However, we incorporate true hermetic-style sealing in the scope of the invention for maximal lifetime of the display (or maximal time between maintenance, if allowed).

Discussion of Particulate Formation and Emission

Within the scope of the invention is any existing or future-developed means of producing particulates and placing them in space. Per the Appendix, this is already a broad swath of technologies, such as those used to construct continuous and drop-on-demand (DOD) inkjet printers. We will first discuss a generic flowchart that encompasses the majority of possible present and future means we anticipate. Note that we break down the particulate process into particulate formation and particulate emission. For a conventional known inkjet, the formation and emission processes are often combined in one step. However, one can just as easily provide a sequence wherein one first forms a reservoir of particulates (at least one particulate) and one second extracts and emits one or more of those particulate(s) on demand (or continuously). We will see that this second approach can offer some advantages in certain situations.

Figure 5:
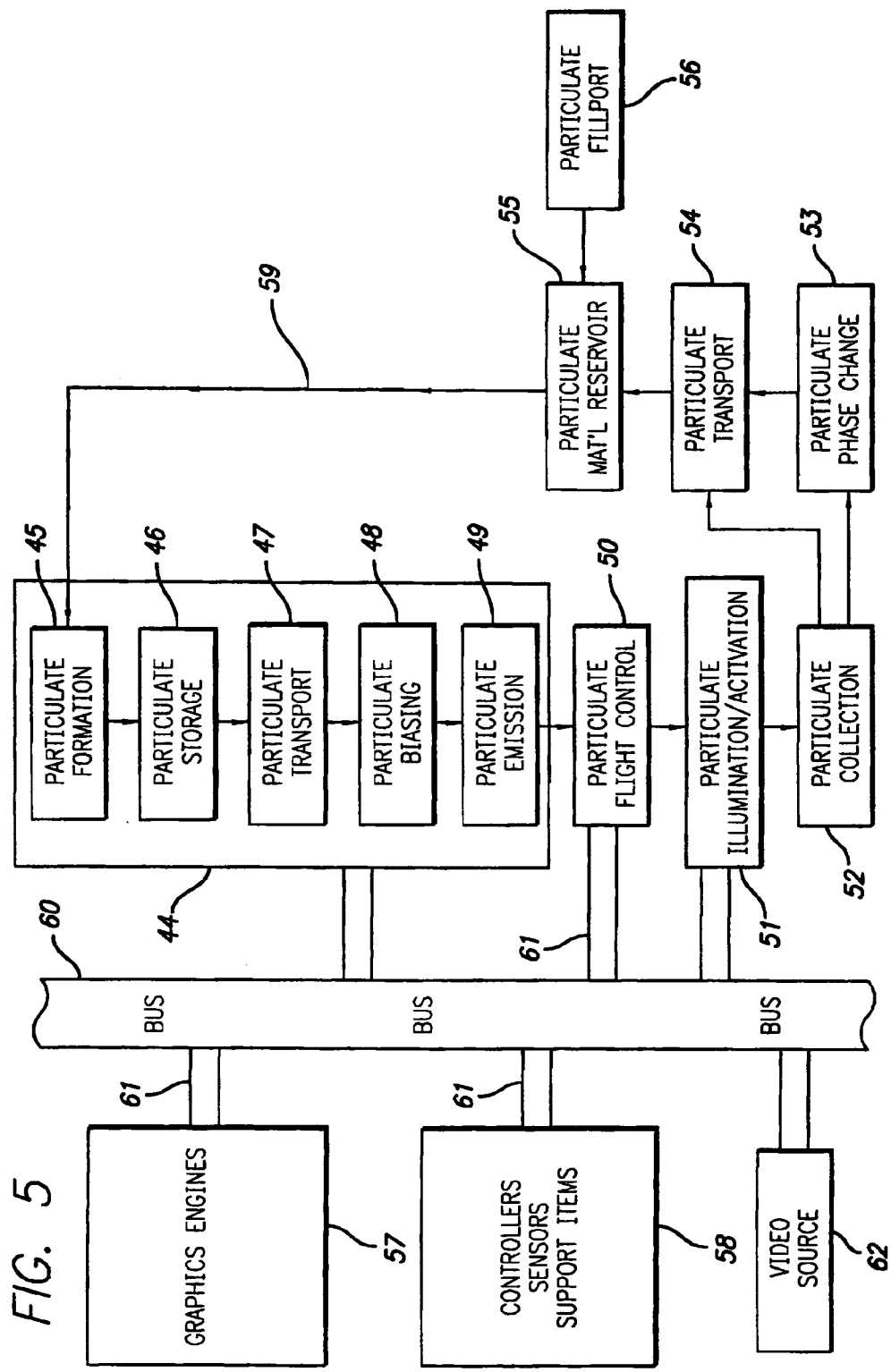
FIG. 5 is a schematic diagram, depicting droplet formation, emission and recirculation sequences.

Moving now to FIG. 5, we show a schematic of the particulate lifecycle within our display and some interactions between the particulates and the control and operational components of the display. Again, we emphasize that this figure is intended to capture a wide variety of particulate or droplet handling approaches, and for some approaches, steps will be dropped, have their order changed, be added, or be repeated.

The core of FIG. 5 is item 44 which we will call our droplet engine, since droplets are a preferred form of particulate. The droplet engine 44 creates and provides droplets. It could just as well create and provide solid particulates of the invention.

Particulate formation 45 encompasses the physical formation of the particulates. In the example of a liquid droplet, it could be the extraction of a droplet of liquid from a larger body of liquid (or vapor). Particulate storage 46 (if employed) could, for example, comprise the temporary holding of that droplet for a period of time before it is to be emitted. In this manner, it can act like a physical buffer for material flow. Particulate transport 47 could represent the removal of a stored droplet to a position wherein it can be readied for emission. Particulate biasing 48 could represent the net electrical precharging of a liquid droplet (as is done for continuous inkjet printing for example) or other pre-launch (or during launch) activation of that droplet. Particulate emission 49 comprises the release, ejection or emission of the droplet into the image volume. Just after emission 49 occurs, the particulate may or may not already have its intended velocity, depending on whether and how field forces are used to influence droplet flight or droplet suspension in the image volume. So droplet engine 44 takes raw droplet or particulate material and utilizes it to create and emit droplets in a manner supporting display operation. We note that by "emission", we mean "comes out of" so this includes all manner of forcible extraction, such as is done with Taylor-Cone extraction (Appendix). Thus, we could have unaided emission, aided emission, and extraction, or any combination thereof.

Those familiar with inkjet art of the Appendix and particularly the charged droplet continuous inkjet art will know that droplet biasing and emission can be combined into one step.

In general, droplet engine 44 will have or be coupled to multiple individual droplet emitters, such as a 1×N array or an M×N array of emitters 37a (FIG. 4). This array may be a fully populated ordered array, a partially or sparsely populated ordered array, or a random array of emitters, for example. Preferably, the droplet engine emitter structure is fabricated using micromachining techniques such as those widely known to the inkjet art and the MEMs art. These techniques can include laser-machining, electroforming, lithography and etching, thin film depositions, subtractive and additive feature definition, electroplating, electroforming and surface and bulk-etching. They also frequently utilize substrate materials such as silicon, ceramic, and glass wafers and anodic bonding or fusing of interfaces. Applicable MEMs technologies are used to make chip-based accelerometers for airbag deployment (Analog Devices) and the DLMs™ or digital light mirrors (Texas Instruments) optionally used in the invention. MEMs fabrication can utilize wet and dry etching techniques including wet anisotropic etch techniques in silicon and reactive-ion-etching (RIE) plasma etching of thin films.

In the case of an inkjet-style droplet engine 44, for example, the micromachined emitter structures would most easily incorporate one or both of thermal bubble-driven inkjets (Hewlett-Packard, Inc., Canon, Inc.) or piezo-displacement (non-bubbling) inkjets (Epson, Inc.) (see Appendix). Associated with such emitters are known fluid routing and storage channels and chambers, thin film electrodes and/or heaters and flexible circuits for outside connection. It is not the purpose here to review the multi-billion dollar prior art of microfluidic MEMs devices such as inkjet printheads and labs-on-a-chip devices. It is the purpose to state that given the invention, one may obtain the technologies for implementing the emitters that we teach. We include in the scope of the invention modifications made to such technologies to provide the described emitter arrays. Such modifications include, for example, use of a new working fluid and implementation as a circular array.

Once a droplet is emitted (or presented to) the image volume by the droplet engine 44, we need to discuss its velocity. Its velocity upon emission may be large (for example, meters/second) such that it transits the image volume without further external manipulation. Alternatively, its initial velocity may be very small or zero, in which situation we may then provide it with kinetic energy as by applying accelerating field forces. Thus, we have particulate flight control item 50 which might, for example, comprise electrical biasing electrodes 42 and 43 of FIG. 4 influencing an electrically charged droplet as by accelerating it electrostatically. We emphasize that we include in the scope of the invention all known and anticipated field force and radiative force application approaches wherein a particulate property can be chosen to be responsive to such a field or radiative energy application. The most obvious of these are electrostatic fields and magnetic or electromagnetic fields. But we also include all manner of optical and other directed energetic radiative energies such as acoustic radiation and particle radiation. Particulate properties such as electrical charge, magnetic properties, polarization, dielectric constants, absorption constants, permittivities, photoelectric response, electrical conductivity etc are examples of properties that can be manipulated to cause a force response with exposure to such a field or radiative energy. We also include in the scope of the invention wherein the image volume ambient supports the ignition of a plasma wherein significant plasma radiation, if visible, can be arranged to contribute to illumination or activation directly or indirectly. Less visible plasma radiation may be tolerable throughout the display volume and a plasma may contribute to one or both of a) application of forces to particles, and b) illumination or activation of particulates.

Particulate illumination/activation item 51 comprises providing or causing optical contrast to be created at or within least at one voxel of interest. In the simplest case, the illumination is a strobed light and that light is instantly redirected by droplet scattering to the observer. In a second example, the illumination is actually an activation comprising UV radiation that causes the droplet(s) to fluoresce at the voxel of interest. Practically speaking, readers will be aware that certain activations do not result in instantaneous optical emission, but rather, optical emission after a short delay of microseconds or nanoseconds. Management of and adaptation to such known delays is hereby incorporated. The same is true of persistence of activated optical radiation.

Illumination or activation may be chosen to affect all droplets present in all voxels or, alternatively, may be arranged to affect only selected of those present droplets. As an example, white light can cause all droplets to be visible. However, if only some particular droplet sizes (a purposeful subset of all droplets present in the image volume) are responsive to the illumination or radiation, then one may selectively depict only those droplets. As a further example, consider a droplet set comprising three distinct sizes, each of which selectively refracts or scatters a selected component (e.g., red, green or blue or C/Y/M/K colors) of light back to the observer. In this case, droplet size can become a parameter used to control color. In another example, consider a mixture of immiscible fluorescent materials whose color depends on mixture composition and the mixture composition can be varied by the droplet production means. One widely known optical behavior of particles vs. size is the Tyndall effect wherein, for example, a laser beam is easily visualized by even sub-micron to few-nanometer particulates suspended or entrained in a parent liquid.

Thus, we note that using our invention, we can provide contrast by one or both of a) selective particle or voxel illumination or activation and b) selective particle placement. Said selectivity may be applied on a voxel by voxel basis or even an object by object basis. The ability to apply all this flexibility as a function of displayed content can offer additional new capabilities and performance levels.

Moving now to particulate collection 52, we prefer displays that can recirculate their droplet material such that the display is a closed sealed system. Alternatively, the droplet material can be discharged or removed from the display after being used once or for a longer usage period. Either way, it is preferable to collect the droplet material and either transport it back to the emitters or drain it from the system. Our preference is a system that recirculates droplet fluid to the emitters in a closed-loop system for an extended period. Our further preference is that such circulation can be done with the help of wicking, capillary action, evaporation/condensation or, if pumping is required, then a quiet pump such as an electro-osmotic pump, miniature peristaltic pump or acoustic pump could be used. Referring back to FIG. 4, note the droplet fluid return ring 33b. In its simplest form, this is a trough with a transport lumen attached such as 41. (We have not shown a pump in FIG. 4). Thus, droplet fluid is pumped from return 33b to emitter reservoir 31b, for example. We have previously mentioned the real possibility of by-passing return lumen 41 by having used droplet fluid return to the reservoir 31b via evaporation and recondensation. Return ring 33b will probably also have a portion extending at least around, if not across, the illuminators 34. This portion (not shown) could simply be an anti-splash screen that allows passage of illumination vertically but not to the observer. Illuminators 34 can easily be sealed from the droplet liquid as by a transparent window layer not shown.

Included in the scope of particulate collection 52 is the use of energies or applied fields, such as electrostatic fields, to sweep out "used" particulate from the image volume.

Item 53 covers the optional phase-change recirculation approach we just discussed. If there is no phase change involved, then we instead go directly to item 54, particulate transport. We above just described droplet fluid traveling from return ring 33b through return lumen 41 and this comprises, for example, particulate transport 54. Item 55, particulate material reservoir, would be reservoir layer 31b of FIG. 4 and the ultimate destination of recycled droplet fluid. At this point, we note particulate fillport 56 feeding into the particulate material reservoir. This could, for example, be port 37b of FIG. 4 wherein new fluid can be added or old fluid removed. Arrowed flow line 59 represents any and all physical paths between the reservoir 31b and the droplet formation portion 37a of emitter layer 31a along which droplet fluid transports before being reformed as droplets.

FIG. 5 depicts at least one data and/or signal bus 60, which allows the various taught display portions to work with and be controlled by the display electronics and software. Bus 60 may, for example, carry video signals, timing signals, sensor signals, emitter operational signals (e.g. fire now, bias now, change drop size, etc.), synchronization signals and other data necessary for proper droplet manipulation, and synchronization and illumination/activation. We particularly note a graphics engine 57 and another module(s) entitled controllers, sensors and support items 58, also communicative via bus 60 and bus connections 61. The purpose of the graphics engine 57 is to do most or all of any graphics processing such that one can quickly enough instruct the display mechanism to operate at the desired bandwidth. The graphics engine may contain one or more image processing chips and may contain or be coupled to fast double-data rate SRAM memory banks, for example. We include in the scope of the invention the use of any graphics engines that, individually or when ganged, can provide the gigabit(s) per second and higher bandwidths which the inventive displays can utilize if made available.

In the case of image-wise projection, we would prefer the use of a DLM™ (digital light mirror) chip(s) that would be communicative with graphics engine 57 and would provide functionality to item 51. Known are techniques of utilizing color wheels or filters and dedicated DLMs to obtain primary radiant or reflective colors to combine.

Item 58 could include, for example, lamp controllers and pump controllers, temperature sensors, fluid level sensors, pressure sensors or supporting power supplies. In short, item 58 would likely include everything other than graphics processing engines. We note that bus 60 is described as a data/signal bus, but obviously item 58 may provide operating power, analog signals, fluid handling means, etc., but for simplicity, we have not shown such electrical and fluid utility connections. Some or all of these means may be co-packaged with the image volume, or separately packaged and connected as mentioned earlier. Note that FIG. 5 is an operational schematic view as opposed to a depiction of packaging breakdown. Thus, both items 57 and 58 could, for example, be situated in one enclosure that is a part of the display shown in FIG. 4 or is a separate module as connected by FIG. 4 cables 36a and 36b.

Note that we show a video source 62 in FIG. 5. In any event, what is being depicted on the display will likely be live, computed or stored content, whether data, objects or scenes. Video source 62 is shown merely to remind the reader that it is preferable that content for display can be routed to the display via wired (or wireless) connections as opposed to the alternative clumsy insertion of a physical memory cartridge in a drive. It will be obvious to the reader that additional features such as brightness, contrast, gamma, and frame rate controls as part of a user interface would be highly desirable. Other features may include the ability to set resolution, to select particulate media, to set color values or color temperatures, to provide a 3-D (or 2-D) pointer or mouse, to monitor fluid parameters or pressure parameters, to incorporate or synchronize audio content, to annotate displayed subject matter, to preview in 2-D what is to be presented in 3-D, to rotate, translate or invert displayed subject matter, to switch between color schemes and/or monochrome and/or gray scales, to perform manual or automatic calibration of any portion of the display or to change the scale of the image.

Some Examples of Particulate Materials

A preferred particulate material is a droplet fluid as provided by one or more of 3M Corps Fluorinert™ liquids described in 3M's product information brochure reference 40. These fluids are clear, colorless, odorless, inert, and nontoxic. Electronic circuitry can reliably operate immersed in them, if necessary. They have a viscosity similar to water but a density 75% higher. The various fluids each have different characteristic boiling temperatures and vapor pressures. Recall that we prefer to operate the image volume ambient at a pressure below atmospheric, at least in cases wherein we require rapid droplet transit across the image volume. The reason for this is mainly aerodynamic drag reduction. It is widely known and referenced in the Appendix that if one forces a droplet too rapidly through a gas, then excessive turbulence will overcome the surface tension holding the droplet together and deform and/or shatter the droplet. Methods of computing the dimensionless Weber number and Reynolds Number, which estimate such turbulence, are taught therein. One can substantially avoid such issues by manipulating the pressure and/or manipulating the surface tension and/or viscosity of the droplet fluid. In particular, Fluorinert™ fluids FC-77, FC-104, FC-75, and FC-3283 are fluids having a vapor pressure of between 42 and 11 Torr, boiling points between 97 and 128 deg C., high electrical resistivity, good heat transfer properties, and low solubility for water. In other words, these droplet working fluids will not attack display materials, will not become contaminated with water, will not break down electrically, and will provide substantial heat transfer. Furthermore, they can all be evaporated and recondensed if needed and are quite thermally stable and non-flammable. In a sealed image volume, they are stable at their low vapor pressures, thereby resulting in low drag.

In the case of thermal bubble-jet type droplet inkjet-style emitters, one could choose the boiling point for such bubbles to form, say, 128 deg C. for FC-3283. In the case of piezo-displacement inkjet-style emitters, any of these liquids will work, as long as the emitter is cooler than the boiling point. The fact that these fluids are denser than water helps provide the droplets with significantly more kinetic energy than water for a given velocity, the implication being that any drag present will slow the denser droplets less. Droplets of these fluids scatter light strongly, such as would be expected from the Tyndall effect, Mie effect, Rayliegh effect, and other known scattering and activation effects (see Appendix). These fluids aid us in maintaining controllable temperatures and temperature uniformity across the display, which is desirable for repeatable behavior. These fluids can be used to manipulate the image volume ambient-pressure via controllable heating of the fluid. This could be used to adjust drag precisely. Finally, the clarity of these liquids allows for illumination to be directed through bodies or films of the liquid, such as if the liquid covers illuminators situated in the bottom of the image volume. They have a refractive index different than their vapor. If desired, they can be doped with fluorescent or phosphor dyes or pigments, for example.

We have already cited U.S. Pat. No. 4,640,592 to Nishimura et al entitled "Optical Display Utilizing Thermally Formed Bubble In A Liquid Core Waveguide". That patent discloses gas-bubble-in-liquid 2-D displays utilizing bubbles in liquid-filled glass tubes. The bubbles do not translate and even if they did, they would only be able to move very very slowly. That patent teaches a broad list of liquids that are also usable in our invention herein and so we cite and incorporate herein its lengthy list accordingly. Note that our preferred particulates or liquid droplets travel in a gaseous or vapor environment (or vacuum for many solid particulates or very low pressure liquids), so they can move very quickly with low drag. The exceptions to this are our atmospheric pressure embodiments wherein the droplets are entrained.

A second example of a particulate material class we will give is that of a material which is handled in liquid form but which reverts to solid form, at least in part, when in-flight. Such materials include, for example, waxes that can be melted, yet will solidify given a chance to cool. So the emitter handles the molten wax and ejects it as liquid droplets that quickly solidify (at least on their surface) shortly into flight. Such particles, if solid, can accommodate more drag without breaking apart. These materials can also be charged and accelerated. Ideally, such solidified wax particles, such as paraffin, would land in a liquid wax pool and quickly remelt. Ideally, one would operate the transparent cylinder at a temperature that prevents wax solidification thereon.

Another example comprises a liquid with a stabilized suspension of iron or iron-like particles or nanoparticles therein. These are called ferrofluids and means of manipulating them magnetically and electromagnetically are widely known in the ferrofluid seals art.

The placement of solids or particulates, such as engineered nanoparticulates, in a liquid suspension vehicle is an attractive approach. This is because particulate filler (such as the ferroelectric iron particles) can give the droplet properties which allow for external influencing, such as electromagnetic manipulation. Such particles could also or instead be phosphors, fluorescent materials, lasing materials, reflective or diffractive shaped or random shaped particles that have wavelength-selective or energy-selective behavior. They may also be dyes or pigments. We note that one may linearly or non-linearly excite even pure liquid droplets, whether or not they have dissolved or entrained particulates, dyes or phosphors. So we emphasize that any optical particle interaction that can provide beneficial contrast is in the scope of the invention.

Particulates or droplets may be activated as we have mentioned already. A simple example is UV radiation activating visible fluorescence in a UV dye-containing droplet. Note that in this example, the UV is likely strobed at or near the time that the droplets are at their voxels of interest. We anticipate the activation step to be possible in some cases even before the particle arrives at the voxel of interest. Of interest here are activations that temporarily change a property of the droplet or droplet material. As a generic example, consider a liquid crystal droplet which becomes internally aligned by an electric field before emission, and the orientation is substantially preserved throughout flight such that when an illumination strikes the droplet, that illumination will optically interact with the droplet, depending on whether that droplet was aligned or not, thereby providing selective contrast. One may also provide electrodes to try and better maintain such alignment throughout flight. Such schemes may require polarized light illumination.

Droplets or particulates may be emitted in a metastable or unstable state purposely. As an example, consider a water droplet with a high carbon dioxide content under pressure. Once the droplet is free of the ejector and experiences reduced pressure (or increased temperature as by illumination), it will nucleate gas bubbles and revert from transparent to frosty or opaque, thereby affecting its optical properties. This gas-loading could also be done selectively droplet-wise, if desired.

Some Droplet Engines—FIGS. 6a-6g

Figure 6A:
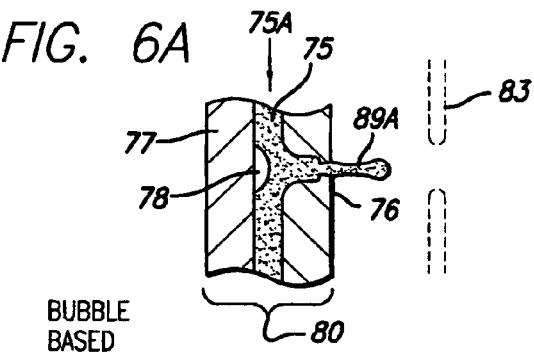
FIGS. 6a-6h are each cross-sectional views, depicting examples of droplet formers and emitters.
Figure 6A:
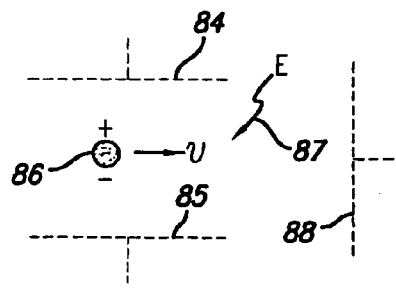

Let us begin with FIG. 6a. There we see thermal bubble-jet type droplet emitter 80 as is used in most personal inkjet printers. It has a front aperture layer 76 and a back layer 77 which together define a working fluid chamber containing droplet fluid 75. A momentary thermal-vapor bubble 78 is shown present which has caused or is in the process of causing ejection of a droplet 89*a*. To the right of the thermal jet in phantom is a biasing electrode 83, deflection electrodes 84 and 85, and an acceleration (or de-acceleration) electrode 88, all not commonly used for thermal jet printers. An earlier ejected droplet 86 is shown moving rightward with velocity v. An activation or illumination energy E item 87 is shown impinging on droplet 86. So what we have here is a thermally produced drop-on-demand (DOD) droplet emitter for which the following additional features can be incorporated: a) droplet charging, b) droplet deflection via droplet charging or induced charging, or c) droplet acceleration and/or de-acceleration via, as shown, electrostatic or electromagnetic forces. Energy 87 could be optically visible illumination or could be UV radiation, for example, which causes droplets to fluoresce as taught. Electrode 88 may be used to cancel out modest droplet drag effects or may be used to substantially modulate the velocity of droplets (upwards and/or downwards in magnitude) for achieving one or both of long persistence or high frame rate. Note that in these figures we have not shown (for simplicity) a corresponding electrode to electrode 88, which could be in the vicinity of the droplet engine 80. We show induced charges on droplet 86. Droplet 86 may also and/or instead have a net charge due to one or more electrodes of the type 83, for example, as is known for the continuous inkjet art. Practitioners of inkjet design will be aware that electrical fields can modify surface tension, so this can be taken into account in engine design and testing. Conventional thermal inkjets using ink can emit droplets with order-of-magnitude velocity of 10 M/sec with a order-of-magnitude droplet size of 10 to 100 microns diameter. Thermal (as opposed to piezo) inkjets have conventionally been limited to relatively low emission frequencies of order-of-magnitude 10 KHz because of the cooling and ink-recharging that necessarily follows ejection in those emitters. However, there are several factors limiting that speed that do not necessarily limit it for our display application. The biggest factor in our favor herein is that we have extreme flexibility in choosing the droplet liquid formulation. Known factors that could be modified to speed up emission frequency and/or ejection velocity include liquid thermal conductivity, liquid boiling point, liquid thermal-damage temperature (at what point does one damage or burn the liquid), liquid density or inertia, liquid viscosity, liquid surface tension, liquid specific heat, and liquid electrical conductivity. Changes in these factors, which, for example, reduce inertial flow forces (recharging time), reduce vaporization input-heat necessary (which heat must be sinked), increase temperature at which the liquid is thermally damaged (allowing for hotter higher-pressure vapors), reduce boiling point (allowing for a given vapor pressure at lower temperature), allow one to either or both of increase the maximum operating frequency and/or increase the ejection velocity per unit of energy put into the system. Given that we may potentially have huge numbers of emitters, it is in our interest to reduce the heat generation at each point necessary for ejecting a given droplet at a given velocity. Another way to look at it is that we are converting electrical energy into droplet kinetic energy and we want the most efficient conversion process we can get, given that other tradeoffs are satisfied. We note also flow arrow 75*a* in FIG. 6*a*. We propose that yet another way to make the emitter recover from a droplet-shot more quickly would be to forcibly flow droplet liquid across the heater region where the bubble 78 is being formed. This will not only help collapse (and/or sweep away) the bubble but also add substantial convective heat transfer to cool the heater environment. In our display case, recall that if the fluid is recirculated, we can freely utilize it in significant quantities in this cooling manner. We emphasize that forced flow of the droplet fluid 75*a* may have a number of possible geometries as far as the definition of intakes, outflows and flow directions. Yet another way to speed up emission would be to arrange the bubble formation process to take place under a net pressure (not shown). This would likely require higher heater energies to get the same bubble in equal time. The benefit is that the bubble will collapse faster. One could sustain a net operating pressure in a couple of ways, for example, by having a very small orifice with a high capillary back-pressure or by forcibly deforming the orifice meniscus inwards such as by using a Taylor type electrode below its atomization threshold.

Figure 6B:
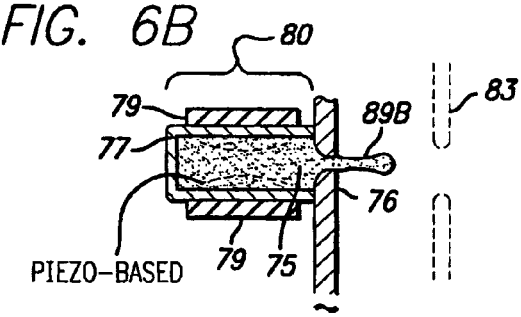
Figure 6B:
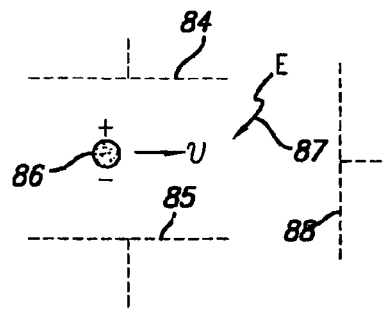

Moving now to FIG. 6*b*, we see a piezo-based droplet emitter engine 80 as also used in personal inkjet printers. In general, since we are now not talking about a thermal process and its associated cooling times, piezo-emitters can operate faster than thermal bubblejets and can emit just about any type of liquid, including solids-loaded liquids such as pigmented inks and nanoparticle-laden liquids. Thus, emission frequencies in the usual drop-on-demand (DOD) mode can be 20 to 30 KHz order-of-magnitude with equivalent or faster velocities than thermal jet. In general, it is the resonant frequency of the piezo-structure and co-laminated chamber walls which limits frequency. In FIG. 6*b*, we see the familiar aperture plate 76, droplet fluid 75, a backplate or chamber defining wall 77, and a droplet 89*b* in the process of being emitted. Piezo-crystals 79 are designed to deform and bend when they are electrically pulsed, thus deforming the chamber walls 77, which literally squeezes droplet 89*b* out the aperture plate 76. We note in phantom the deformed positions of the walls of the chamber. Because the electrical pulses to the piezo-crystal can be scaled and shaped, there is also an improved freedom with piezo-devices to tailor the emission process to optimize factors such as minimization of satellite droplets and to create the ability to emit multiple sized droplets with different shaped or magnitude pulses or waveforms. This is less available for thermal jets, such as by having multiple bubble heaters or shaped heating pulses. Note again in FIG. 6*b*, the familiar biasing electrode 83, steering electrodes 84 and 85 and accel/decel electrode 88. Again, we see an illumination or activation energy 87. Thus, all of the optional features described for the thermal jet of FIG. 6*a* can also apply to the piezo-jet of FIG. 6*b*. Piezo-jets can be speeded up by increasing their resonant frequency, such as by the use of thinner, higher-frequency piezo-crystals in combination with higher-resonance chamber walls. Practitioners of the piezomaterials art know how to utilize multilayer piezo-materials that allow for more energy efficient and/or lower voltage operation as well as impressive miniaturization. Before moving onward, we note that "steering electrodes" 84 and 85 could be supplemented or replaced by electromagnets, which serve either as steering (for magnetic droplets, for example) or for acceleration/de-acceleration (for charged droplets, for example).

Figure 6C:
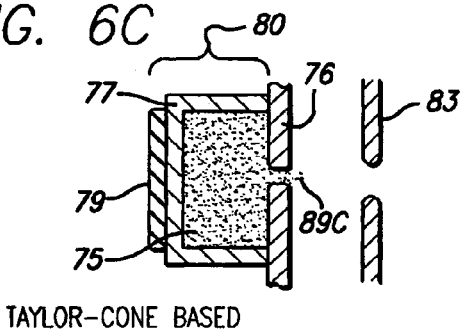
Figure 6C:
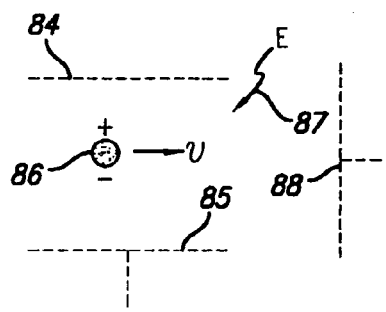
Figure 6D:
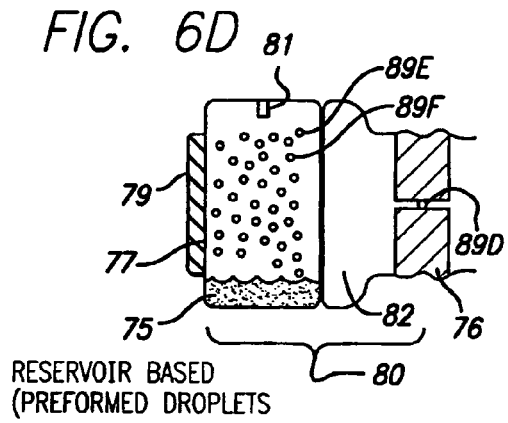
Figure 6D:
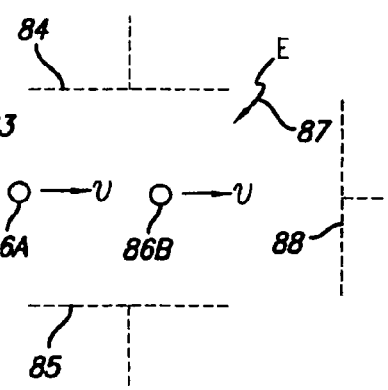
Figure 6E:
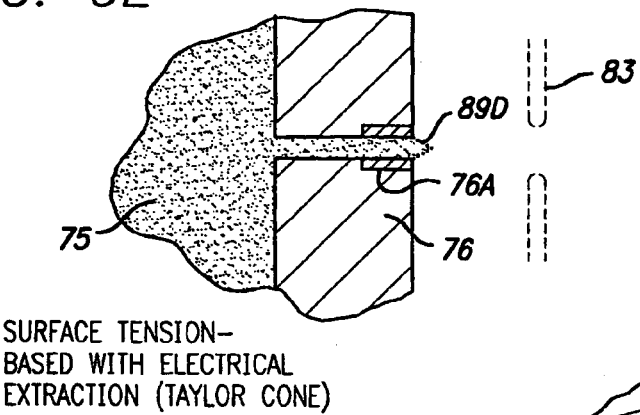
Figure 6F:
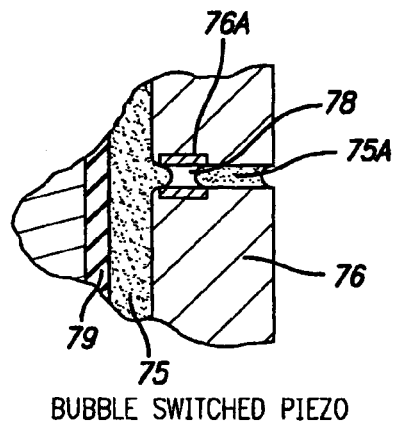
Figure 6G:
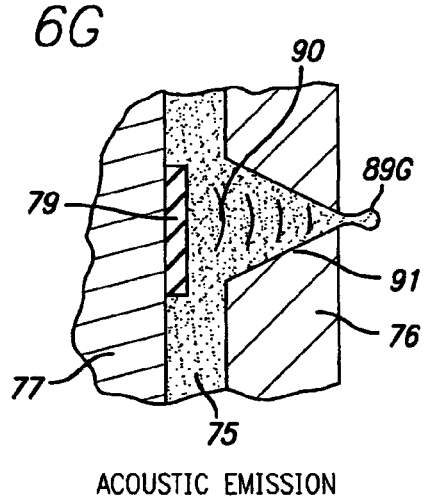
Figure 6H:
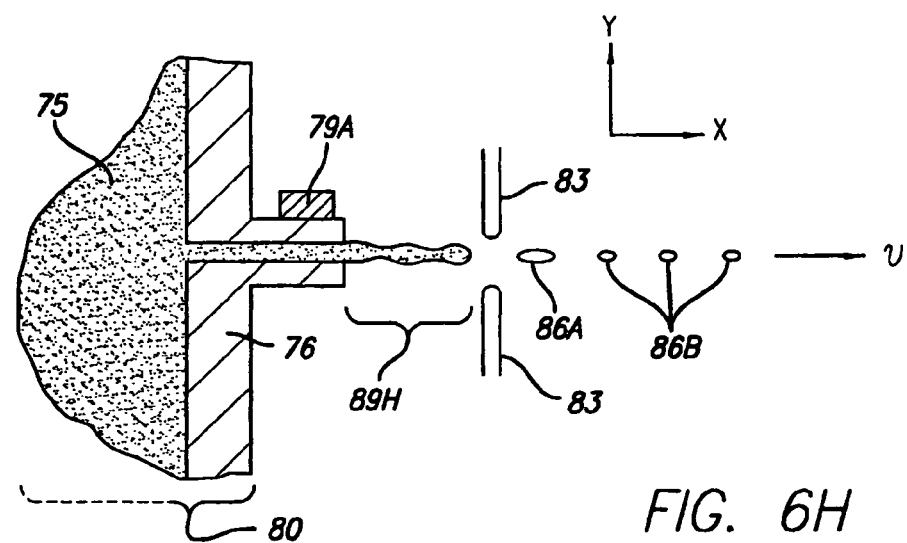

Moving now to FIG. 6*c*, we describe a first entirely new emitter type. This droplet engine 80 utilizes Taylor-Cone extraction (at least the meniscus deformation aspect and voltages) in combination with one (or more) of a) piezo-emission (shown as piezo-crystal 79) or b) thermal jet emission (not shown). We use an electrode (such as a charging electrode 83 shown) to deform the liquid 75 in the aperture into a cone 89*c*. We now apply a piezo-pulse (not shown) via crystal 79. Essentially, we have two independent parameters that can pre-extract some droplet liquid 89*c* and that can also modify the surface tension of that extracted droplet liquid 89*c*. Since the Taylor extraction provides a "pulling" force (or pushing retardation force in reverse polarity), and the piezo-crystal provides a pushing force, we have an entirely new system dynamic, which allows one to operate outside the normal envelope of a piezo-emitter. Note that our Taylor electrode (see Appendix) is being held at a potential high enough to deform the aperture liquid 89c but not so high as to itself cause electrically-induced atomization in this example. This dual arrangement could be used to manipulate droplet size independently of piezo-pulse strength. It could also be used to reduce the energy required to emit a droplet using the piezo-crystal by giving it a "headstart". It could also be used to more accurately assure the proper direction of flight of the droplet. We anticipate variations in the timing and/or overlap of operation of the Taylor formation and the piezo-pulsing. Again, FIG. 6*c* incorporates all of the above optional additional features involving droplet steering and flight. One may also choose in any of these engines to have electrode 83 be a compound electrode or an asymmetric electrode such that some additional droplet steering can be accomplished by varying the electrode(s) potentials or by physically moving the electrode 83. A Taylor voltage could also serve to retard emission by creating a back-pressure. This may allow for higher speed emission.

Moving now to FIG. 6*d*, we describe a second entirely new emitter type. This droplet engine 80 temporally if not also physically separates the steps of droplet-making and droplet-ejection. We refer to this as a droplet-reservoir based engine because it maintains a buffer of preformed droplets (at least one droplet ready or in-process). One advantage of this, assuming the buffer is large enough, is that some emission techniques can operate faster than some formation techniques, or can operate at lower pressures. Preformed droplets 89*e* and 89*f* are shown in droplet reservoir 77 as formed by an atomizer or nebulizer 81. Droplets may alternatively be produced by known condensation techniques or by a Taylor cone emitter operating in its atomization mode, for example. Such droplets are produced and recirculated via a liquid condensation reservoir 75. This avoids substantial droplet coalescence by keeping average storage time short. Droplets may be extracted from the reservoir and prepositioned for ejection as by biasing electrodes. We show an optional piezo-crystal 79 which may also be used to urge the droplets into their firing position and/or to fire them. This transducer may be focused such that it sweeps toward the aperture and pushes droplets out the aperture at its focus.

Moving now to FIG. 6*e*, we describe a third new emitter type, which uses a combination of a Taylor electrode 83 and an aperture heater 76*a*. It is known that, if one forces microscopic large thermal gradients upon a liquid, then the surface tension (and viscosity) can be grossly locally changed, so much such that the heated local liquid surface significantly ripples (see Ref 41). Thus, we combine a Taylor pulling effect (preferably operating below atomization threshold) to create cone 89*d* and a heater 76*a* which can selectively affect (reduce) the surface tension just in the cone region. Again, this gives us two independent parameters with which to favorably manipulate droplet parameters. We have not shown the usual optional electrode features on the right hand side but they also apply here. We note that the droplet engine of FIG. 6*e* may be operated in an all-liquid state or may be operated like a vapor bubble jet wherein the working droplet liquid 75 is locally vaporized. In either case, this is a dynamic system, allowing operational characteristics not otherwise available with just one of the emission mechanisms.

Moving now to FIG. 6*f* we see a fourth new emitter type, which we call "acoustic bubble-switched". Essentially, a vapor bubble 78 or gas film can be generated by a heater 76*a*. Thus, droplet liquid 75*a* is separated from droplet liquid 75 when bubble 78 is present. Again, a piezo-crystal 79 is shown. When the bubble is present, the acoustic radiation (or displacement/expulsion) forces from crystal 79 are not appreciably transmitted to fluid 75*a*. When the bubble is not present, the engine operates as a typical piezo-jet. This again gives two independent parameters with which to manipulate droplet size and/or droplet velocity. We note that the heater merely needs to create a gas film in the acoustic path, which is of any thickness greater than zero. This type of heater can operate quickly. Gas bubbles present a substantial acoustic/shockwave reflector due to the acoustic impedance mismatch between liquid and gas.

Moving now to FIG. 6*g*, we see a fifth new emitter type. This is a purely acoustic emitter wherein piezo-crystal 79 directs sonic waves 90 into or toward an aperture 76 orifice, the acoustic pressure causing the ejection of a liquid droplet 89*g*. Note that the aperture hole has a long leading taper 91 allowing for wave amplification and focusing. We could have also employed a focused transducer 79 with or without taper 91. The use of acoustic emission has been suggested by Xerox Corp for inkjet printing, but has never been used in a display and is not currently used in printers. We suggest this design for very high speed operation, as the piezo-crystal 79 also acts to pump the fluid into the orifice area so recovery time should be very small. This engine could also be combined with the other features described above, including Taylor-style meniscus deformation and steering and acceleration electrodes.

Finally, we have the droplet engine of FIG. 6*h*. This engine is preferably a continuous inkjet-style engine that emits a continuous stream 89*h* which breaks itself into droplets such as 86*a* and 86*b* or is encouraged to break into droplets. The feature here to notice is vibrator 79*a* (a piezo-crystal, for example), This vibrator, in the manner known to the art (see Orme' references, for instance, in Appendix), allows us to perturb a continuous stream of droplet fluid 89*h* such that it will break up with a predictable droplet size. Continuous jets frequently operate under pressure to obtain a high velocity jet 89*h*. Typically, droplets 86*a*, 86*b* that are not wanted are electrically drawn into a gutter to the side (not shown) in the known manner, An electrode such as 83 assures that droplets that break off have a net charge such that they can be influenced by steering (or gutter) electrodes (not shown). The use of continuous engines such as is shown in FIG. 6*h* with variations on gutter arrangements or alternative droplet negator methods is anticipated.

We wish to emphasize that any of the mechanisms we have described can be combined in any manner or used alone in the practice of the invention. This includes combinations such as acoustic emission (FIG. 6*g*) combined with Taylor extraction (above or below atomization threshold), for example. New droplet emission, atomization, and spray technologies are constantly being developed, such as micromachined droplet arrays for atomized drug-inhalation.

Another point we wish to make is that we have shown droplets generally directed in a straight line (perhaps with some steering corrections) toward a collector. We expressly include in the scope of the invention arrangements wherein one or more emitters emits droplets in one or more directions such that droplets arriving at a voxel of interest may be doing so from one or more angles, and possibly from more than one emitter. This scheme could also allow for a reduced number of total emitters in the emitter array.

Yet another point is that not all droplets need have the same velocity and some droplets may be in the image volume longer than others and may even serve to provide contrast from more than one voxel of interest as by being present for two strobes of illumination in two separate desirable illumination positions at two separate times.

We also wish to emphasize that an emission technique may provide some or all of the desired velocity (particularly velocity at the voxel of interest) of the droplet. Where it does not, one can utilize the additional taught features such as electrodes 88 and electrode 83. Taylor-like electrode 83 provides additional velocity to the droplet even when it is below the atomization threshold potential. One may have a series of acceleration electrodes to provide further acceleration or to enhance aiming of the droplets. One might even provide electrodes that cause the droplets to cycle up and down in the image volume and be "reused" without "splashing down". In an approach like that, one may utilize electrode 88 or variations on electrode(s) 84 and 85 wherein 84 and/or 85 comprises an electromagnetic wound coil.

In a first preferred embodiment, droplets accelerate all the way to the collector. In a second preferred embodiment, droplets accelerate to a saturation velocity limited by drag, and continue at that saturation velocity (or somewhat below it) across most or all of the useful image volume. In a third preferred embodiment, the droplets have controlled charge to mass ratio and thus can be accelerated (or steered) uniformly despite their size variation. In a fourth preferred embodiment, visible optical illumination is scattered by the droplets to the viewers eyes, whether wavelength selectively or not. In a fifth preferred embodiment, droplets and their illumination wavelength have a controlled relationship to enhance contrast. In a sixth preferred embodiment, droplets are substantially larger than an illumination wavelength, and scattering power scales with the cube of the droplet diameter. In a seventh preferred embodiment, droplets proceed from emitter to collector with only the velocity derived from the droplet engine and any local related Taylor-type or extraction electrodes.

Unintended droplet coalescence during droplet transit can be minimized in a number of ways. A first is to stagger firing times of laterally adjacent emitters. A second is to provide some or most of the desired transit velocity with large-area electrodes of the type 88 that provide a nicely uniform field. In this manner, any slight lateral velocities imparted by emitters will be proportionally small or have little time to accumulate error. A third is to enhance aiming with electrodes such as 83 (possibly multiple stacked electrodes 83 at stepped potentials). A fourth is to adjust droplet charge according to aiming error and apply a fixed bias to electrodes 84 and 85. To various degrees, one may also utilize net charging of droplets and/or the use of a surfactant or other species that reduces co-wetting when droplets in flight touch. With charging, one must differentiate between droplet-surface mobile charges and non-mobile bulk charges and must take into account that a given droplet likely has surrounding neighbors that can and will interact with it. Droplets may or may not have net charge depending on the use of electrodes such as 83, but they can be caused to have induced charge polarization in an electric field (electrodes 84, 85) even without charging of electrode 83. Also, droplets may be arranged to have filler materials that themselves can be charged and, depending on the viscosity of the parent liquid, the filler may or may not migrate within the parent droplet liquid during droplet travel through the image volume.

We have emphasized droplet charging and manipulation by electrical or electromagnetic fields for charged-droplet systems. Included in the scope of the invention is the use of magnetic fields and electrically charged and/or magnetic droplets within them. Also included is to use of a background plasma ambient such as to provide charge, activation or illumination to the droplets. We have emphasized the use of flowable droplets and particularly droplets having sizes from order-of-magnitude the size of an illumination or activation wavelength to many times that (e.g., from optical wavelengths of 0.4 to 0.8 microns up to ten microns, tens of microns or hundreds of microns). In general, brighter illumination or more energetic activation will be required for smaller droplets or particles unless they undergo a wavelength-coupling phenomenon. Thus, from a contrast production point of view, it is of benefit to have either large droplets and powerful illuminators/activators or small droplets which have optical resonance or other wavelength-selective coupling. However, larger droplets or particulates can mean high droplet emission power (as can powerful illumination). Thus, we expect a series of designs to be possible representing various tradeoffs of these factors.

Figure 7A:
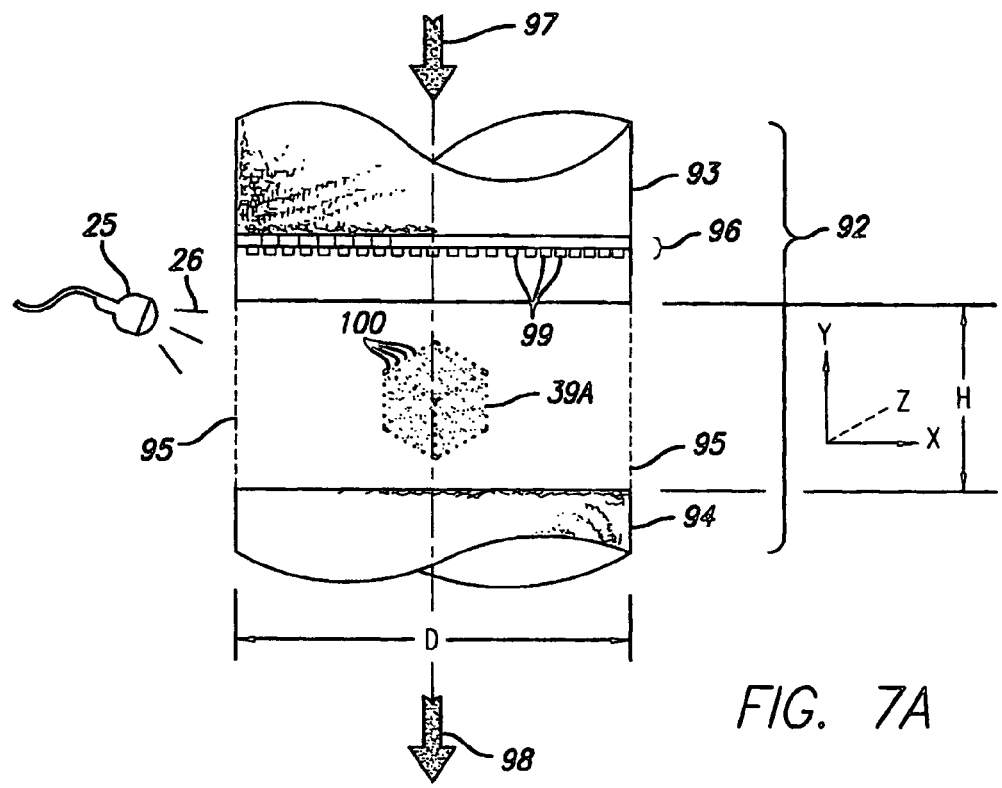
FIGS. 7a-7b are cross-sectional views, depicting flowing and recirculated image volume ambients.
Figure 7B:
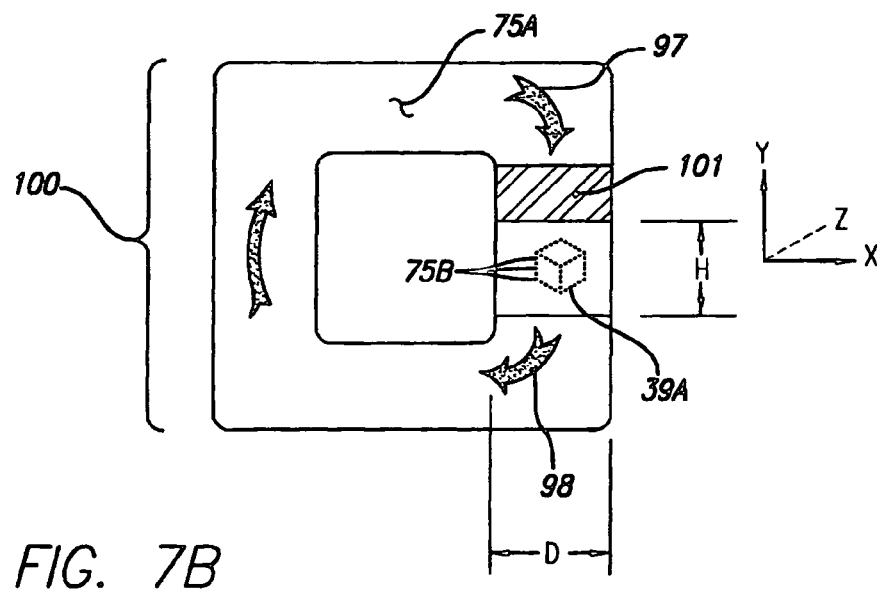

We now turn to the final figures, FIGS. 7*a*-7*b*. We note that until now, we have described closed image volumes (e.g., FIG. 4), wherein the droplets (or particulates) move, but the image volume ambient (if any) is generally stagnant, other than any net motion caused by droplet drag. Closed image volumes with reduced pressure are advantageous because it takes only modest energy to create a cloud of moving droplets or particles, particularly if they move in a near-vacuum with almost no drag or with reduced drag.

The scope of our invention also includes arrangements wherein the image volume comprises a flowing gas, plasma or liquid into which droplets, bubbles or particulates are released (to move with the flow as by entrainment or under the influence of the flowing material) or are emitted with a velocity into such a flow. We will now describe three image-volume flow designs. In these designs, the flow of the image volume ambient (IVA) moves the droplet arrangements along, and can also serve to maintain the appropriate spacing of such droplets.

Looking at FIG. 7*a*, we see a portion of a display 92 of the invention. The top portion or inlet 93 admits a flowing ambient material (gas, plasma or liquid) as indicated by flow line 97 traveling generally in the −Y direction. Top portion 93 contains a droplet (or particulate) emitter array 96 (seen on edge) with an array of individual droplet emitters 99. Shown displayed is cube 39*a* (as displayed in FIG. 4 by a different display embodiment). Shown illuminating the cube 39*a* is illuminator 25 emitting illumination bounded by lines 26. This is likely a strobed illuminator. In the variation shown, we also have a bottom portion 94 into which the flow (and droplets or their residue) continue, as indicated flow arrow 98. For argument's sake, this display is of cylindrical design so the flow and display cross-sectional shape is generally circular.

In a first embodiment of the display of FIG. 7*a*, flow 98 recirculates such that flow 98 flows into flow 97 as a generally closed loop (not depicted). Means to remove droplet material, such as by filtration, condensation, centripetal forces, electrostatics, etc., are not shown, but the droplet fluid (particulate, more generally) would be removed (at least in the form of visible droplets) and that droplet liquid used to form new droplets at emitter array 96. Emitter array 96 would, for example, be an open grid through which the IVA can flow. Mounted on that grid would be our array of emitters 99 in a manner such that we have generally straight-through flow across emitter array 96 despite our ability to emit droplets anywhere across the cross-section of the circular section. We show phantom boundaries 95 which indicate optional likely-transparent chamber walls which constrict the flow to entirely within the display. Assuming we have transparent cylinder 95 present, then we can operate the display 92 at subatmospheric pressure or at very high flow 97 (frame rate), if desired. Thus, we can reduce drag across the emitter array 96 to minimize turbulence (and undesirable lateral droplet motions), yet still retain enough drag at a likely-higher velocity that the flowing IVA entrains and carries the emitted droplets downward, thereby also substantially erasing any memory of any droplet lateral-velocity errors. In order to get reasonable frame rates, we would want a flow velocity of 5 to 25 meters/second. This is attainable with reasonable power and noise, particularly at the reduced pressure in a closed-loop system. The closed loop system may alternatively operate at or near atmospheric pressure. Illuminator 25 is shown external to the display but as for other display embodiments, it may be internal and may have other directive qualities or diffusivities. Ideally, one simply does not want illumination to be directable into the eye without first scattering off the droplets 100. We emphasize that at the reduced pressures, the pressure drop across the emitter array waffle-like grid can be kept low enough to be acceptable despite the fairly high velocity. The rule of thumb in this general display approach is to avoid chaotic turbulence in a droplet path, or the droplet trajectory may vary. Using this rule, it should also be apparent that repeatable flow trajectories that are not straight but curvilinear are acceptable, as long as a droplet admitted to that flowline stays on that flowline. This freedom allows one to have emitter arrays that emit droplets (or particulates) into a passing flow that has variable velocities (velocity is a vector with magnitude and direction). Thus, any statistically repeatable flow will allow a droplet to be admitted somewhere upstream so it repeatedly appears with the same position and time-delay downstream. Thus, emitter arrays may be at angles to flows or not completely span the flow. All are included in the scope of the invention.

In a second embodiment of the display of FIG. 7*a*, we remove the (preferably) transparent cylindrical shell 95 such that there is now an open-air gap between the top section 93 and the bottom section 94. One can still maintain a relatively uniform flow across the circular cross-section by doing things such as a) having diameter D be at least as large as height H, and preferably having D being larger than H. A second measure is to maintain a slightly negative pressure for the bottom section 94 relative to the top section 93. This measure minimizes how much of the flow leaks out at an angle to the Y-axis. Also within the scope of the invention is a system having no bottom section 95 (with or without a transparent shell 95) or having a more-substantially separated bottom 94 at a larger H dimension. We stress that as long as the displayable subject matter in the form of entrained droplets such as 100 is relatively close to the top section 93 (or within a remaining shell 95), then the flow in this region, at least, will be repeatable and substantially statistically non-chaotic. For such an "open-air" system, we prefer to keep transparent shell 95 (but eliminate or substantially displace section 94) as it nicely extends into the −Y direction the useful height of the display volume. In such a system, it would be convenient not to have to recirculate the droplet liquid and simply let it escape into the ambient and evaporate. Water droplets, or fog droplets made of the droplet materials used in commercial rock-concert foggers (glycol, chemically cracked glycol, mineral oil-based, etc,) are attractive for this application. We stress that by repeatable statistically nonchaotic flows such as that within the image volume (within height H) we do not restrict this to purely downward (−Y direction) flows. One could, for example, introduce a swirled flow to minimize boundary layers. The only requirement is that we can rely on predictable flowlines at different points in time. Also note that a display of the type 92, particularly the open-air variations, may flow their "exhaust" upwards, sideways, radially or in many other possible simple and complex repeatable patterns having known flowlines at known points in time, even if the flowlines are (predictably) changing with time. Any features of earlier displays, such as particle charging, can also electively be incorporated in displays of FIG. 7*a*, if desired.

A final variation is shown in FIG. 7*b*. This display 100 is schematically depicted as comprising a closed square loop of flowing liquid. An emitter array 101 is shown able to emit particulates, say thermally-produced bubbles in this example, into an incoming flow 97. The image display volume is again cylindrical and of height H and has a cube 39*a* shown as displayed subject matter. Note that the flow 97 is of a liquid 75*a*. Note also that our particulates in this example are thermally formed bubbles 75*b* (likely the vapor of liquid 75*a*) that make up our displayed cube subject matter 39*a*. For simplicity, we have not shown any of lighting, pumps, manifolds, etc., as they are not necessary to explain the display's operation. Now, unlike FIG. 7*a* wherein we were flowing reduced-pressure gas, here we are flowing a liquid that is minimally compressible. What this means in practical terms, in particular if an open-grid emitter array 101 spans the entire flow path as shown, we will have to create a significant pressure head to force the liquid 75*a* across (or past) the emitter/flowgrid 101. Thus, a pressure of several tens of pounds per square inch may be utilized. This can be safe as water (and most potential liquids 75), which are essentially incompressible and therefore do not explode upon vessel rupture. However, we will still preferably utilize shatter resistant glass or glass laminates for the transparent shell occupying height H. The required pressure can be applied in a number of ways, including displacement pumps and turbine pumping as by a rotating polymeric molded turbine blade (not shown). We include in the scope of the invention any pumping technology including those involving the driving of fluids 75*a* with electrical, electromagnetic or magnetic fields or acoustic fields and osmotic effects. Some pumping help may also come from pressure gradients induced by the bubbles themselves. In the case of FIG. 7*b* and a liquid 75*a* and bubbles 75*b*, our emitter array 101 would be an open flow-through waffle design with emitters arranged across its face. Note that emitter 101 is shown having an appreciable thickness compared to its diameter and this is done purposely to make it rigid in bending. Emitter array 101 may, for example, have the approximate dimensions of a hockey puck but also have a dense array of through-holes along the general Y-direction, which perhaps consume 50 to 75% or more of the cross-sectional circular area. Preferably, each such hole would have an emitter either within it or stationed near one (or both) of its ends. An array of electrical interconnections or a common electrode would allow firing of each bubble-forming emitter at the appropriate time. Obviously, one could design the display such that emitter 101 is replaceable (a consumable, even) and a filtration system separate from emitter 101 keeps any particulate generated out of emitter 101. We note that bubbles would have a lifetime long enough such that they provide the desired voxel contrast in the image volume, but then re-dissolve out of sight before they get back to the emitter for a new bubble-formation cycle. This design preferably utilizes a low-viscosity fluid, perhaps water or our suggested fluorinated liquids. Anyone familiar with fluid mechanics will appreciate that a typical fluid velocity profile across a duct or round pipe is generally parabolic shaped. We expressly include in the scope of the invention adaptation to such known velocity profiles in terms of compensating for them by applying temporal phase-corrections to bubble formation. For example, bubbles being emitted into a fast-velocity flowline would be released after bubbles going into a slower flowline such that the bubbles are illuminated only at the instants when they have correctly caught up with each other. Also, we note that the very slowest flow regions near the walls do not have to be used, as they will also suppress the frame rate possible. There are also several measures that can be taken with the fluid 75*a* itself to reduce such parabolic gradients, such as reducing viscosity, overlaying radial thermal gradients (as by through-wall heating), swirling the fluid, etc. Any known or future means of flattening the velocity profile may be applied to the invention as practical.

We have taught a number of volumetric displays based on the coordinated and preferably massively parallel management of particulates including at useful frame rates. Such particulates preferably comprise flowable droplets, bubbles or even solids. Such particulates are dynamically arranged as projection screens, shaped projection surfaces and objects which can be rendered visible in one or more colors at a frame rate. We have also taught how to form continuous film screening surfaces and objects. Our displays have incorporated "hanging" particulates, moving particulates, stagnant IVAs, and moving IVAs. Our particles have ranged from vapor bubbles to liquid droplets (doped or undoped) to more complex particulates with complex compositions and material phases. We have described open and closed systems and illuminated or activated particulates or droplets. It is a good point to note that, in particular, for structured objects being displayed, there will be no background fog whatsoever. Even for a moving projection screen comprising droplets, we can make it any thickness we want and any opacity we want, even as a function of what is being displayed. We can vary droplet size and position to affect opacity, thereby providing the real effects of hidden surfaces. Because we can illuminate or activate volumes of arranged or ordered particulates, we have better brightness, opacity and contrast than prior art layer-at-a-time illuminators. Structured objects, being constructed of at least skins of droplets if not being "solid" arrays of droplets, have multiple droplets therein reflecting, refracting, scattering, and activating each other with light or energy bounced or emitted from droplet to droplet to considerable depth (into the droplet cloud). There is no prior art volumetric display that can do this in 3-D at any frame rate or resolution.

We have taught image-wise projection screens, image-wise shaped object screens and illuminated shaped object surfaces comprised of particulates. The scope of the invention includes all such screens and surfaces in any number and combination. This includes the many described examples of screens which are translated or rotated by reforming them at incremental new positions using newly emitted or formed particulates, or which move through space due to their own particle velocities. At the new screen or surface position, the appropriate new image slice or portion is projected thereon. Thus, a moving screen may be moving in its own plane (as adjacent separately emitted vertical screens each emitted from a different single row of emitters would be) or at an angle to its own plane (as a horizontal screen emitted from a large area-array of emitters would be). The reader will realize that the key aspect here is the image projection direction relative to the particulate emission (particulate travel) direction. The angle magnitude between these directions can be from ±90 degrees to 0 degrees. When it is 90 degrees, the screen is orthogonal to the optical projector and the screen is reformed by new emissions at various incremental distances through the volume. As that happens, the projector projects the appropriate image information at each appropriate screen distance. For the 0 degree case, the emitted screen is moving directly away (or toward) the projector. Thus, the projector can project multiple image slices upon the same emitted particulate screen at incremental times without new emission. The reader will also realize that for a given angle between emission direction and projection direction, one may also time-phase the emission of the screen such that it is tilted or rotated at an angle as it travels along the emission direction. So, for example, we could have a 90 degree angle between emission (e.g., downwards) and projection (e.g., from back to front) wherein the downward traveling screen is emitted at a tilt angle of 45 degrees. In this example, the projected image is being projected upon or scanned upon a tilted dropping screen and could be keystone or focus corrected, if necessary. So here is a case wherein a single tilted falling screen with a 90 degree projection/emission angle allows for multiple image slices to be projected upon a single moving particulate screen. So now it should be clear that in addition to the projection direction and emission direction, one needs also to consider the screen normal direction (screen angle). We note that, given an available volumetric total average emission rate and emission velocity, the multiple display geometries are possible for each such combination.

We expect the display technology taught herein to first be used in engineering/-scientific computing, military/aerospace logistics, medical surgery and training, high-end gaming, and high-profile advertising where the main driving factors are image quality and realism. We expect that mass-production MEMs techniques will allow consumer-level products as well. There is no fundamental technical reason these displays cannot, with some time and volume, follow a cost-reduction curve generally akin to that impressively followed by inkjet printers.

The present inventors have developed several particularly attractive embodiments which are herein described with the help of FIGS. 8-11.

It can easily be appreciated that if one is forming projection screens or surfaces using huge numbers of arrayed particulates, and even if the particulates are tiny, then there will be a particulate material or medium pumping-rate that equals the total volume of the emitted particulates per unit of time and that can rapidly become large and expensive to deal with. This is particularly true for a large high-resolution display with a high frame-rate and a fairly high particulate or screen in-volume transit-velocity measured in several meters/second or higher.

Such displays can be designed and built, but they would probably utilize significant recirculating pumping means, which make some noticeable noise and/or consume significant electrical power. Such a high-flow situation comes about in the scenario wherein one wishes to recreate an indexed screen numerous times within a single image volume such that appropriate image slices can be projected or written thereupon—each sub-slice on a freshly emitted screen. For a volume frame rate of 60 volume frames per second and a thousand volume sub-slices to be formed along the index direction per volume frame, this amounts to 60,000 screens per second, each of which may contain hundreds of thousands if not millions of particulates in an embodiment. Such designs can quickly result in liter(s) rates of flow per minute. From an optical projection viewpoint, this is quite manageable because there are many types of projection and image writing components that can operate at 60-80 2-D frames per second at good or excellent resolutions and high color depth. However, it may be desirable to utilize a lower flow rate of particulate fluid/medium and lower operating power. This is particularly true for consumer based displays, which are price sensitive and must be very reliable.

We discovered that we could emit a droplet arrangement comprising a flying or ballistic projection screen and as it transits the image volume with a velocity, we could rapidly project or write the appropriate image subslices upon or into it as it passes through those sub-slice positions. Using this approach, one only has to emit one screen per image volume rather than the above 1000, thereby garnering a huge flow-reduction of particulate material or medium. Essentially, we are optically reusing our once-formed screen 1000 times (as it flies across each volume-frame) rather than recreating new screens 1000 times per image volume. Even better-such an approach allows all of the emission orifices to be substantially simultaneously fired by a common acoustic firing pulse thus avoiding the need for drop-on-demand (DOD) orifices.

The challenge of implementing this "optical reuse of the emitted screen" approach is that for any reasonable volume frame rate (e.g. 60-120 frames/second) and therefore particle velocity of, say 5-20 meters/second, the required projection rate of the needed image volume sub-slices is quite large, easily measured in the several kilohertz range, or several thousand image slices per second. This is very, very high in conventional consumer electronics thinking. Current LCD based SLMs or spatial light modulators used in flat-panel TVs operate much, much more slowly than this. However, the Texas Instruments digital light mirror or digital light projection line of chip products is capable of switching their micromechanical optical mirrors at these rates if not faster. In current day color 2-D flat-screen TV applications, this huge switching speed capability is used for both of two different helpful purposes:
  1) For switching between different 2-D image frames that are presented at 60-120 frames per second
  2) Within each such 2-D frame, for dithering color or light intensity as by using PWM or pulse width modulation techniques.

Texas Instruments, the inventor of the technology, has a good website at www.DLP.com dedicated to this technology (micromirror optical devices) and associated products. TI is currently developing cell-phone "picoprojectors" for projecting images upon nearby flat surfaces from cell phones. So the cost and size of DLP technology is steadily improving.

The TI DLP (digital light projection) micromirrors can be switched so fast (up to 50 khz or 50,000 binary frames/second for the fastest 5000 series chips) that they have time to switch on and off many times with a duty cycle during each present-day television 2-D image frame, those full 2-D frames being presented to the user at something like 60-120 frames per second. Thus, color and brightness control can be provided to excellent bit-depth by having different color intensities represented by different PWM on-times or duty cycles for each pixel within each such frame. The human eye and brain average such rapid switching and see an average color or intensity determined by the PWM duty cycles chosen. By the same token, also during each full 2-D image frame, a given micromirror can be illuminated by different colors coming through different portions of an in-line color wheel. So now ingoing color, color combinations and the intensity of one or more thereof can be controlled. This results in a huge color gamut of millions and millions of colors at conventional 2-D frame rates of 60-120 frames per second for current 2-D consumer products.

The current inventors herein realized that the above T.I. DLP chips can switch binary contrast at rates fast enough (up to 50 khz today) to provide our sequential images on our rapidly moving flying screens. We recognized that we could utilize these super fast mirror switching times to not only provide our rapid sequential frames on flying-droplet screens but to also provide color depth using the familiar PWM techniques, for example.

Further, by using a three-chip DLP system, we can triple the image presentation rate for a given color gamut or color bit-depth because a single chip then only needs to modulate its own color intensity, for example, red, green or blue or one of the CYMK colors. In such three-chip arrangements, one utilizes a single source of white light and a prism or dichroic elements to obtain the primary component colors. More recently, high brightness primary-color LEDs or even lasers are being used to provide primary colors.

We further realized that even further color gamut can be obtained by varying a droplet parameter, such as droplet size, which is easier to do than to switch a droplet on and off for a million or more orifices (i.e. using DOD instead). Thus, in one embodiment, we emit one or so droplet screens per image-volume and project, using a DLP chip or digital light mirror chip, rapid sequential images or content on the flying or moving droplet screen or projectable/writable surface. This results in very low particulate fluid volume circulation rates of well under 1 $cm^3$ per second. We further deepen the color bit-depth beyond what the DLP PWM can do such as by individually varying droplet size for a given screen such as by pulsing individual heaters at each emitter orifice, which can be used to modulate particulate liquid viscosity and/or surface tension. Even without orifice-wise droplet manipulation abilities, we can get appreciable colorization due to the super-fast DLP switching capability. We emphasize that the invention is not limited to moving micromirror SLMs such as those invented and sold by Texas Instruments. Further increases in switching speed are expected from T.I. and from competing SLMs of all types, including the liquid crystal LCOS types provided by Sony and others. New fast SLM technologies are also anticipated.

The present inventors further realized that historically, in general, orifice-clogging has been a severe problem for droplet emission from tiny orifices. In short, for orifices smaller than about 10 microns in diameter, the plugging rate goes up rapidly, if not exponentially, with flow-time. Consequently, orifice lumens or conduits having a diameter of 10-25 microns, for example, may be utilized while avoiding such plugging phenomenon. Those familiar with continuous or CW inkjet printing know that a pressurized orifice will emit a micro stream of fluid (e.g., ink) which, due to surface-tension forces, rapidly breaks up into pseudorandom droplets. This is called "Rayleigh breakup". It is further known that if the orifice and/or the orifice liquid-jet is excited at the right ultrasonic frequency, one can deliver vibrational perturbations which force the droplet breakup to be highly regular and repeatable, i.e., not random. In other words, the droplets can be made to be of uniform size and spacing. It is further known that for a streaming or jetting orifice of diameter D, the broken-up droplets will have a diameter somewhere between 1.5 and 1.9 D depending on the exact emission parameters. So for a 10 micron orifice, one can make evenly spaced uniform droplets having a diameter controlled to be a value chosen between 15 microns and 19 microns. The fact that the droplet size is bigger than the orifice size might be important when considering orifice spacing, because if the orifices are too close, then the expelled droplets may collide laterally. This possibility could even conceivably be used to advantage if combined or merged droplet arrangements are optically useful.

We further form our flying or ballistic projection screens or content-display surfaces as flat, faceted or generally curved surfaces with a large lateral dimension(s) and a much thinner thickness dimension. The thickness of a flying or ballistic projection screen therefore might comprise 1-20 spaced droplets, whereas the lateral dimensions or lateral diameter of the screen may comprise a thousand or thousands of droplets. We remind the reader that such a projection screen will typically represent a sub-slice of an image volume at a given index (flying) position and we intend to very rapidly project or write many such image sub-slices on it as it flies through the image volume for each whole image-volume frame.

So in the example case of emitting approximately one screen per image volume and utilizing rapidly switching DLP or digital micromirror chips, one can obtain 30-60 and even 60-120 image volumes per second frame rates with low fluid consumption and still provide some moderate color depth of 4 or 8 bits or more, depending on the size of the display.

Even more importantly, this scheme allows for the simultaneous emission of the entire screen's droplets substantially at once, which means that the individual emitters do not necessarily need to be individually switchable (on/off) or of a DOD nature. We teach below means of emitting flat and curved screens in this manner.

Finally, we mentioned that a projection screen might benefit from being several droplets thick. This requires that for a 60 frames per second volume frame rate, one screen is emitted every $1/60^{th}$ of a second and that each emission event emits a thin "slab" of droplets, the slab being the screen. We have discovered that the continuous inkjet approach of applying high frequency ultrasonic excitation can cause these multiple droplets forming the screen or slab thickness dimension to be regularized in size and spacing along that thickness direction, if that is desired.

So if we have a 60 hertz pressure pulser which delivers, for example's sake, a delta function isolated square-wave pulse of pressure every 1/60th of a second and that pulse width is on the order of 50-100 microseconds, then we will squirt out all of the orifices a short stream of particulate fluid. If we superimpose the regularization ultrasonic excitation, say a 16 kilohertz signal, then we can force each such short stream to break up into a few identical droplets. The 16 kilohertz breakup perturbation excitation might be constantly run as it may be of very low amplitude and does not even need to be coaxial with the jetting direction of the orifices. So in this scenario, we have isolated square waves that emit the screens, each square-wave further "roughened" with a high frequency low-amplitude droplet-regularization perturbation.

We note that the low frequency (volume frame rate) screen emission pulse at, say 60 hertz, can be delivered by several types of transducers, solenoids, positive displacement plungers and precision flow controllers such as piezo flow controllers. A simple example is a positive displacement pushrod piston coupled to a stack of actuating piezodiscs. These are widely available from companies such as Physik Instrumente at http://www.physikinstrumente.com. Another example would be a diaphragm which is shocked to move along its thickness direction (bending membrane) as by an electromagnetic coil/magnet arrangement-essentially a liquid coupled speaker system. We do not limit the invention to any particular means of delivering the low frequency (e.g., 60 hertz) screen-emission pulses nor, if used, the high frequency (e.g., 16 kHz) droplet—regularization or perturbation excitation. They may even be the same excitation means or utilize the same transducer.

It will be appreciated that a curved non-flat screen as opposed to a flat screen will be emitted if an emission parameter varies, for example, radially from the center of the emitter face laterally outwards. As some examples of this we have:

1) The thickness of the emission orifice plate and therefore the length (depth) of the emission orifices could be made a function of plate radius, resulting in a radial emission-pressure gradient which in turn results in a radial emission velocity gradient. This can provide a screen that increasingly bends (domes) as it progressively flies downward in the volume in a predictable manner (due to the screen's non-uniform velocity).
2) The diameter of the orifices can be graduated-radially resulting in higher emission velocities from the larger orifices-again resulting in a shape changing screen as it flies.
3) A pulsing transducer could be located in the emission plate center and its pressure wave made to travel sideways or radially (sideways as in FIG. 8). In this manner, each orifice experiences a slightly different firing time because the excitation wave has a finite lateral sound velocity.
4) The emission plate can have its stiffness and resonance (if any is desired) tuned such that its own (e.g., bending, compression, shear) deformation modulates a pressurized firing wave produced by a firing transducer. For example, a centrally located pulser transducer would both emit droplets but also excite the emission plate, which in turn will modulate the pulsing pressure as a function of radius for that excitation pulse while it travels sideways.
5) The emission plate itself could be excited such that the orifices themselves squeeze-out their contained fluid. A tapered orifice would probably be best for this. Employing a piezoelectric. electrostrictive or magnetoacoustic orifice plate material is also within the scope of the present invention.

We also note a particular serious shortcoming of the prior art in the above-cited Actuality Systems Perspecta™ display in that it uses a rotating solid plastic screen. So when a viewer or user looks at the Actuality display, he/she can see the screen somewhat as a grayed-out region when the screen is near or at being oriented edge-on to the viewer. This is expected physically but is highly undesirable. Our display herein will not exhibit this undesirable behavior nor make the considerable rotational noise as does that prior art display.

Moving now to FIG. 8, we see, in section, a variation of a display arrangement. We see an orifice emitter plate 201 which has just emitted a flat horizontal screen 205 comprised of approximately four shown layers of droplets (not to scale). The flying screen 205 proceeds downwards with a velocity indicated by $v_2$. A coordinate system on the right hand side makes it clear that screen emission is in the downward −Y direction and the large lateral dimensions of our screen lie in an X-Z plane. The screen is shown flying through or transiting the image volume which has a background composition and pressure 207. A single micro stream of particulate fluid 201D is depicted before its Rayleigh breakup having emanated from an orifice 201*a*. Three droplets 201*e* are shown having already formed from the downwards emitted micro stream 201*d*. The droplets are shown having a droplet diameter oft. Recall that for Rayleigh breakup of a continuous stream coming from an orifice with diameter D, we get a droplet size of t being between about 1.5 D and 1.9 D. Note that we depict the individual droplets 201*e* moving also with relatively constant velocity $v_2$ which would be the case if the image volume pressure 207 is low and the droplets are neither significantly accelerated nor decelerated after their emission event. For our typical emission velocities measured in meters/second, the acceleration of gravity over the short display height has a minor accelerating effect.

Referring again to FIG. 8, we see that the emitted screen of droplets 205 is headed for collision with a droplet catchment pool of particulate fluid 203*b*. We also depict a droplet-fluid flow-return tube or wick 203*c* for returning spent droplet fluid 203*b* to the emitter 201. The transiting or "flying" screen 205 is depicted having droplets such as 205*a*-205*c* laterally spaced in the X direction (or in an X-Z plane) at a spacing which, on average, is the spacing of the emitters of the type 201a which emitted them. Note that the multilayer droplet screen 205 has an overall thickness in the flying or emission direction of $t_s$. In the drawing, $T_s$ is depicted, again, as being four or so droplets thick. By four droplets thick, in the depicted example, we mean four droplet diameters plus, typically, three intervening spaces on average.

It will be appreciated that the droplet spacings in the X-Z plane are determined primarily by the emitter lateral spacings presuming the emitters fire on parallel paths. These spacings are determined by the orifice array pattern which could be, for example, an M×N array, a hexagonal pattern array, or even a random array. It will also be appreciated that the vertical Y-axis spacing of droplets along the $t_s$ dimension is determined by the orifice streaming parameters.

Figure 8:
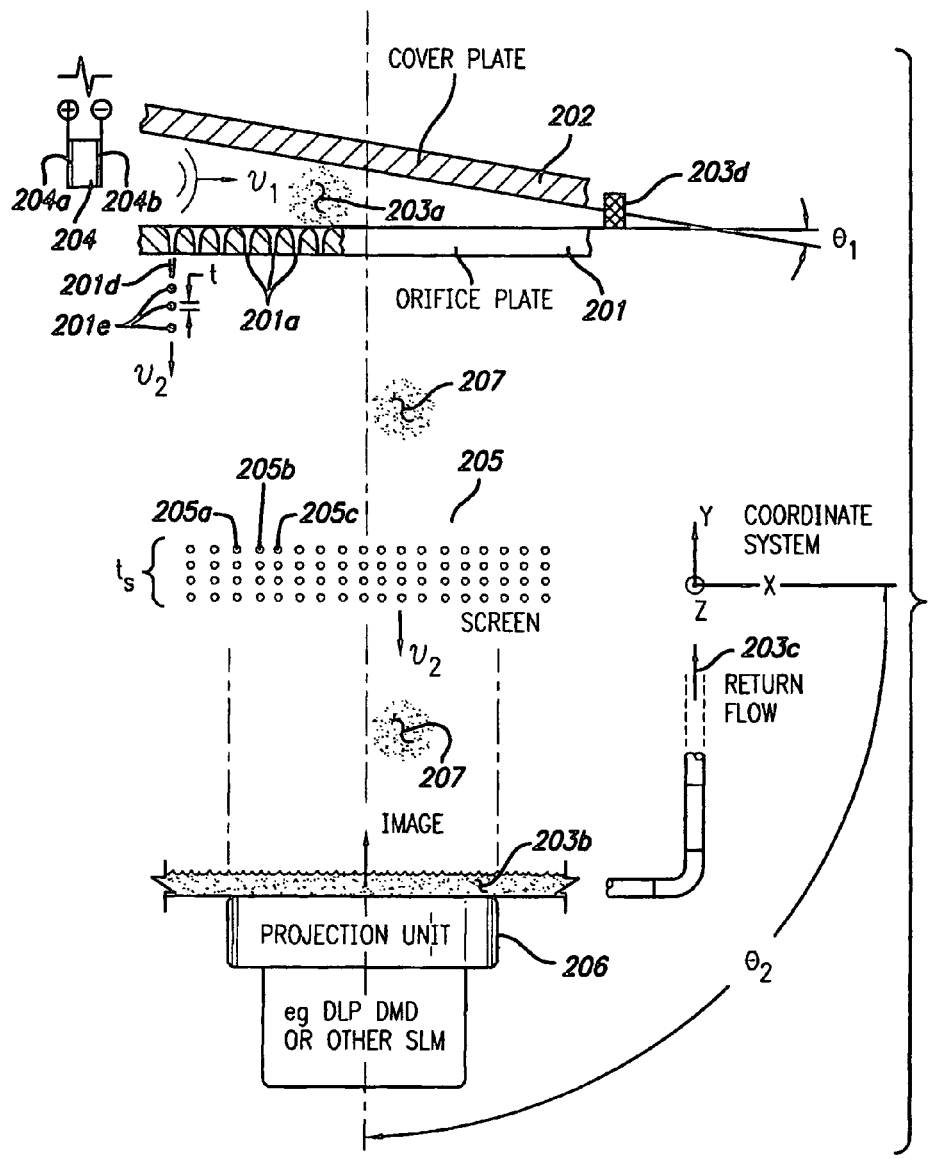
FIG. 8 is a sectional view of a downward emitted "flying" projection screen formed using acoustic-wave emission triggering, the emitted screen which will have multiple image sub-slices projected upon it from below as it flies to form one complete 3-D image volume or frame.

In the particular example of FIG. 8, we depict a 60 hertz (volume frame rate) pressure-pulser in the form of a piezotransducer 204 having driving or excitation electrodes 204a and 204b. What is new in this pressure pulsing scheme is that we send the pressure pulse laterally across the emitter fluid chamber 203a with a velocity $v_1$ which would be roughly 1550 meters/second, an approximate sound velocity for a liquid (e.g., water). We also provide a fluid-filled manifold enclosure 203a which is tapered from left to right as by the slanting of enclosure cover plate 202. This tapering provides an amplification of the rightward-going pressure pulse such that it does not lose strength as some of its intensity is bled off at each lateral orifice position with each such sequential emission. We also depict a pressure or shockwave absorbing member 203d at the right hand end of the fluid manifold 203a. Its purpose is to prevent reflection of the pressure pulses backward or leftward causing unwanted emissions and interference.

Note in FIG. 8 that the image projection DLP unit 206 is projecting an image slice at this instant upward through the catchment pool/film 203b and upon/into the flying screen 205. At first glance, it might seem difficult to pass a high-quality image through a liquid pool or film such as 203b. However we have discovered that the liquid "pool" can actually be a wetted surface of transparent glass. It turns out that a flat screen of microdroplets wets out smoothly upon impact almost instantly such that the image is barely interfered with. The smooth liquid film is continuously wicked off the catchment as by surface tension forces. We emphasize that image projection (or beamed vector-writing or raster-writing) upon a screen surface as shown in FIG. 8 will be at some angle $\theta_2$, which in this example, is shown to be about 90 degrees. We have seen that angles other than 90 degrees can work even better, say 45-70 degrees, as long as one avoids delivering the projected or raw image directly into the eye of a viewer. This can be avoided by sinking the projector low in the display (as shown) and as by utilizing a collimating honeycomb layer through which the image is directed (not shown). Such very thin honeycomb layers can be made as by electroforming. They are used today as a privacy tool on laptop screens as the laptop screen can thereby be read only from directly in front. Further, one could utilize a tilted-orifice plate 201 (untilted shown) to get a projection angle other than 90 degrees. An alternative to this would utilize orifice holes 201a which are formed at other than 90 degrees (90 degrees shown) into emitter plate 201. In FIG. 8, the DLP or SLM projector could also project from the side or at an angle upon the screen. Multiple projectors may also be attractive. If using multiple projectors, one may beneficially have a multifaceted screen or multiple screens flying in the image volume. The opacity of the screen will be set depending, in part, on whether projected images from a first side are to be viewable also on the second side (as by translucent passage or double sided projection). A fully opaque screen could accept projected images from one or both sides, one probably being the mirror image of the other if there are two. Here we do not claim to have found the most optimal projector(s) to screen geometry and simply say that many geometries are employable depending on need. Further, we have described flying plus rotating screens which have variable screen to projector geometry.

In one embodiment, the projector is a DLP based or super fast SLM device and it is situated inside the imaging device. However, it should be clear that one could also have the projector outside the image volume and project an image into it from outside the volume as shown in FIG. 8. In the imaging device of FIG. 8, we have not shown a pump to circulate microdroplet fluid. Recall that the volume flow rate of the "one screen-per-image volume" approach is very low, around a few % of a cubic centimeter per minute. Given this, one might even utilize wicking or vaporous fluid return and condensation in a manner similar to how a heatpipe works. Even if a pump is used, it should be apparent that it can easily be a tiny quiet pump of almost any continuous or pulsatile design, such as a MEMs-based pump. A small fluid reservoir such as 203a in the emitter region may act as a fluid volume buffer and allow use of a pulsatile pump.

The image-volume background ambient 207 in FIG. 8 is most likely primarily the vapor pressure of the particulate liquid itself, a pressure value usually much lower than one atmosphere. One may boost this pressure or dilute that vapor as by adding a background inert gas such as nitrogen, argon or helium. Helium is particularly good for its cooling benefits. Typically, we desire low aerodynamic drag on flying or ballistic droplets to avoid droplet breakup or slowdown, thus the sub atmospheric pressure 207 in the image volume. An atmosphere is approximately 760 Torr and we anticipate a typical image volume pressure of a few to tens of Torr, depending on particulate composition and display operating temperature. We have so far utilized cast acrylic as the transparent chamber, as it is easy to manufacture with excellent optical clarity and finish and it is sufficiently strong at thicknesses of ⅜ inch for a one-cubic foot prototype display So in FIG. 8 we have a flying screen 205 which is oncoming toward a DLP projector 206, the projector 206 operable fast enough that it can "flash" something like hundreds or thousand of image slices on to that oncoming screen in the roughly $\frac{1}{60}^{th}$ of a second the screen 205 takes to transit the volume. If this display were 12 inches tall, then the vertical resolution would then be about 12 in/1000 slices=0.012 inches per slice or about a quarter millimeter.

In FIG. 8 we depict a four-droplets thick screen 205 (thickness shown greatly exaggerated). We remind the reader that the screen might have any thickness from one to tens of droplets or more and that the adjacent droplets need not necessarily be traveling downwards exactly opposite each other. In fact, some natural randomness will assure this is not exactly the case and this will likely reduce diffractive effects which might be experienced with a regularized truly ordered perfect array of droplets. By the same token, the vertical droplet spacing within each orifice stream might actually beneficially be somewhat random to minimize diffractive effects and minimize lateral droplet collisions. However, we include in the inventive scope purposeful allowance for some level of collisions wherein the bigger combined droplets are visually beneficial. Generally speaking, a thinner screen (fewer droplets in thickness) will provide higher vertical resolution, whereas a thicker screen (more droplets in thickness)

will provide better opacity and image-brightness. Several droplet-thick screens are expected to be commonly used, such as 3-10 droplets, for example.

It should be mentioned here that we are projecting and presenting image sub-slices so fast that one may operate the color lamps or color LEDs virtually continuously while the micromirror chip switches with the illumination on or transitioning in luminance. However, we expect some amount of color depth to be employed as by PWM mirror switching and this can assure reasonable black levels.

The interior or exterior surface of the image volume chamber may also be beneficially coated with an anti-reflection, optical bandpass or optical band-blocking optical coating(s) if that is beneficial. It may also optionally be coated with a surface tension controlling agent such as an agent that assures rapid wet-out of any droplet which unintentionally or intentionally contacts the chamber walls. Rapid wet-out would assure that the event is optically insignificant.

Finally, referring again to FIG. 8, the screen 205 shown generally on-edge is depicted as a flat X-Z plane. The present inventors find it beneficial to emit a somewhat non-flat screen, or curved screen (not shown). In that manner, if one is sitting directly in front of the display, one is not looking at the screen edge-on for any appreciable distance. In fact, if the screen is somewhat domed, then a viewer sitting next to it looking somewhat down into/onto it will always have a large illuminated area redirecting light to his/her eyes. This can greatly improve apparent brightness. Such a domed screen may be rotationally symmetric about its center so any viewer from any side would see the same effect and benefit. Alternatively, or in addition, since we are emitting such a huge number of such screens so quickly, one may alter a flat screen's tilt from screen to screen and get the same apparent scattered brightness improvement for any given stationary observer.

In the FIG. 8 example, we have not shown any means of accelerating, decelerating or laterally steering the downwards moving droplets, although that is possible using, for example, a high voltage gradient and charged droplets. In one approach shown, the droplets move across the image volume at a velocity close to their emission velocity with minimal slowdown and deformation due to drag effects, thus leading to the reduced pressure ambient 207.

Droplets might be electrically charged, if not by charging means, by triboelectric effects of the emission process itself. We include in the scope of the invention the rendering of the liquid conductive and/or the purposeful compensating of charging of the droplets such as to neutralize this phenomenon if it is not desired such as for acceleration or if it causes too much undesirable droplet-to-droplet repulsive or attractive forces.

Figure 9:
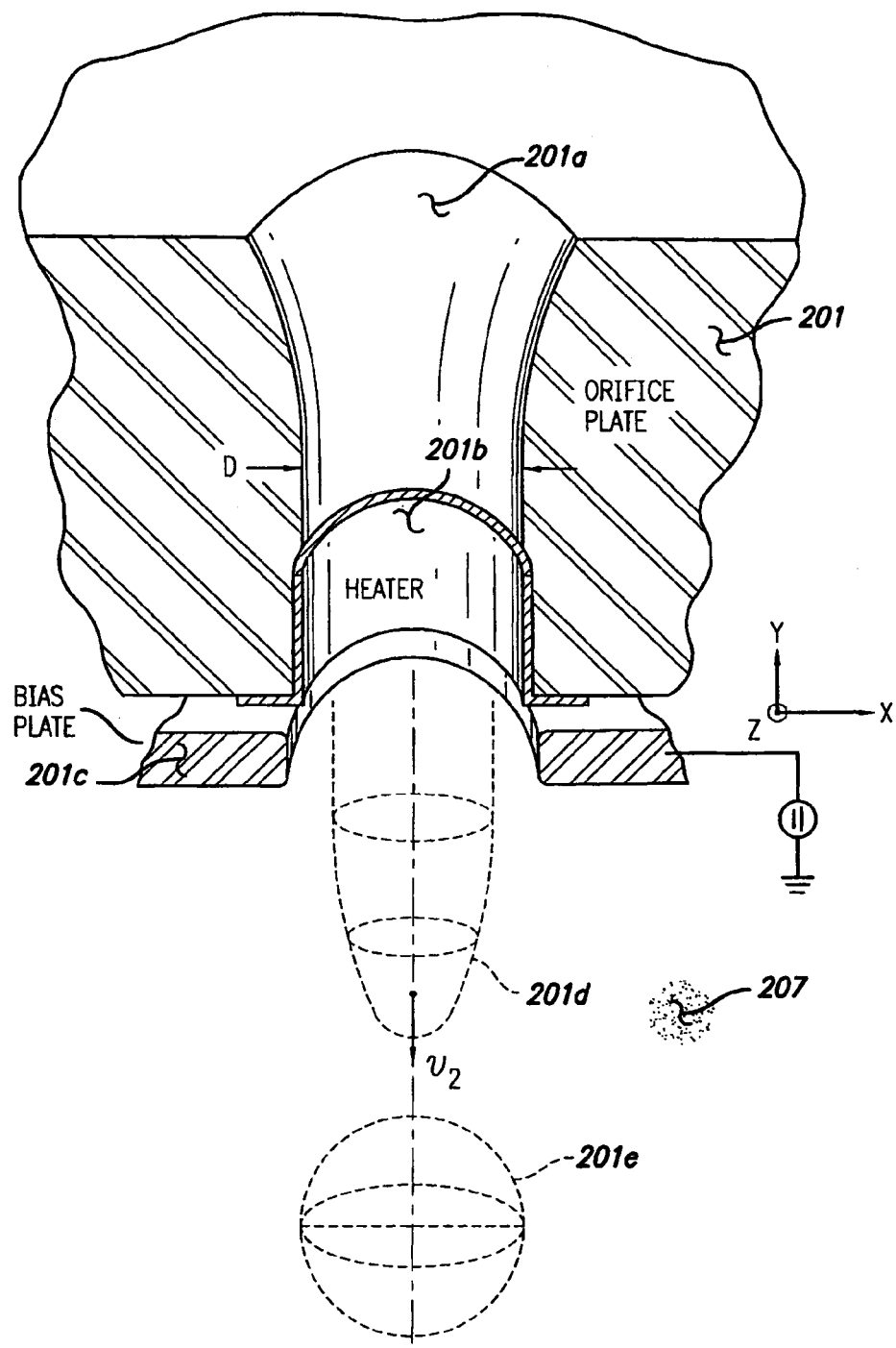
FIG. 9 is an enlarged sectional view of FIG. 8, depicting a single droplet-emission orifice showing a micro stream of fluid (in phantom) breaking up into droplets and an electrical droplet-biasing plate and an orifice or droplet heater-element.

Moving now to FIG. 9, we depict therein another orifice plate 201 in section but this time at higher magnification looking at one particular orifice 201*a*. The orifice 201*a* is of outlet diameter D and it has a larger tapered top section and a cylindrical bottom section. We depict a heater electrode 201*b* in the emission-end of the orifice. As mentioned previously, by using the heater 201*b* in orifice 201*a*, we can pulse-heat the outgoing liquid. In this manner, we can dynamically vary the liquid surface tension and liquid viscosity, both of which will affect droplet formation reproducably. These effects can be employed to contribute to droplet size/spacing changes which can be employed to further vary color or some other visual parameter on a spatial basis. Changing the emitted droplet temperature in this manner may also be utilized to controllably vary some other color-dependant parameter. As an example, a droplet fluorescence amplitude or wavelength might be manipulated.

Also in FIG. 9 can be seen an orifice electrode 201*c* mounted beneath orifice 201*a*. This orifice electrode may be used, for example, to apply a charge to the emitting stream 201*d* (in phantom) before it breaks into one or more droplets 201*e* (in phantom). In that manner, akin to continuous inkjet printing, one may steer charged droplets laterally or may accelerate/decelerate them vertically with additional field-application electrodes as appropriate. The electrode 201*c* may also, as mentioned above, be utilized to neutralize triboelectric charging of droplets in the case wherein inter-droplet electrostatic forces are causing problems such as undesirable droplet melding, fusing or repulsion. In FIG. 9, we again depict the image-volume background pressure 207 which is most likely set, at least in part, by the partial pressure of the emission liquid at the display operating temperature. Finally, if droplet electrical manipulation is useful for any display purpose, such as droplet charging or neutralization, it may be applied to individual droplets on-demand or to all droplets on-demand or with simultaneous common switching of the bias.

Moving now to FIG. 10, we again see a single orifice 201*a* in an orifice plate 201. However in this example, we also depict a flapper valve 201*f* which can open and close the emission fluid's flow into the orifice 201*a* from the orifice fluid-source 203*a*. The "flow" arrow shows the general flow of the emission liquid into the open (201*f*) flapper or cantilever valve. Those familiar with MEMs or microelectromechanical systems will know that dense arrays of such cantilevers are easily fabricated. We further show electrical resistance layers 201*g* infused into the polysilicon (for example) cantilever 201*f* which might be employed to provide heating pulses to actuate or perturb the cantilever in or into one or both of opening or closing motions. The cantilever or flapper valve 201*f* is depicted as having a bendable thickness t. Those familiar with mechanics will appreciate that if we want the valve 201*f* to be closed during an emission pressure pulse (emitting from other orifices, not from this closed orifice), then we can provide a valve which is slightly normally open and simply perturb it slightly more closed at the right instant such that it is snapped shut with the help of the emission fluid pressure pulse itself. This greatly reduces the energy involved in driving these valves. In an analogous fluid-switching manner, the heater of FIG. 9 may be used to create an interfering bubble in the orifice which blocks droplet emission while the bubble is present—the bubble oscillating instead and reflecting the pressure pulse. In that case, the cantilever 201*f* may not be required.

Figure 10:
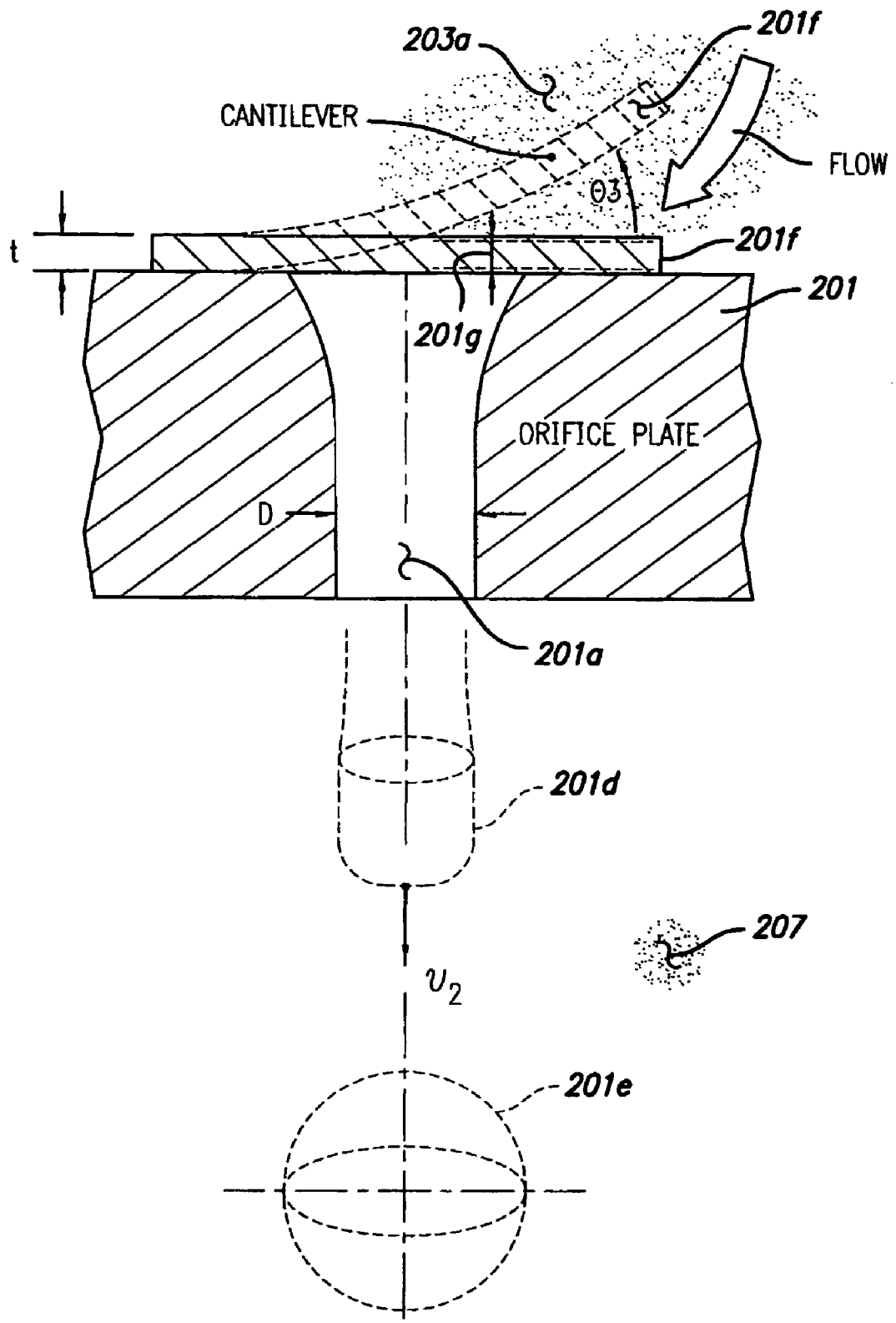
FIG. 10 is an enlarged sectional view of FIG. 9, depicting yet another droplet-emission orifice having a flow-switching articulating member such as a cantilever flapper valve. The orifice valve allows for drop-on-demand (DOD) operation of the orifice.

The individually modulatable or switchable DOD orifices of FIG. 10 may also be employed in applications wherein rather than emitting whole screens one is emitting the taught pseudo-solid objects which are illuminated possibly by just primary color combinations but also possibly by "wrap-around" images. The emission of on-demand DOD shaped droplet arrays in three dimensions requires orifice-by-orifice switching as shown in FIG. 10. Recall, however, that we can modestly shape a screen even without orifice DOD switching-such as making our above curved screens. Note again that a preferred inventive embodiment was the earlier taught screen-at-a-time emissions, which do not require each orifice to be individually time-delayable (e.g., DOD) with respect to others.

Figure 11:
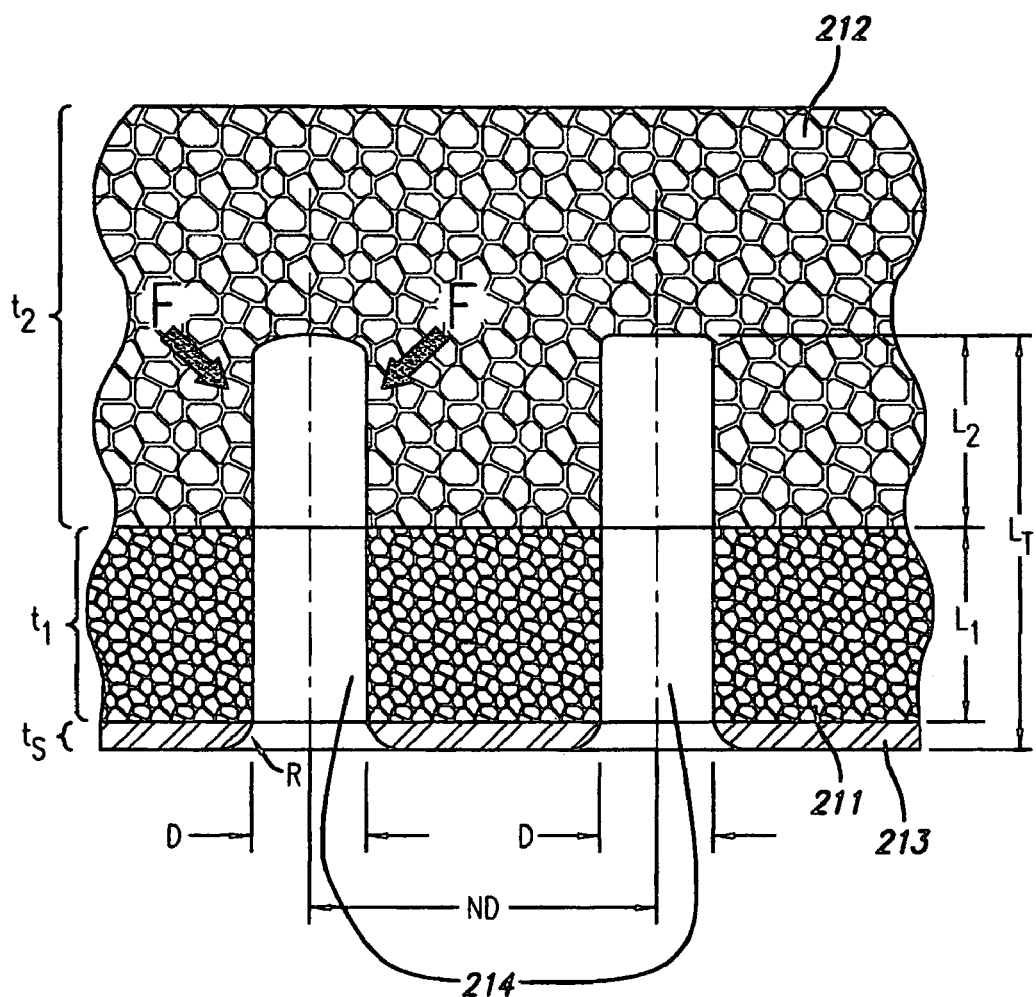
FIG. 11 is a sectional view of a permeable emitter-head with two orifices shown, the emitter head having a dual layer emitter with a third overlying or surface-infused emitter face overcoat material which is unwettable.

Moving now to FIG. 11, we see in section another orifice plate 212, this time with two orifices 214 depicted. Unlike previous designs, this orifice plate 212 is mostly permeable to emission fluid. The permeable orifice plate is shown as having two distinct permeable layers, a main coarse pore permeability layer 212 of thickness $t_2$ and a finer—pore permeability layer 211 of thickness $t_1$. We depict two orifices 214 of diameter D having been drilled into the orifice plate to a total depth $L_t$ wherein $L_t$ is primarily composed of $L_1$ and $L_2$. We depict fluid flow "F" out of the permeable layers 212 and 211 into the two orifices 214. Finally, we depict a cover layer 213 coating the external emission face of the orifice plate. This layer, if employed, may for example be hydrophobic or liquid-phobic and prevent droplet formation on the orifice plate emission face. The mouth of each orifice 214 is radiused with a radius R. The present inventors have found that commercial ceramic filter materials may be employed to make the orifice plates 212/211 and that excimer laser drilling is ideal for drilling orifice holes 214. The over-coating fluid-impermeable layer 213 may be, for example, a very thin coating of thermally fused PTFE. During display operation one would inject the emission fluid into the permeable wettable orifice plate 212/211. Note that the bulk of fluid emitted by each orifice will likely come from the coarse layer. The reason that we use both a coarse layer 212 and a fine layer 211 in this embodiment is that the fine pore layer 211 allows for high-definition orifice-making, whereas the coarse pore layer 212 allows for maximal flow. An excimer laser may beneficially be used because it leaves no flow-plugging slag; however, the holes or orifices 214 might alternatively be drilled or etched as by utilizing dry plasma etching. The overlayer 213 may even serve as an etch mask for forming the orifice holes 214 such as if it were a gold film. Ceramic dual-layer and single layer materials are available from companies such as Refractron of Newark, N.Y. and found at www.refractron.com on the web.

Another way of forming an orifice array is to use what are called "capillary arrays". These capillary holes can be as small as microns or even one-micron in size. These were originally developed as fiber-optic image manipulation components; however, more recently they have been utilized as microfluidic components such as in biomaterial printing equipment.

A first source is Collimated Holes Inc. of Campbell, Calif. found at www.collimatedholes.com on the web. In particular, their glass-fiber fused and wet-etched structures are highly suitable for our purposes here. They can fabricate orifices easily down to 10 microns and below and arrays of these can have very tight spacing and be as large as a foot on an edge. An intrinsic advantage of capillary arrays is that their orifice holes are highly coherent or parallel to each other and they individually have very smooth surfaces. The holes can also be formed at an angle to the array emission surface if droplets are to be emitted at an angle to the emitter face. Basically, a fused solid glass slab of fiber optics has it's fiber-optic cores selectively wet etched out (removed) using an HF solution. The etched-away fiber cores become the capillary holes whereas the remaining fused outer fiber claddings form the remaining fused structure containing the capillary holes. This fiber-optics based technology, now also being diverted to microfluidics applications, provides tiny orifices without lithography or the use of directed etching laser beams.

A second source of collimated etched glass holes, or as this vendor calls them "GCAs or glass capillary arrays", is Burle of Sturbridge, Mass. They are located on the web at www-.burle.com. They have made arrays with as small as 2 micron holes and have provided large arrays several inches on a side. Of interest is their capability to render their glass semiconducting on selected surfaces. They can also place metallic electrodes to contact such conducting or semiconducting areas. This ability is quite useful for the invention in cases wherein we wish to ground or apply a potential to the emitter and/or charging/discharging emission electrode(s).

The present inventors have also investigated a combination of the above two methods wherein we have essentially laminated permeable ceramic backers to glass-capillary emission orifices. This technique is attractive because the ceramic provides all the stiffness or rigidity whereas the emission capillary array can be much thinner, say a few mm or less, to keep its fabrication cheaper and to reduce its inherent pressure drop. The thicker ceramic backer (without any needed orifices other than it random pores within it) serves to uniformly feed emission material to the emitter orifice array—and even more importantly it provides large rigidity such that the laminate can take a significant one-sided pressurization if necessary. Our preferred emission pressurization technique would have the emitter head be its own sealed pressure chamber such that it does not bend or deflect during pressurization of the emitted material. Note that such pressurization may have DC and/or AC components. The challenge in this ceramic stiffener/glass emission array sandwich approach is to avoid blocking flow-paths/orifices of the emitted material during such lamination. We have found that a thermally fusible thin film of glass can do this fusing or joining job and that that fusing film can easily be carefully etched out (of the capillaries) during orifice hole etching if desired-particularly if it etches slower than the orifices themselves. Such etching can be wet or dry etching, for example. The fusing film might be applied to one or both of the ceramic backer or the capillary emission plate. We also note that porous glass and quartz is available and that can substitute for the porous ceramic as might even a porous metallic layer of low expansion.

Another way of forming an inventive emission orifice plate, and even its related internal plumbing and manifold, is to utilize HF wet-etchable photosensitive glass such as Schott's Fotofuran™. Such materials can be exposed to a UV laser and then are selectively wet-etched, or "developed", at the laser-exposed sites. Using this technique, 2-D and 3-D fluidic features can be formed down to about 25 microns in size. Another company, Invenios (www.invenios.com on the web) of Santa Barbara, Calif., provides equipment and processes related to the associated laser-exposure steps for such photosensitive glass materials. Some inventive displays herein may be constructed using this technology having such orifices of 25 microns or larger. The technology might be pushed to smaller features particularly if the glass grain size is reduced. Using this technology not only can orifices be formed but delivery-manifolds and lumens can also simultaneously be formed.

In FIG. 8 we depicted DLP 206 projection of images through a catchment liquid pool or film 203b. However, we could also possibly project such images (or lighting) through the orifice plate 201 itself (this projection arrangement not shown in FIG. 8). This is quite doable if the liquid-filled orifices and chamber of the orifice emission plate are optically clear or translucent. Thus, within our inventive scope, is any desired matching or non-matching of the optical indices of refraction of the orifice plate (or its sub-materials) with the emission fluid to optimize such through-emitter projection and/or lighting/illumination. In that scenario, the emitter becomes both a microfluidic component and an optical component.

So, one embodiment has approximately one emitted screen per image volume frame and while that screen transits each such volume-frame, it has the appropriate image sub-slices rapidly projected upon or written upon it using a very high speed spatial light modulator or SLM such as a Texas Instruments digital micromirror DLP product. The observer's eyes average both the 60 or so volume frames per second and the even-faster presented subslices therein. Although we have depicted in FIG. 8 a downwards emission of screens, downwards emission is not a requirement. Although we have depicted in FIG. 8a 90 degrees or normal projection of images upon the screen, we have already stressed that an angled and keystone corrected projection can also be practiced and can allow one to avoid having to project or illuminate through either the catchment liquid 203b or the emitter 201.

The display system of FIG. 8 would most likely be sealed from the ambient akin to a CRT tube, albeit at a somewhat higher residual pressure measured in millitorr or a few Torr. In this manner, the emission fluid can be endlessly recirculated and is never worn out, depleted or lost. These pressures are still well below atmospheric pressure, much closer to true absolute vacuums.

3M Fluorinert™ and Novec™ engineering fluids, as just two examples, may be utilized as emission fluids, with the Novec™ fluids having the superior environmental properties. (It will be recalled that the device is preferably sealed.) In general, it is desirable to use a non-corrosive, non-residue leaving fluid which has good heat-transfer properties. In this manner, the display can operate in a cool manner, particularly if the fluid is circulated past the active electronics and/or light sources. The DLP chips may be operated in such a fluid or behind a window separating them from the fluid. The fluid may be electrically insulating or conductive and that conductivity may be due to the fluids inherent properties, an exposure of the fluid to an activation or illumination, or due to a filler or dissolved material in the fluid.

We have previously discussed above the possibility of warming the display volume's chamber-walls such that any emitted droplet material which gets on the walls will be evaporated. However, we also note that these droplets are so small that, presuming they wet the display wall through which one looks, they almost instantly convert to a flat microscopically thin transparent film of liquid. Thus, occasional random droplet impacts on the interior walls can be a non-issue even if they wet the walls.

We include in our inventive scope inventive displays wherein the display has or contains already-formed or predefined particulates. Essentially, this means that particulates are recirculated, presuming a recirculating display, in the form or shape of defined particulates. Therein particulate provision comprises, for example, a reservoir or container of such preformed particulates. A disadvantage of this approach, while not fatal to successful design, is that solid particles especially can wear out and generate debris. They may also tend to clog orifices or coagulate. Such particulates might even be provided for temporary use as a consumed item. For such reasons we generally prefer flowable reformable particulates which can be recirculated to the emitter reservoir as by bulk liquid pumping or vaporization and recondensation. An in-between embodiment would be a particulate media comprising a flowable suspension liquid and solid-like particulates entrained within it. In one such scenario, only the particulate could be emitted as by employing the wetting entraining fluid as a propellant.

With regards to interacting with our inventive 3-D display, we mention the impressive success that the Apple IPOD™ product has had utilizing a touch-sensitive screen. We likewise anticipate a similar use of touch technology for our display herein where it would be used for 3-D and not just 2-D manipulations. As an example, a touch-technique may be employed to establish a cutting section into a displayed 3-D object-or to rotate or translate an object. Further, our inventive display may also utilize conventional mouse-pointers as well as gesture and motion-based tracking devices. The outer surfaces of the display volume may be made touch-sensitive. Such touch or gesture motions may also be used to rotate or slide the image content in the image volume.

The invention is particularly applicable to robotic surgery, therapy, diagnosis, a variety of precision manufacturing/processing applications, and to dangerous processes and offers a new paradigm for that. Using this display, a surgeon or practitioner can treat the displayed tissues as the real tissues and not be bothered with the actual surgical tools on the robot or the imaging devices utilized to create the image, whether they are on the robot or not. That is to say, the surgeon could interact with the displayed 3-D tissues using his moving hands (and possibly actual handheld tools or tool-holders) outside the 3-D display volume but reproduced graphically inside the 3-D display volume. If the surgeon looks at the combined tissue/hands image in the 3-D display, he/she will manipulate his/her hands/tools as if he/she were looking at his/her real hands and tissue rather than an image or reproduction of them. Doing this requires that the surgeon's hands and tools be spatially tracked and there are many spatial tracking technologies available, including magnetic and optical tracking as well as inertial motion-sensing. It should be apparent that we have created here a completely artificial but potentially photorealistic virtual operating space used to drive a robot which actually does the surgery. The "robot" might be a full robot such as the daVinci™ Intuitive Surgical robot or might be a laparascope which is handheld and whose working-end is inside a sufflated abdominal cavity with video cameras for example. In this latter handheld laparascope (or other MIS scope) case, the surgeon would still be doing some or all of the tool-driving. The key here is that in cases above the surgeon observes and reacts to the 3-D image of the tissue/hands. Of course one may provide force sensing or haptic features to such a system a well.

To be complete regarding the application possibilities of the inventive displays, we also mention that the surgeon, in another approach, might possibly manipulate surgical tools which actually physically stick into or penetrate the display volume and depicted objects therein. Although the actual tools doing the surgery would be handled by a robot, the surgeon would physically see real tools moving on and in reproduced tissue and organs.

In either manner, the training of new surgeons would be far easier since the surgeon would have spatial feedback as if the patient were actually opened up and the operating site mostly or fully exposed. Such a system would likely produce an image of the surgeon's tool or robotic tool in the image volume and move it exactly as he/she moves the one in his/her hand (presuming his/her real hands are outside the display volume). Advantages of robotics such as tremor-removal could still be practiced. Imaging modalities that might support such surgeries include ultrasound, terahertz imaging, optical coherence tomography (OCT), MRI, CATSCAN, fluoroscopy, PET, IR and NIR imaging and CCD/CMOS-chip video or static image gathering.

We taught earlier that an atmospheric (rather than a reduced-pressure) display image-volume is also possible and gave some examples of that. The user might actually physically reach into the display bare-handed or with flexible gloves. Such "reaching-in" could include holding tools in the image volume and having the robot reproduce that tool manipulation on/in the patient's body. Such "reaching-in" could include means of providing an air gasket around the hand/arm if the display runs at subatmospheric pressure.

In the case of an atmospheric-pressure display emitting (or accidentally leaking) microdroplets into an ambient, we could arrange for the droplets to rapidly evaporate—as they will do if they are very small and the nearby humidity is low.

The surgeon's hands will be no wetter than if he had done the actual open-surgery. Such ambient communicating displays would likely utilize water as the microdroplet material as it is safe.

In gaming and communication applications, for example, it should also be possible for a user to be entirely physically immersed in an atmospheric display of the invention. In this manner, he/she can physically meet his/her friends while talking with them. In these cases of full atmospheric immersion, it is anticipated that microdroplets may be larger, say 30-150 microns in diameter and resolutions more on the order of a millimeter.

The taught 3-D display technologies have an inherent path to low-cost analogous to that already taken by inkjet printers. Although we have taught sealed recirculating displays, it is possible that some applications could utilize specialized and consumed particulate media-particularly activatable or excitable media which eventually wear out. That would comprise an additional business-opportunity for consumables.

Finally, we expressly include in our inventive scope content and content-processing for an inventive display in at least these two scenarios: 1) content which is provided already-formatted or compatible with an inventive 3-D display and/or 2) content which is reformatted by or rendered-compatible by the display or by a cooperating or coupled computation means (such as a PC or set-top box for example) for its presentation on an inventive display. Such content may be recorded matter, computed matter or realtime matter, for example. The displayed 3-D image format may also be regarded as proprietary and involve appropriate licensing of content rendered using it or content which is viewed.

What we claim is:

1. A volumetric three-dimensional display capable of presenting temporally fused graphical and/or computer images or scenes to at least one viewer comprising:
   a particulate material or media;
   a particulate formation or provision mechanism;
   a particulate emission mechanism;
   a mechanism for projecting or writing on or into particulate;
   at least some hardware or software supporting at least one aspect of one or more of data storage, data communication, data formatting, data projection or writing, display-powering, display control, image-volume ambient-control or particulate-manipulation;
   at least some particulate or particulates emitted in spatial arrangements comprising at least one projection screen, projectable surface, projectable object-surface, projectable shell of an object or projectable-arrangement and being positioned or oriented, at least momentarily, at least one position or orientation in an image volume, to receive projected or beam-written graphics or data corresponding to at least one image-volume, image-volume sub-slice or to at least one image-volume spatial position or orientation in the image volume; and
   visually temporally-fused three dimensional image content being provided by optical-projection, image-wise projection or projected beam-writing upon or into one or more emitted projection or beam-written screens, surfaces or shells or arrangements in multiple such positions or orientations and/or over time.

2. The display of claim 1 wherein any one or more of:
   a) one or more screens or surfaces is emitted such that one or more has a major dimension such as a screen length, width or diameter parallel or roughly parallel to an emitter face for at least one moment;
   b) one or more screens or surfaces is emitted such that one or more has a major dimension such as a screen length, width or diameter at an angle to an emitter face for at least one moment;
   c) one or more screens or surfaces is emitted such that one or more has a major dimension such as a screen length, width or diameter roughly orthogonal to an emitter face for at least one moment;
   d) one or more screens or surfaces is emitted such that one or more has a major dimension such as a screen length, width or diameter having a varying angle to an emitter face over a period of time;
   e) one or more screens or surfaces is emitted which is substantially flat, curvilinear, domed or faceted in overall shape at least one moment;
   f) one or more screens or surfaces is emitted such that one or more has a major dimension such as a screen length, width or diameter which is larger than a screen or surface thickness; or
   g) one or more screens or surfaces is emitted which has a screen thickness of approximately between 1 and 100 particulates, more preferably between 1 and 50 particulates, and most preferably between 1 and 25 particulates.

3. The display of claim 1 wherein any of:
   a) at least one screen, surface or shell is emitted and it translates and/or rotates some amount in an image volume;
   b) at least one screen, surface or shell is emitted which has a limited lifetime in an image volume;
   c) two or more emitted screens, surfaces or shells are, at least in part, simultaneously present in an image volume;
   d) an emitted screen, surface or shell has a shape, orientation or dimension that changes during its period in an image volume; or
   e) two or more different emitted screens or surfaces pass through the image volume in the same manner or in a different manner.

4. The display of claim 1 wherein at least one of:
   a) an emitted screen, surface or shell passes through or is present in an image volume such that at at least one moment its overall form or shape is substantially detached from the emitter and the catchment;
   b) an emitted screen, surface or shell passes through or is present in an image volume such that at at least one moment its overall form or shape is substantially detached from the emitter;
   c) an emitted screen, surface or shell passes through or is present in an image volume such that at at least one moment its overall form or shape is substantially detached from the catchment;
   d) an emitted screen, surface or shell passes through or is present in an image volume longer than the time it takes an individual particulate to pass completely across or through the image volume;
   e) an emitted screen, surface or shell translates within an image-volume with an average velocity comparable to an initial particulate emission velocity;
   f) an emitted screen, surface or shell translates or rotates in an image volume in a manner substantially unaffected by image-volume ambient pressure; or
   g) an emitted screen, surface or shell has at least some of its emitted particulate or particulates one or more of: (i) charged or discharged purposely or unavoidably, or (ii) manipulated with regards to charge-to-mass ratio.

5. The display of claim 1 wherein any one or more of:
   a) an emitted screen, surface or shell receives a single projected or beamed image sub-slice or sub-portion during its time in the image volume, the specific sub-slice or sub-portion appropriate for a position or orientation at which the screen, surface or shell is or will be at least momentarily located within the image volume; or b) an emitted screen, surface or shell receives two or more different projected or beamed image sub-slices or sub-portions during its time in the image volume, the specific sub-slices or sub-portions appropriate for two or more different positions or orientations at which the screen, surface or shell is or will be at least momentarily located within the image volume; or c) an emitted screen, surface or shell receives two or more different projected or beamed image sub-slices or sub-portions at two or more different times while in the image volume.

6. The display of claim 5 wherein a single emitted screen, surface or shell which serves to display two or more different image sub-slices or sub-portions of an image volume frame at two or more different spatial positions or orientations or at two different times while in the image volume thereby serves to reduce the total emission rate of particulate material because each emitted screen is optically employed multiple times rather than emitting one screen per image sub-slice.

7. The display of claim 1 wherein a projectable or beam-writable screening-surface or shell any of:
   a) translates or rotates with a substantially unchanging overall shape while in the image volume; or
   b) translates or rotates with a substantially varying overall shape while in the image volume.

8. The display of claim 1 wherein any one or more of:
   a) a particulate is a fluid, flowable droplet, microdroplet or bubble;
   b) a particulate emission or image-volume velocity is measured in meters per second at any point in an image volume; or
   c) a particulate emission is at a zero or low velocity and is more properly characterized as a particulate-release which may or may not be followed by the further application of other particulate acceleration or steering forces.

9. The display of claim 1 wherein any one or more of:
   a) an image volume is at or is maintained at a subatmospheric pressure;
   b) an image volume is at or is maintained at a substantially atmospheric pressure;
   c) an image volume ambient, at least in part, is comprised of a particulate material constituent or partial pressure therefrom;
   d) an image volume ambient is substantially gaseous or vaporous at some point in time; or
   e) an image volume ambient has a pressure chosen to be beneficial to display operation.

10. The display of claim 1 wherein image-wise projection means that at least some portion of at least one image or image-slice comprising two or more pixels or voxels or their optical equivalents is simultaneously projected at a given moment.

11. The display of claim 1 wherein at least one of:
    a) at least some image information is projected or written in the form of a hologram; or
    b) at least some particulate is emitted in an arrangement having a relation to a holographic image.

12. The display of claim 1 wherein projected beam-writing means that at least some portion of at least one image or image-slice is written, such as one pixel or voxel at a time, by a rastered or vectored scanning beam or beams.

13. The display of claim 1 wherein the at least one projectable spatial arrangement receives, is illuminated by, or is impinged by a projection, projected image or beam-written image delivered using a digital or analog spatial light modulator or SLM possibly including any MEMs-based micromirror SLM or liquid-crystal or electro-optic based SLM.

14. The display of claim 1 wherein said temporal fusing comprises both the fusing of an overall image-volume presentation rate and an image-volume sub-slice or sub-shell projection rate.

15. The display of claim 1 wherein at least one directional resolution is a few millimeters.

16. The display of claim 15 wherein said at least one directional resolution is about one millimeter.

17. The display of claim 16 wherein said at least one directional resolution is less than one millimeter.

18. The display of claim 15 wherein said at least one directional resolution is: a) dependent upon a user setting, b) dependent upon an automatic adjustment, c) dependent upon depicted content, or d) variable and depending on image-volume spatial location.

19. The display of claim 1 wherein a single particulate or a spatial particulate-arrangement within an image volume is any of accelerated, decelerated, steered or rotated in any manner.

20. The display of claim 1 wherein two or more particulates in an emitted particulate arrangement are designed to interact in a display-beneficial manner such as by: a) being attracted or repulsed by electrical charges on one or more of them, b) colliding or not colliding with each other.

21. The display of claim 1 wherein one or more particulates undergoes a change in electrical charge or a change in charge/mass ratio or becomes charged at any time for any duration including as by:
    a) purposeful charging using a charging-electrode or tip;
    b) purposeful charging using a triboelectric effect related to the particulate fluid's emission process or emitter structure;
    c) purposeful mass-change as by evaporation, vaporization or mass-accumulation to or from a surrounding image-volume ambient; or
    d) purposeful decharging or negating of an undesired triboelectric effect;
    e) unavoidable triboelectric charging which may or may not be negated.

22. The display of claim 1 wherein flowable particulate material is recirculated in any manner in any one or more physical state or states, including in a liquid or vapor state.

23. The display of claim 1 wherein a particulate material or media has at least one constituent vapor-pressure below room-ambient atmospheric pressure at a display image-volume operating temperature.

24. The display of claim 1 wherein an emitter orifice or orifice array any one or more of:
    a) is formed using capillary-array techniques or materials;
    b) is formed using photosensitive glass or ceramic techniques or materials;
    c) is formed using any lithographic or MEMs technique or material;
    d) is formed using electroforming techniques or materials;
    e) is formed using mechanically drilled or laser drilled techniques or materials;
    f) is formed with or conditioned to have at least one surface region of controlled particulate-media wettability or unwettability;

g) is formed with a drop-on-demand capability at at least one orifice;
h) is formed with two or more orifices having individually dedicated switchable electrodes, the electrodes being used for any purpose such as to manipulate particulate charge or drive an orifice heater element;
i) employs a piezomaterial to cause emission;
j) employs a transducer or transduction means of any type to cause emission;
k) employs an inkjet-like emission mechanism;
l) employs a phase-change or heating event to cause emission; or
m) employs a particulate media phase change to cause emission-such as a vaporization event.

25. The display of claim 1 wherein any one or more of:
a) a projection or beam-writing means is substantially situated inside the image volume;
b) a projection or beam-writing means is substantially situated outside the image volume;
c) a projection or beam-writing means operates to project or write into the image volume through any type of optical window or port, open or otherwise;
d) a projection or beam-writing means projects or writes upon or into at least a screen surface at an impingement angle between 90 degrees and zero degrees at at least one moment at at least one screen position;
e) a projection or beam-writing means projects or writes through an emitter face or array;
f) a projection or beam-writing means projects or writes through a particulate catchment;
g) a projection or beam-writing means projects or writes through an image volume container or image-volume containment material; or
h) a projection or beam-writing means projects or writes through at least some particulate media material, including such as media on a catchment or media within an emitter head.

26. The display of claim 1 wherein any one or more of:
a) an orifice has a diameter or characteristic aperture dimension between one micron and 100 microns, more preferably between 10 and 100 microns;
b) an orifice emission-plate has a grid or pattern, ordered or random, of multiple orifices;
c) two or more orifices are axially coaligned or arranged in an approximately axial-parallel manner;
d) an orifice comprises an extended lumen or conduit which has an axial length larger than its average diameter or aperture-width;
e) an orifice is any of tapered, radiused, of variable diameter or aperture-width, or is straight; or
f) an orifice is at least one of wet-etched, plasma-etched, laser-etched, mechanically drilled or defined using lithography.

27. The display of claim 1 wherein an emission orifice emits a liquid or other flowable stream which subsequently breaks up or is broken up into one or more droplets or smaller media entities.

28. The display of claim 1 wherein an emission orifice emits substantially already-formed or defined droplets, said droplets possibly still having some degree of connection which may or may not be retained during later flight.

29. The display of claim 1 where two or more orifice's emission is triggered or modulated:
a) using a common trigger signal;
b) using a common emission driving-force or pressure-pulse;
c) using a pressure-pulse which is sourced from a common or shared pressure-pulsing or pressurization means, the pulse possibly arriving at the two or more orifices at different propagation times;
d) at a rate of at least one projectable screen or surface per image-volume frame;
e) using a waveform, preferably a harmonic, periodic or pulsed waveform, to initiate emission of one or more particulates from at least one orifice;
f) using any type of waveform to regularize the droplet breakup behavior of an emitted orifice stream, by regularize meaning a less-random droplet arrangement is attained;
g) using any type of waveform which emits several droplets from at least one orifice, the several droplets defining a screen, surface or shell thickness;
h) by the operation of one or more orifice's heaters;
i) by the operation of one or more orifice's electrodes regardless of whether said electrode is dedicated or shared; or
j) in accordance with a desired resolution or frame rate.

30. The display of claim 1 wherein the displayed content includes any one or more of:
a) live or recorded 3-D video content or content presented as 3-D video;
b) 3-D images of objects that appear substantially stationary for an observable period;
c) any computed 3-D content, including a game scene, animation or computer-aided-design (CAD) model;
d) any 3-D likeness or images of a living being, whether human or animal;
e) 3-D views of a medical surgery, therapy or diagnostic procedure;
f) 3-D content presented for advertising purposes;
g) 3-D content presented for social interaction purposes;
h) 3-D content presented for a navigational or guidance purpose;
i) 3-D content presented in response to a search;
j) 3-D content presented for an educational purpose;
k) 3-D content presented for the therapy of the viewer;
l) 3-D content requested on-demand, said demand request made at any time, including when the viewer begins display use;
m) 3-D content which is magnified, scaled or otherwise shown at a size scale other than one-to-one or other than the standard or default scale, if any, shown on the display;
n) 3-D content which is depicted at one-to-one or at a true-size scale;
o) any 3-D content which is depicted along with 3-D or 2-D labels, text, markers, pointers or other notes;
p) any visible content, whether 3-D, 2-D or 3-D and 2-D combined with audio;
q) 3-D content which relates to a security or safety application;
r) 2-D content shown together with 3-D content or instead of 3-D content; or
s) any 3-D content which is selected by or manipulated by a user or viewer.

31. The display of claim 1 wherein any of:
a) a user can manipulate image-content using at least one of a mouse, pointer, hand-gesturing means, spoken-command, keyboard, touchpad or joystick;
b) a user can manipulate image-content using touch or a haptic interface; or c) a user indirectly manipulates image-content because the display itself can track his/her motion and can adapt content-depiction to his/her physical position.

32. The display of claim 1 wherein the display is used together with a robotic manipulation means as a cooperative system, the display being used to one or more of guide, control or monitor the robot's carrying out of a users desired manipulations or overall purpose, said robot carrying out manipulations to achieve the users overall purpose in a manner preferably substantially observable on said display by said user.

33. The display/robotic system of claim 32 wherein one or more of:
   a) the robot manipulates a tool, device, sensor, work-article or instrument of any sort;
   b) the robot manipulates an imaging-means of any sort, including a videocamera;
   c) the robot is monitored by an imaging-means of any sort, including a videocamera;
   d) the coupled robot is in the same location as the display or as the user of the system's display-portion;
   e) the coupled robot is in a different location than the display being observed by the user;
   f) the robot and the display are both operated by the same user;
   g) the robot reproduces, at least in part, a user's hand or finger manipulations;
   h) the robot substantially carries out the user's manipulations or overall purpose upon any of a patient, living or deceased subject, living or deceased matter, workpiece, article of manufacture, article being tested or analyzed, hazardous material or upon the robot's immediate or manipulatable environment; or
   i) the user's hands or fingers and/or the robot's manipulators or robot-held tools can be seen in the 3-D image.

34. The display/robotic system of claim 32 wherein any one or more of:
   a) a patient is being surgically operated upon;
   b) a patient is being medically or psychologically diagnosed; or
   c) a patient is receiving a medical therapy.

35. The display of claim 1 wherein the application purpose includes at least one of:
   a) playing a game involving one or more users at one or more locations;
   b) gaming or gambling;
   c) mathematical, technical, financial, military or scientific simulation or modeling;
   d) navigation of any type;
   e) understanding or conveying complex data of any type;
   f) socializing or conversing with actual or artificial persons or avatars;
   g) training or education;
   h) the presentation of objects, preferably photorealistically, for any reason including such as for advertising, shopping, selling, buying or auctioning;
   i) the simulated visiting of a museum's collection or other artifact of interest;
   j) viewing or monitoring of a remote object, article, scene, subject, animal, person or property;
   k) contributing to a communication between at least two persons, or between a person and a computer system, the communication being at least one of live or recorded;
   l) tactical, military, space or aviation-related command and control;
   m) any entertainment activity, entertaining meaning entertaining for at least one user and not necessarily of broad appeal;
   n) visiting websites or connecting to servers with 3-D content; or
   o) administering any type of test to a living being.

36. The display of claim 1 wherein any part of a particulate formation or provision mechanism, emission mechanism, emission capillary, aperture or orifice utilizes any one or more of:
   a) a porous or permeable layer or member used to distribute and/or emit emission material or to act as a rigidity-provider;
   b) a porous or permeable layer or member which comprises porous or permeable ceramic, glass, or metal;
   c) an orifice array or glass capillary array fabricated using fiber-optic fusing and/or etching methods;
   d) a member from (a) or (b) laminated, joined, fused-to or otherwise juxtaposed to a member from (c);
   e) any laser-etched orifice or aperture, preferably excimer laser-etched;
   f) any plasma-etched or wet-etched orifice or aperture;
   g) any aperture, orifice or capillary fabricated using any lithographic or MEMs based technique;
   h) any electrode material or process which renders an emission member material or surface-layer semiconductive or conductive;
   i) any electrode-film or electrode-interconnect which is orifice-dedicated or serves two or more orifices, the electrode film being formed in any manner and having or not having spatially defined interconnections therein;
   j) any orifice-related heater or particulate charging-electrode which is orifice dedicated or serves two or more orifices;
   k) any wettability-enhancing or wettability-minimizing measure such as to keep disruptive droplets of emission-media films from forming or hanging on an orifice face;
   l) any charging or discharging electrode such as to add charge, remove charge or negate charge-whether orifice dedicated or common to two or more orifices; or
   m) any photosensitive glass or ceramic such as laser-exposed and subsequently wet-etched glass.

37. The display of claim 1 wherein emitted particulates comprise flowable droplets or microdroplets and such droplets are small enough and/or wettable enough that their depositing upon an interior wettable image-volume surface results in their wet-out quickly enough that they are not visually or optically disruptive to the display user.

38. The display of claim 1 wherein any image-volume portion or other display interior-surface is rendered poorly-wettable, unwettable or uncondensing such as for the purpose of rendering an emitter-face unwettable or uncondensing by particulate flowable-media.

39. The display of claim 1 wherein any image-volume portion or other display interior-surface is heated, including for the purpose of evaporating otherwise optically-disruptive particulate which contacts or lands on it or to prevent such condensation thereof.

40. The display of claim 1 wherein one or more emitting orifices relies on particulate media flow-through and/or pressurization of a permeable or cellular material for its operation.

41. The display of claim 1 wherein a light-shield or light-mask is provided in or on the display for the purpose of blocking at least some light, whether direct or indirect, from a user's eyes.

42. The display of claim 1 wherein a user uses or wears any type of headgear or eyewear to enable or enhance viewable contrast.

43. The display of claim 1 wherein the display's operation involves the purposeful passage of at least some direct or indirect light through one or both of an emitter or catchment, said light possibly including projected or beam-written light or illumination or activation light.

44. The display of claim 1 wherein a transparent or translucent image-volume chamber through which content is viewed has any one or more of:
   a) an antireflection coating or composition;
   b) any coating or composition serving an optical purpose, including a polarized coating, antiglare coating or antifogging coating;
   c) any coating or composition serving a particulate media wettability or non-wettability-control purpose;
   d) any coating or composition which serves as a heater-element for purposes of warming any part of the display for any purpose;
   e) any coating or composition which serves as a functional electrode supporting proper display operation or safety, including an electrical grounding coating;
   f) any coating which is used because of its compatibility or better compatibility with an emitted particulate media than the chamber material itself;
   g) a material composition, including a polymer, glass or ceramic, or
   h) a structure which can support a pressure difference across its thickness.

45. The display of claim 1 wherein the image-volume is isolated from the room-ambient by substantially a single-layer or interface of intervening material, that layer possibly also allowing for the maintenance of a different pressure and/or different composition in the image-volume than exists outside the image-volume in the room air ambient.

46. The display of claim 1 wherein the image volume ambient is approximately at ambient room pressure and:
   a) an image is displayed in substantially static or stagnant air;
   b) an image is displayed in substantially flowed-air;
   c) particulate arrangement emission causes some amount of air-movement or drag which is accounted for in the design;
   d) flowed image-volume air is exhausted, in whole or in part, to the room or outdoor ambient;
   e) flowed image-volume air is recirculated, in whole or in part, within the display;
   f) emitted particulates or droplets undergo slowing after emission and the slowing is accounted for in the design; or
   g) emitted particulates or droplets either evaporate or are caught by a catchment thereby avoiding unacceptable flooding of the viewing environment.

47. The display of claim 1 wherein the image-volume has a general shape which is any one or more of: boxlike, cylindrical, tubular, spherical, pyramidal, cone-like, hemispherical, domed, ellipsoidal, cubic, an elongated shape, a wrap-around shape or a curvilinear shape.

48. The display of claim 1 wherein at least the image-volume portion of the display can one or more of:
   a) sit on one or more of a desk, table or bench;
   b) sit on a floor;
   c) be mounted in a wall or façade;
   d) be mounted on an articulating arm;
   e) be held in a lap or in the hands;
   f) be connected or disconnected from another display-module such as to/from an electronics-containing or power-supply containing portion; or
   g) is shatter resistant;
   h) provide a view of displayed matter from multiple observer positions.

49. The display of claim 1 wherein emitted particulates, such as droplets or microdroplets, can have at least one of their characteristic emission-parameters changed for a user-beneficial purpose, at least one of automatically or by the user's control, optionally including at least one of the following parameters:
   a) a particulate diameter, average diameter, size-dimension or aspect-ratio;
   b) a particulate-to-particulate spacing coming from one or more orifices;
   c) a particulate minimum, average or maximum velocity;
   d) the shape or orientation of an emitted arrangement
   e) the thickness, opacity or translucency of an emitted screening-surface or object; or
   f) a particulate charge or charge-to-mass ratio.

50. Displayable content for compatible use on the display system of claim 1, the content being delivered to the display in any one or more manners, including in physical media, wirelessly or by wire as from internet, server or network downloads, the content including data necessary to project at least two projectable slices of at least one image-volume frame, the content optionally also including audio content to accompany visual, video or graphical content.

51. A volumetric 3-D display system for displaying one or more of at least some 3-D image, video, computer or graphical-content comprising
   at least one image volume;
   at least one image-projection or beam-writing means;
   at least some hardware or software supporting at least one of: content-related data-storage, data-transfer, data-formatting or operation-related image-volume ambient maintenance, particulate emission, particulate recirculation, display control, or the provision of power;
   a means to form, introduce or release within or into at least one image volume, at least one optically projectable or beam-writable screening surface, the screening surface made up of an arrangement of emitted particulate material or droplets for at least a projectable period;
   the screening surface arranged to move within or be relocated in one or more image volumes as by at least one of (i) physical translation or rotation in the image volume or (ii) by being reformed at different locations in the image volume;
   the moving or reformed screening-surface receiving at least one projected or beam-written image-slice selected in accordance with a spatial position the screen surface takes or will take within the image volume or volumes;
   3-D visually fused visual content provided by the formation of multiple such screening surfaces with their appropriate projected or written image slices at different spatial positions within the one or more image-volumes over time; and
   the system preferably also having an audio capability to at least play or control the playing of audio associated with visual content.

52. The volumetric 3-D display system of claim 51 wherein at least one projectable or beam-writable surface translates or rotates in an image volume at least in part because of its: a) emission velocity and/or b) the forced motion of an image-volume ambient, including room-air or a gas which essentially drags or entrains released or emitted particulate or arrangements thereof and/or c) acceleration or decceleration force(s) applied to particulate after emission or release.

53. The display system of claim 51 wherein one or more of:
a) a given screening-surface receives one image slice;
b) a given screening-surface receives multiple image slices at multiple spatial positions;
c) a screening-surface is any of flat, curvilinear, domed or faceted;
d) a screening-surface has a changing shape or orientation while it is in the image volume;
e) a screening-surface has a thickness generally along a projection direction that is less than a major dimension of the projectable or writable screen;
f) a screening-surface is formed with an approximate number of particulates or droplets defining its thickness such that it has an optical opacity to optical projections or beam-writing chosen to be between transparent and opaque and preferably of controlled translucency;
g) a projected or beamwritten image-slice has a slice shape substantially matching the shape of a projectable surface; or
h) a projected image is substantially projected in a collimated manner upon any shape of projectable surface.

54. The display system of claim 51 wherein one or more of:
a) an image volume frame rate is between 24 and 200 frames per second;
b) a particulate or droplet velocity is between 0 and 200 meters per second;
c) the image volume ambient-pressure is sub-atmospheric; or
d) the image volume ambient-pressure is approximately atmospheric and particulates are emitted or released into the air and/or are entrained by flowing or flowed air into which they are emitted or released.

55. The display system of claim 54 wherein the image volume frame rate is between 30 and 150 frames per second.

56. The display system of claim 55 wherein the image volume frame rate is between 60 and 120 frames per second.

57. The display system of claim 54 wherein the particulate or droplet velocity is between 5 and 100 meters per second.

58. The display system of claim 57 wherein the particulate or droplet velocity is between 5 and 60 meters per second.

59. The display system of claim 51 wherein projection is image-wise projection.

60. The display system of claim 51 wherein projection is image-wise and is done using, at least in part, a spatial light modulator, including a micromirror or an LCD-based spatial light modulator.

61. The display system of claim 51 wherein at least one light source supporting the projected images or data includes one or more of an LED, a gas or solid state laser of any type, an arc or discharge lamp, a halogen bulb or an incandescent bulb.

62. The display system of claim 51 wherein multiple different color light-sources are utilized sequentially or in parallel, including RGB or CYMK colors.

63. The display system of claim 51 wherein at least some color-depth is provided utilizing a PWM or pulse-width-modulation technique anywhere in the display architecture.

64. The display system of claim 51 wherein the moving emitted projection screens substantially pass from one face to another face or from one side to another side of the image volume.

65. The display system of claim 51 wherein the display system has a modular design, meaning that the system comprises at least two modules or parts which are wirelessly-connected, wire-connected or otherwise joined during operation by a connecting umbilical, lumen, utility cable or one or more fasteners.

66. Displayable content for compatible use on the display system of claim 51, the content being delivered to the display in any one or more manners, including in physical media, wirelessly or by wire as from internet, server or network downloads, the content including data necessary to project at least two projectable slices of at least one image-volume frame, the content optionally also including audio content to accompany visual, video or graphical content.

67. The display system of claim 51 wherein it is used together with or integrated with a robot or robotic manipulator, thereby constituting a 3-D display/robotic manipulation system.

68. The display/robotic manipulation system of claim 67 wherein the user can see his/her own manipulating finger, fingers, hand or hands or other body-part(s) in the displayed content, his/her hands or fingers actually being outside the display image-volume but being visually reproduced therein.

69. The display/robotic manipulation system of claim 67 wherein the user can see his/her own manipulating finger, fingers, hand or hands in the displayed content, his/her hands or fingers actually physically being inside the display image-volume.

70. The display/robotic manipulation system of claim 67 wherein the user manipulates actual or simulated tools in his/her hand(s)/finger(s), whether physically inside or outside the image volume of the display, and the user's manipulation of the tool(s) is substantially reproduced by the robot and practiced by the robot upon a workpiece, article of manufacture, hazardous material or object, article being tested or inspected, or on a living being or patient.

71. The display/robotic manipulation system of claim 67 wherein the user sees in an image volume any likeness of a tool regardless of whether that imaged tool is any one or more of: (a) an actual tool being manipulated by the robot, (b) an actual tool-like or tool-holding handgrip, fingergrip or control provided as a user-interface to input his/her desired manipulations, (c) a graphical icon-likeness representing a physical tool or its location.

72. The display of claim 1 wherein said particulate manipulation includes any one or more of i) electric steering or deflection of electrically charged, electrically polarized, magnetic or magnetized particulates or particulate spatial arrangements, ii) magnetic steering or deflection of electrically charged, electrically polarized, magnetic or magnetized particulate spatial arrangements.

73. The display of claim 51 wherein said particulate manipulation includes any one or more of i) electric steering or deflection of electrically charged, electrically polarized, magnetic or magnetized particulates or particulate spatial arrangements, ii) magnetic steering or deflection of electrically charged, electrically polarized, magnetic or magnetized particulate spatial arrangements.

74. The display of claim 51 wherein said particulate manipulation includes one or more of:
a) screen steering or deflection of a continuously emitted screen;
b) screen steering or deflection of burst-emitted screens;
c) screen steering or deflection of screens comprising electrically charged or polarized particulates;
d) screen steering or deflection of screens comprising magnetic or magnetizable particulates;
e) screen steering or deflection of screens comprising particulates which themselves each include multiple materials, suspensions of materials or nanoparticles such as magnetic nanoparticles.

* * * * *